(12) United States Patent
Pearson, Jr.

(10) Patent No.: US 10,920,434 B1
(45) Date of Patent: Feb. 16, 2021

(54) PORTABLE ROBOTIC CONSTRUCTION SYSTEM

(71) Applicant: Kent Douglas Pearson, Jr., Folsom, CA (US)

(72) Inventor: Kent Douglas Pearson, Jr., Folsom, CA (US)

( * ) Notice: Subject to any disclaimer, the term of this patent is extended or adjusted under 35 U.S.C. 154(b) by 222 days.

(21) Appl. No.: 16/016,641

(22) Filed: Jun. 24, 2018

Related U.S. Application Data

(60) Provisional application No. 62/524,140, filed on Jun. 23, 2017.

(51) Int. Cl.
| | |
|---|---|
| *E04G 21/14* | (2006.01) |
| *B66C 19/00* | (2006.01) |
| *B60F 3/00* | (2006.01) |
| *B65G 15/28* | (2006.01) |
| *B25J 11/00* | (2006.01) |
| *E04G 21/16* | (2006.01) |
| *E02F 3/96* | (2006.01) |

(52) U.S. Cl.
CPC ............ *E04G 21/142* (2013.01); *B25J 11/005* (2013.01); *B60F 3/0061* (2013.01); *B65G 15/28* (2013.01); *B66C 19/00* (2013.01); *E04G 21/16* (2013.01); *E02F 3/96* (2013.01)

(58) Field of Classification Search
CPC ..... E04G 21/142; E04G 21/16; B60F 3/0061; B25J 11/005; B66C 19/00; B65G 15/28; E02F 3/96
See application file for complete search history.

(56) References Cited

U.S. PATENT DOCUMENTS

| | | |
|---|---|---|
| 3,950,914 A | 4/1976 | Lowen |
| 4,060,955 A | 12/1977 | Lachnit |

(Continued)

FOREIGN PATENT DOCUMENTS

WO 2007050968 A2 5/2007

*Primary Examiner* — Michael J Zanelli
(74) *Attorney, Agent, or Firm* — Law Office of David Hong

(57) ABSTRACT

A robotic system having a movable gantry robot (10) for conducting construction operations. The gantry may have an expandable bridge (20) and articulated gantry support legs (34) as well as a support track system (60) holding a gantry robot (800) which may hold one or more implements and peripheral devices (806). The device can be moved by propulsion mechanisms, a controller, and one or more geo-positioned control devices to provide position information for the robotic gantry as it moves back and forth along a plurality of work sites (700). The robotic gantry is connected to a power supply system (236). The controller is automated, self-navigating, and activates, deactivates, and/or changes the operation of the propulsion mechanisms, and deploys, retracts, activates, deactivates, and/or changes the operation of one or more of the construction implements. The height of the frame may be adjusted by extending and rotating risers and booms to accommodate different building heights or sub-level heights at a worksite. A conveyor system is optimized for removing dirt from or delivering material to the robotic arm. This invention can be applied to automating construction jobs including surveying, land preparation, excavation, foundation, masonry, framing, and additive fabrication.

18 Claims, 69 Drawing Sheets

(56) References Cited

U.S. PATENT DOCUMENTS

| | | | |
|---|---|---|---|
| 4,998,442 | A | 3/1991 | Brown |
| 5,111,709 | A | 5/1992 | Torii |
| 5,119,732 | A | 6/1992 | Lisy |
| 5,284,000 | A | 2/1994 | Milne |
| 5,529,471 | A | 6/1996 | Khoshevis |
| 7,641,461 | B2 | 1/2010 | Khoshnevis |
| 8,029,710 | B2 | 10/2011 | Khoshnevis |
| 8,166,727 | B2 | 5/2012 | Pivac |
| 8,434,414 | B2 | 5/2013 | Wessel |
| 8,644,964 | B2 | 2/2014 | Hendron |
| 8,965,571 | B2 | 2/2015 | Peters |
| 9,206,601 | B2 | 12/2015 | Khoshevis |
| 9,622,398 | B2 | 4/2017 | Gaus |
| 2003/0161708 | A1* | 8/2003 | Johnston ................ B66C 19/02 414/460 |
| 2013/0078073 | A1 | 3/2013 | Comb |
| 2013/0206543 | A1* | 8/2013 | Hubrich ................ B65G 65/28 198/314 |
| 2015/0082740 | A1 | 3/2015 | Peters |
| 2016/0068357 | A1 | 3/2016 | Bastian |
| 2016/0274564 | A1 | 9/2016 | Schultz |

\* cited by examiner

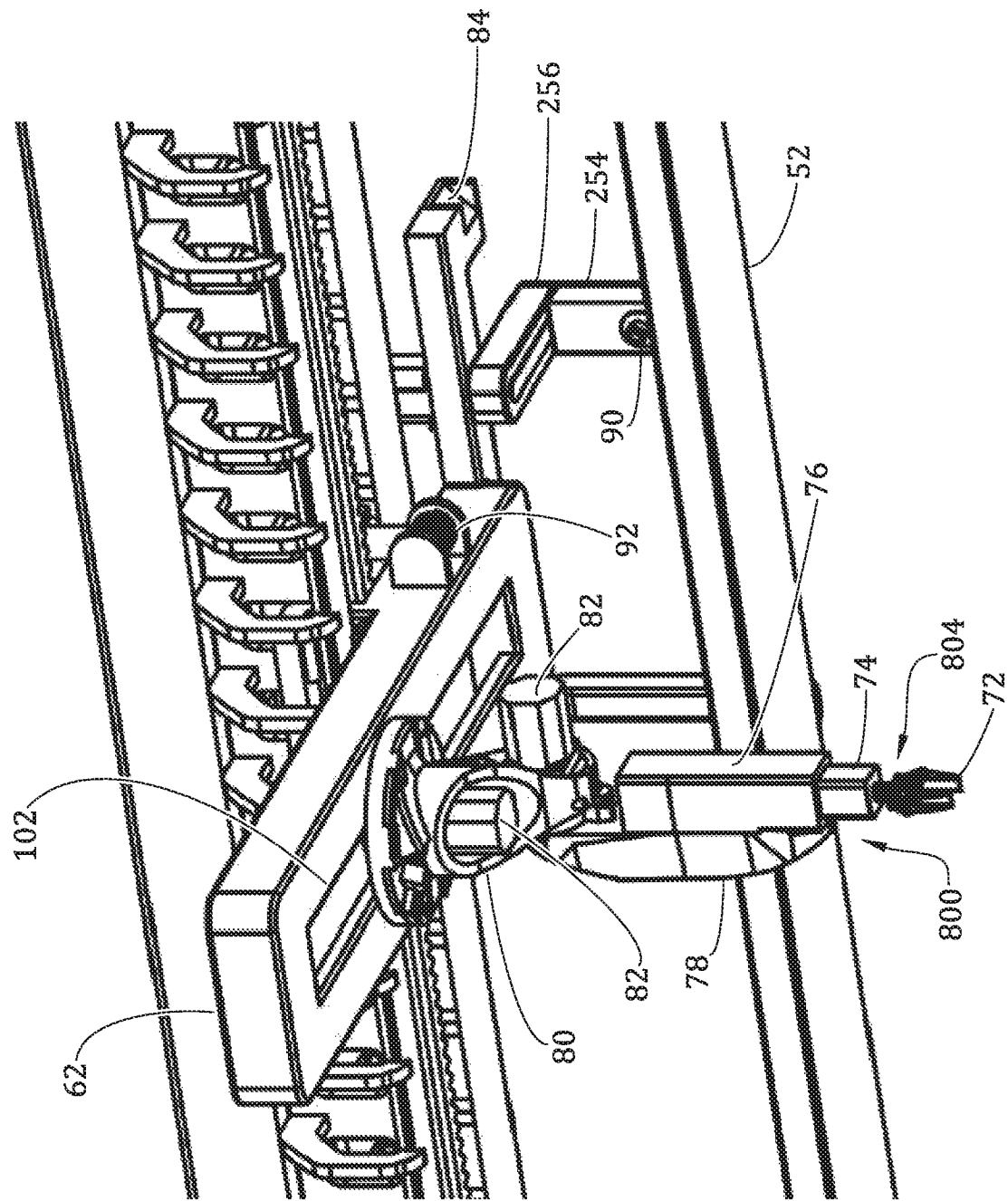

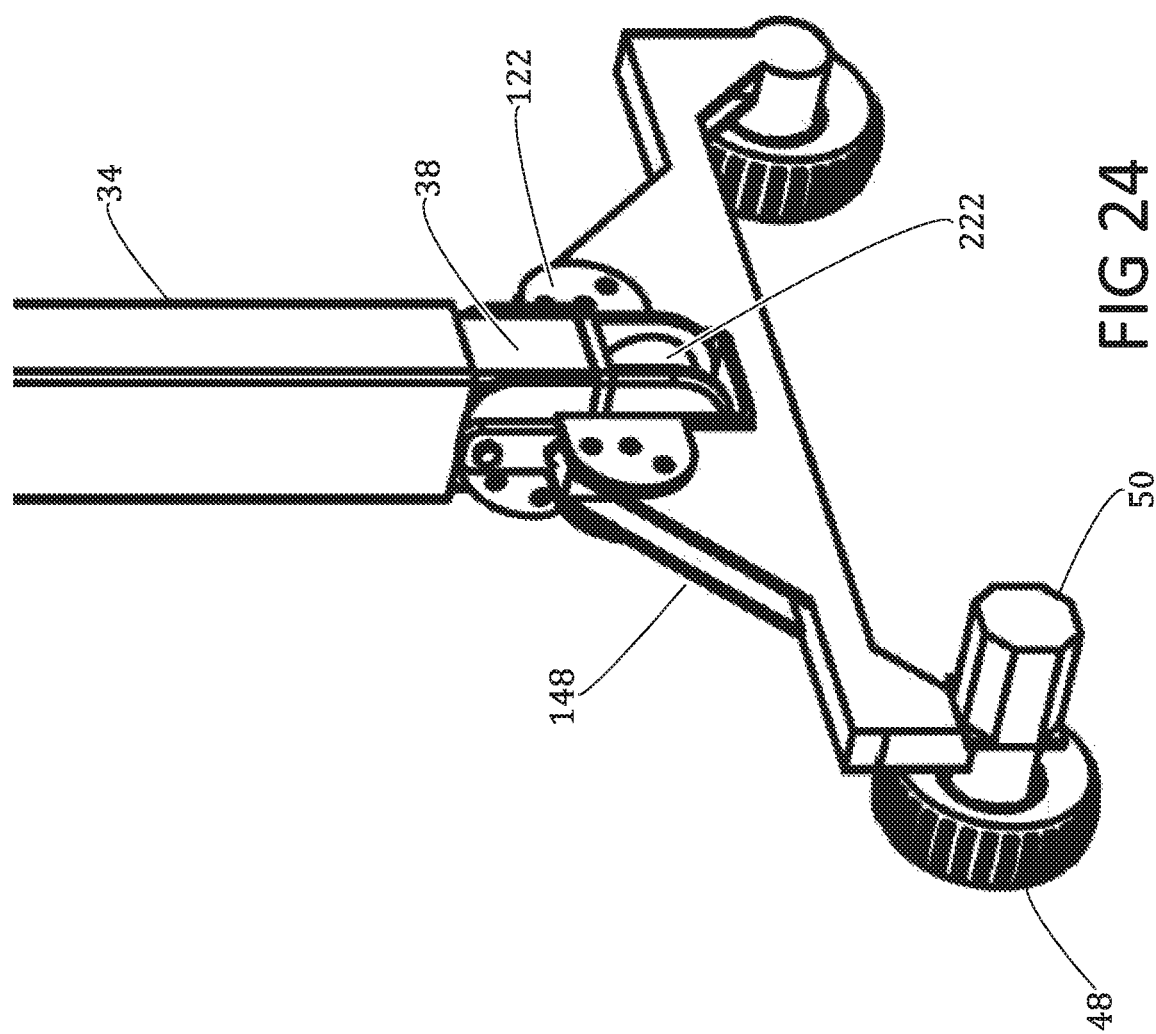

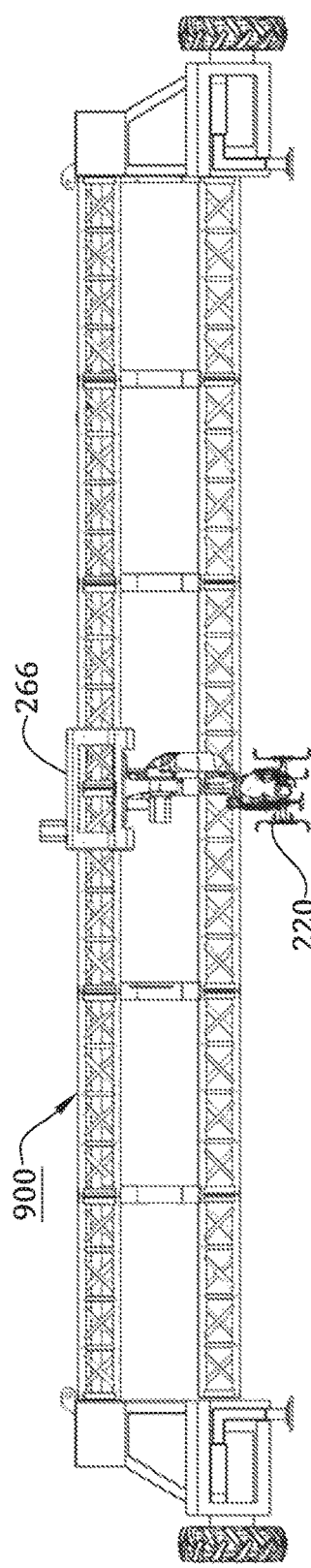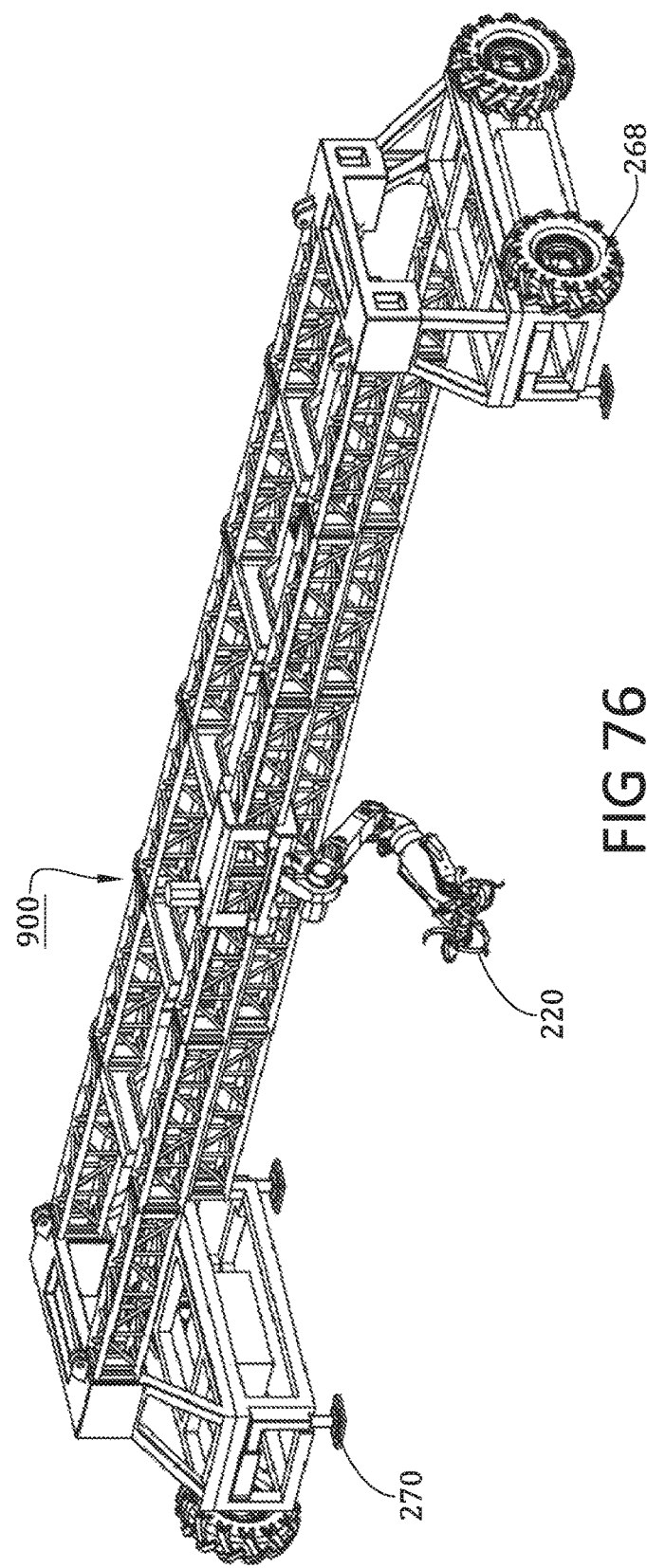

PORTABLE ROBOTIC CONSTRUCTION SYSTEM

This application claims the benefit of U.S. Provisional Patent Appl. No. 62/524,140, filed on Jun. 23, 2017, which is incorporated by reference in entirety.

FIELD OF THE INVENTION

This invention relates to a method and system for construction. Particularly, this invention relates to land surveying, land grading, excavating, masonry, assembly, pouring, marking, and additive fabrication. More particularly, this invention relates to robotics in the construction industry as well as a support structure that the robotics can attach to. More particularly, this invention relates to software and sensors to control a robotic system and support structure as well as accurately locate the device and the robotic arms through geo-spatial positioning. Specifically, the invention relates to a novel technique for combining modern construction earth moving equipment with robotic automation, laser scanning, sensors, additive construction methods, extended gantry crane support structure, software, and an assortment of building, clearing, gripping, spraying, and extruding attachments. The invention is also further applicable for sea wall construction, dredging, large machining applications and factory assemblies.

BACKGROUND

The construction industry is evolving quickly through the $3^{rd}$ Industrial Revolution and into the $4^{th}$ Industrial Revolution with the advent of Autonomous Robotic Systems in the construction industry. The increase in Industrial Internet of Things (IIoT) which is the combining the two technologies of Operational Technology (OT) and Information Technology (IT) in the construction industry has led to the development of autonomous construction equipment, additive fabrication, and automated brick laying devices. Each of these devices requires robotic systems in place and requires large gantry structures, excavator arms, or boom arms for application. Moving large structures into place at a construction site is time consuming and a costly procedure often requiring extra lift equipment to assemble the robotic equipment and structures. Currently, there are only a few large scale additive fabrication prototypes under development which focus primarily on extruding material from a computer controlled nozzle and which can only handle light weight and low torque tasks. There are also a few small excavators and boom lifts under development that have robotic arms attached to them and which can be self-propelled to a site without the use of larger lifting equipment. These devices are limited to weight restrictions due to their physical constraints on an extended boom which results in smaller working areas and lighter bricks that can be utilized for pick and place. The functionality of these booms is limited in capabilities to pick and place of bricks as well as additive concrete techniques. But, these new technologies dramatically reduce the time and cost of construction and are considered the next evolution in the construction industry. While these non-linear robotic arms that are attached to booms or at the end of excavators' arms do improve pick and placing procedures and additive fabrication applications, they are not as efficient as linear robotic systems which are the most common moving robotic systems for factory assemblies and rapid prototype equipment. These automated construction devices do reduce the amount of site workers needed on the site. However, these devices do create higher paying jobs for professionals who can design and engineer the construction plans and oversee the equipment at the site. People who are unable to work in the construction industry due to physical abilities or are older in age are capable in operating these automated devices as technicians.

Low cost Prefabricated Construction Material such as frames, walls, brick panels, concrete forms, and kitchen counters are also helping to reduce the time and cost of construction. Prefabrication can be done in a warehouse or factory setting inexpensively with the assistance of larger tools, lifts, gantries, jigs, assembly tables, linear robots and other computer assisted equipment. The automated systems and prefab construction material has made an enormous impact on construction by reducing the time at the site as well as providing higher quality assemblies. Once produced, the prefab material can be put on trucks and delivered to the construction site for quick assembly. Boom Lifts can be utilized to lift the prefab material into place. The disadvantages are that the prefab material needs to be moved fully assembled by truck to the site which is bulky and expensive. Many trucks are required to deliver the needed prefab frames for a single family home. Also, the prefab frames and concrete forms need to be light enough for the current boom lifts and cranes to lift and place into the site. The frames and other prefab material are thus restricted in size and weight.

Currently, construction projects are made up of teams—excavation and land preparation, foundation, framing, roofing, plumbing and electrical, HVAC, flooring, brick laying, Drywall installation, carpentry, driveway and concrete pouring, finishing, hardware, and landscaping. Each team has specialized equipment to fulfill their work such as a bulldozer, motor grader, excavator, backhoe, ditcher, dredger, hauler, loader, compactor, scraper, drill, trencher, breaker, knuckleboom loader, boom lift, forklift, scaffold, cherry picker, concrete mixer, miter saws, and hand tools. Each team relies on other teams to complete a project before they can start their project. A use of a general contractor to oversee and coordinate all teams is essential for an on-schedule completion time. There are, however, a lot of inefficiencies in the current construction method which often causes delays in finishing a project on time and with high quality. The general contractor must rely on reliable work teams to finish their specific project according to the contractor's time schedule as well as in good quality. An underperforming team can cause other teams to be delayed or have the teams have to work around issues created by the underperforming team. Automated robotic systems can help reduce these issues and help teams stay on schedule. Construction software helps the contractor stay on schedule as much as possible. Still, site workers and teams are the largest factor in getting a project finished on time. By reducing the number of teams required to finish a project will dramatically improve the construction time as well as reduce the cost.

Heavy construction equipment such as excavators, bulldozers, motor graders, drills, trenchers, boom lifts, and forklifts are loud and operate mostly by a combustible engine or generator. These devices are subcontracted at a high rate and trailered to a site. They most likely need room at the site to maneuver and often cause more environmental damage than is desired. These devices often emit fumes and are not environmentally friendly. Construction sites are often loud, smelly, and the environment is more affected due to the construction equipment footprint and dirt removal capabilities. Removing dirt is often the work of the excavator or bulldozer and dump trucks. Excavators need to pick up the dirt and empty the dirt into the dump truck which may take a lot of time to accomplish. Another option is the use of conveyor belts to move dirt. The dirt can be put on the conveyor belt by the excavator and moved to a dump truck or dirt storage area. The main issue is that the conveyor belt needs to be within an arms-reach of the excavator resulting in the conveyor belt being constantly moved. This can be more of an inconvenience for the excavator operator. Contractors often make their schedules around when heavy equipment will be delivered to the construction site. By reducing the amount of heavy equipment needed for construction, a contractor can be more confident on a schedule and be able to reduce the construction time and cost by a large amount.

Gantry Robot Systems provide the advantage of large work areas and better positioning accuracy. Linear multi-axis robots attached to a gantry allows for large assemblies and fabrication to be performed within the footprint of the gantry in both X, Y, and Z Axis. Larger gantries are common in warehouse, loading docks, and factory facilities. Portable smaller gantries are common in auto shops. Gantry hoists can lift heavy loads much greater than a similar size lift or crane. This is because of the 2 support legs holding up the horizontal cross beam. The weight is distributed over both legs. For a lift or crane, the weight is only supported by the lift arm and base. Although outrigger legs on a lift or crane help the lift and crane with heavier objects, the lift and crane is still limited by the physical properties associated with leverage, the fulcrum point, and the weight. Lifts and cranes are common in the construction industry. There are no known construction gantries in the field at this time and construction weight loads are restricted to the size of the boom or lift.

It is an object of the present invention to provide a method and a system that can bring factory capabilities and efficiencies to the construction worksite which will result in dramatic cost savings and reduced construction times as well as improve quality and performance. It is a further object to provide a method and a system that would simplify and automate construction and reduce the quantity of site workers required to complete a project. It is a further object to provide a method and system that will reduce the number of heavy equipment needed for a construction project. It is a further object to provide a method and a system that is portable and easy to transport yet capable of being transformed into a larger structure that is capable of lifting and moving heavy objects. And it is a further object to provide a method and a system controlled by software, sensors, geo-spatial positioning that can control linear robotic arms that can perform assembly procedures, additive fabrication, and land moving operations precisely and efficiently.

Industries that can utilize this invention are, however not limited to, Building and Construction, Landscaping, Government—Federal, State and Local, Energy, Gas, Manufacturing, Military, Army Corps, Space Exploration, Science, and Research, Agriculture, Mining, Technology, TV, Fil, and New Media, Entertainment, Event, and Exhibition. Various embodiments of the invention are described more fully hereinafter with reference to the accompanying drawings, in which some, but not all embodiments of the invention are shown in the figures. Indeed, these inventions may be embodied in many different forms and should not be construed as limited to the embodiments set forth herein; rather, these embodiments are provided so that this disclosure will satisfy applicable legal requirements.

SUMMARY OF THE INVENTION

There is a movable gantry robotic apparatus comprising: a chassis platform with a propulsion system, a power supply and a computing system controller; an expandable and rotating turret system arises from the chassis platform to support a gantry bridge; the turret system comprises a lower turret boom riser, a turret and an adjustable boom; the turret system is able to rotate 360 degrees and move upwards and downwards; the gantry bridge having a first extendable gantry support leg and a second extendable gantry support leg; the extendable gantry support legs are connected to microcontrollers and the computing system controller; the gantry bridge having a bridge conveyor belt system, which has a plurality of conveyor accessory arms, which run along the gantry bridge; the gantry bridge having a trolley system; the trolley system comprising at least one track frame and at least one trolley track rail and at least one trolley; the gantry bridge having at least one gantry accessory arm; multiple sensors, which are connected to the computing system controller; whereby the bridge conveyor belt system allows for moving a first item or tool along the gantry bridge; the trolley system allows for moving a second item or tool along the gantry bridge; and the at least one accessory arm allows for moving a third item or tool and while the computing system and multiple sensors maintain that the gantry bridge is parallel to the ground by directing the microcontrollers to adjust said extendable gantry support legs; the multiple sensors and the computing system determine weight load on the trolley and the gantry bridge and send instructions for adjustments to the gantry bridge to distribute weight load between the extendable gantry support legs; the chassis platform has wheels, tracks or outrigger legs; the gantry bridge has multiple bridge portions and is expandable and collapsible; and the at least one accessory arm can hold a tool, a gripper attachment, construction materials or supplies, a tank or a concrete mixers; said accessory arm is motorized; the trolley has a trolley accessory arm, which can hold a tool, a gripper attachment, construction materials or supplies, a tank or a concrete mixers; said trolley accessory arm is motorized; the first extendable gantry support leg further comprises a rotating wheel attachment connector; the rotating wheel attachment connector can attach a wheel, a foot plate, a outrigger boom, a clamp or a suction cup; the computing system has wireless or satellite communications and is connected to at least one GPS sensor or at least one camera; the gantry bridge employs a linear X, Y and Z computer controlled gantry with an extended gantry trolley and at least one robotic arm attachment; and the extendable gantry support legs are connected to hydraulic pistons and risers to help adjust elevation and angle of the gantry bridge; and the adjustable boom comprises a boom microprocessor and a boom sensor.

A movable gantry robotic apparatus comprising: a chassis platform with a propulsion system, a power supply and a computing system controller; an expandable and rotating turret system arises from the chassis platform to support a gantry bridge; the turret system comprises a rotatable turret and an adjustable boom; the turret system is able to rotate 360 degrees and move upwards and downwards; the gantry bridge having a first extendable gantry support leg and a second extendable gantry support leg; the extendable gantry support legs are connected to microcontrollers and the computing system controller; the gantry bridge having a trolley system; the trolley system comprising at least one track frame and at least one trolley track rail and at least one trolley; the gantry bridge having at least one gantry accessory arm; multiple sensors, which are connected to the computing system controller; whereby the trolley system allows for moving a first item or tool along the gantry bridge; and the at least one accessory arm allows for moving a second item or tool and while the computing system and multiple sensors maintain that the gantry bridge is parallel to the ground by directing the microcontrollers to adjust said extendable gantry support legs; the gantry bridge has a bridge conveyor belt system with a plurality of conveyor accessory arms, which run along the gantry bridge, whereby the bridge conveyor belt system allows for moving a third item or tool along the gantry bridge; the chassis is able to float and move in water; the multiple sensors and the computing system determine weight load on the trolley and the gantry bridge and send instructions for adjustments to the gantry bridge to distribute weight load between the extendable gantry support legs; the chassis platform has wheels, tracks or outrigger legs; the gantry bridge has multiple bridge portions and is expandable and collapsible; and the at least one accessory arm can hold a tool, a gripper attachment, construction materials or supplies, a tank or a concrete mixers; and said accessory arm is motorized; the trolley has a trolley accessory arm, which can hold a tool, a gripper attachment, construction materials or supplies, a tank or a concrete mixers; and said trolley accessory arm is motorized; the first extendable gantry support leg further comprises a rotating wheel attachment connector; the rotating wheel attachment connector can attach a wheel, a foot plate, a outrigger boom, a clamp or a suction cup; the gantry bridge employs a linear X, Y and Z computer controlled gantry with an extended gantry trolley and at least one robotic arm attachment; the extendable gantry support legs are connected to hydraulic pistons and risers to help adjust elevation and angle of the gantry bridge; and the adjustable boom comprises a boom microprocessor and a boom sensor.

DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIG. 10 is an enlarged schematic perspective view of a portion of the apparatus illustrating the linear robotic trolley and electromechanical robotic arm. The drawing also illustrates the concrete additive nozzle and brick scanning sensor.

FIG. 24 is an enlarged schematic perspective view of the apparatus in FIG. 1 illustrating a wheel support attachment with a motor.

FIG. 75 is a schematic front view of an alternative embodiment of the invention.

FIG. 76-78 are a schematic perspective views of an alternative embodiments;

FIG. 78 shows side panels of the truck removed, which illustrate equipment and control rooms;

PARTS LIST

Figure 1:
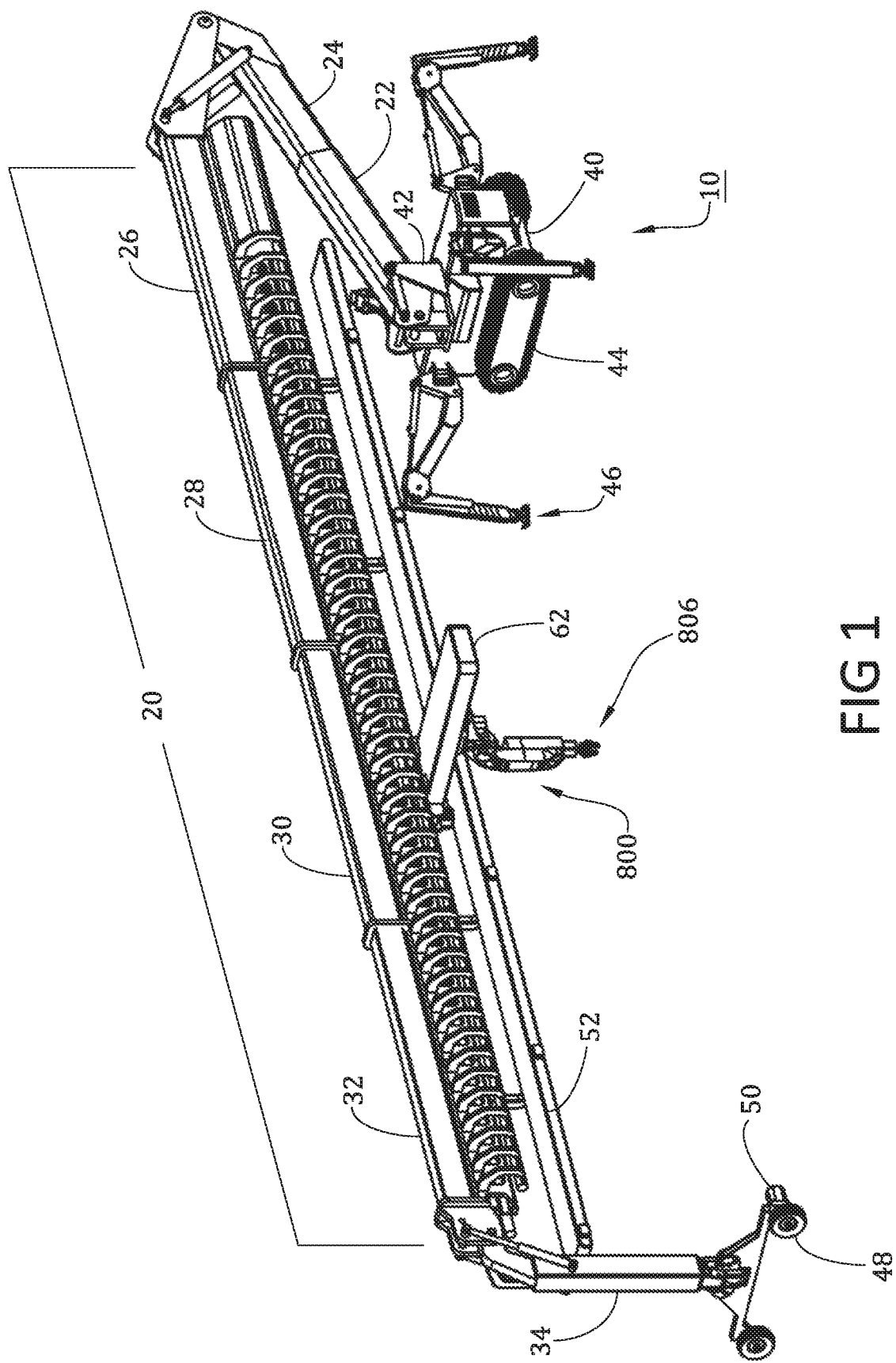
FIG. 1 is a schematic perspective view of an extended Construction Boom Lift Gantry with a Support Structure Leg and a Linear Robotic Arm which incorporates a presently preferred embodiment of the invention.
Figure 2:
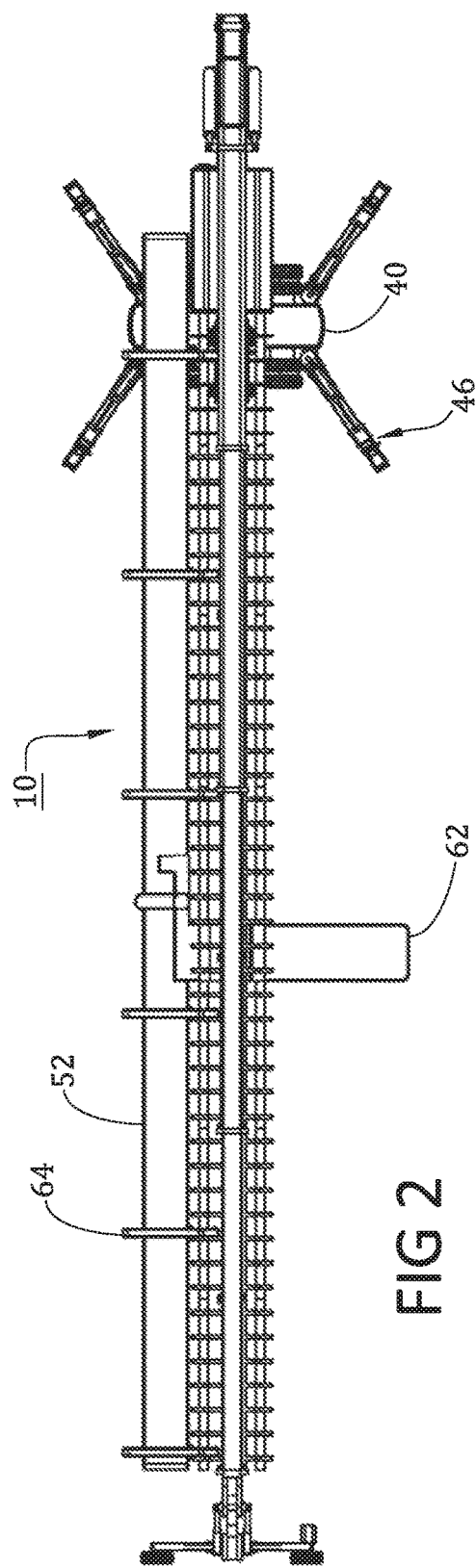
FIG. 2 is a schematic top plan view of the apparatus of FIG. 1.

10—Presently preferred embodiment—Movable Gantry Robot
20—Bridge of the Gantry
22—Lower Turret Boom Riser
24—Extendable Boom
26—Extendable Bridge Boom sections of the Gantry
28—Extendable Bridge Boom sections of the Gantry
30—Extendable Bridge Boom sections of the Gantry
32—Extendable Bridge Boom sections of the Gantry
34—Support Jib Boom Leg
36—Extendable Support Jib Boom
38—Extendable Support Jib Boom
40—Main Chassis
42—Turret
44—Crawler Tracks
46—Outrigger Legs
48—Wheels
50—Motor
52—Bridge Conveyor Belt
54—Hydraulic Pistons
56—Hydraulic Pistons
58—Hydraulic Pistons
60—Trolley Track Frame and Rails
62—Extended Trolley
64—Accessory Arms
66—Touch Control Panel Display
68—Drag Chain Cable Carrier
70—Rack and Pinion System
72—Gripper Attachment
74—Extendable Arm
76—Lower Pivot Arm
78—Upper Pivot Arm
80—Rotating Base
82—Motor
84—Camera and Sensor
86—Dual Track Rails
88—Drag Chain Cable Carrier
90—Additive Material Nozzle
92—Hoist Attachment
94—Blade
96—Excavation Bucket
98—Trolley Wheels
100—Simplified Trolley
102—Linear Local Y Axis Track
104—Trolley Wheels
106—Chain Cable Channel
108—Hydraulic Pistons
110—Forklift Attachment
112—Local Depth Reach Area
114—Hydraulic Arm Reach Area
116—Footing Plates
118—Outrigger Boom riser
120—Extendable Outrigger boom
122—Wheel Attachment Connector
124—Bolt Hole
126—Excavating a Pool
128—Excavating Drainage, Utility Lines, Septic Lines, or Ditches
130—Pouring of the foundation wall
132—Additive fabrication of the foundation border
134—Drilling Pillar Supports and Pouring Concrete
136—Excavating the foundation footer
138—Spray Mark
140—Placement of wood beams
142—Additive fabrication of the basement slab wall
144—Pouring of the basement slab
146—Spray Marking Nozzle with a Paint Storage Tank
148—Wide Wheel Mount
150—Boulder
152—Cables
154—Pulley Block
156—Framing
158—Moveable Angled Conveyor Belt
160—Siderail Trough
162—Precision placement concrete spacer blocks
164—Dirt Funnel
166—Second Level of a Building
168—Conveyor Belt Support Arm
170—Digging Capabilities of Robotic Arm
172—The Device Can Grade a Path to Move Along
174—Brick
176—Vertical Conveyor Belt
178—Higher Brick Pusher
180—Lower Brick Pusher
182—Excavating a Basement
184—Floating Platform
186—Sea Wall
188—Trailer Bed
190—Stabilizing Poles
192—Water
194—Excavate Sea Wall Foundation
196—Screw-Drive and Mixing module
198—Additive Fabrication Nozzle
200—Screw-Drive and Mixing Module on the Trolley
202—Tube
204—Tubing Support Beam
206—Baseboard
208—Roof Framing
210—Pallet
212—Cherry Picker Attachment
214—Personnel Bucket
216—Roof Tiles or Solar Tiles/Panels
218—Roof
220—Rototiller Blades
222—Hoist Wheel
224—Lower Conveyor Belt
226—Delivery Conveyor Belt
228—Walls
230—Accessory Support Leg
232—Metal Supports
234—River Bank
236—Electrical Source
238—Anchor Supports
240—Heavy Prefab Elements
242—Equipment and Compressor Room
244—Control Room
246—Outrigger Jack Support Legs
248—Lumber
250—Mid-Support Cantilever Leg
252—Pull Out Rails 254—Application Nozzle Arm
256—Application Upper Arm
258—Work Stations
260—Concrete Slab
262—Local Wireless Network
264—Lower Dirt Funnel
266—Alternative Trolley and Track System
268—Alternative Tires
270—Alternative Outriggers
272—Spray Painting Nozzle without a paint storage tank
700—Perimeter Y Axis Platform Reach Area
702—Local Trolley Platform Reach Area
704—Cross Bridge X Axis Platform Reach Area
800—Electromechanical Robotic Arm
802—Alternative Multi-Axis Robotic Arm
804—Implement Connector for Mechanical Arm
806—Implements
808—Implement Connector for Hydraulic Arm
810—Hydraulic Robotic Arm
812—Trolley Chassis
900—Alternative Embodiment of the Device
902—Another Alternative Embodiment of the Device

DETAILED DESCRIPTION

Figure 6:
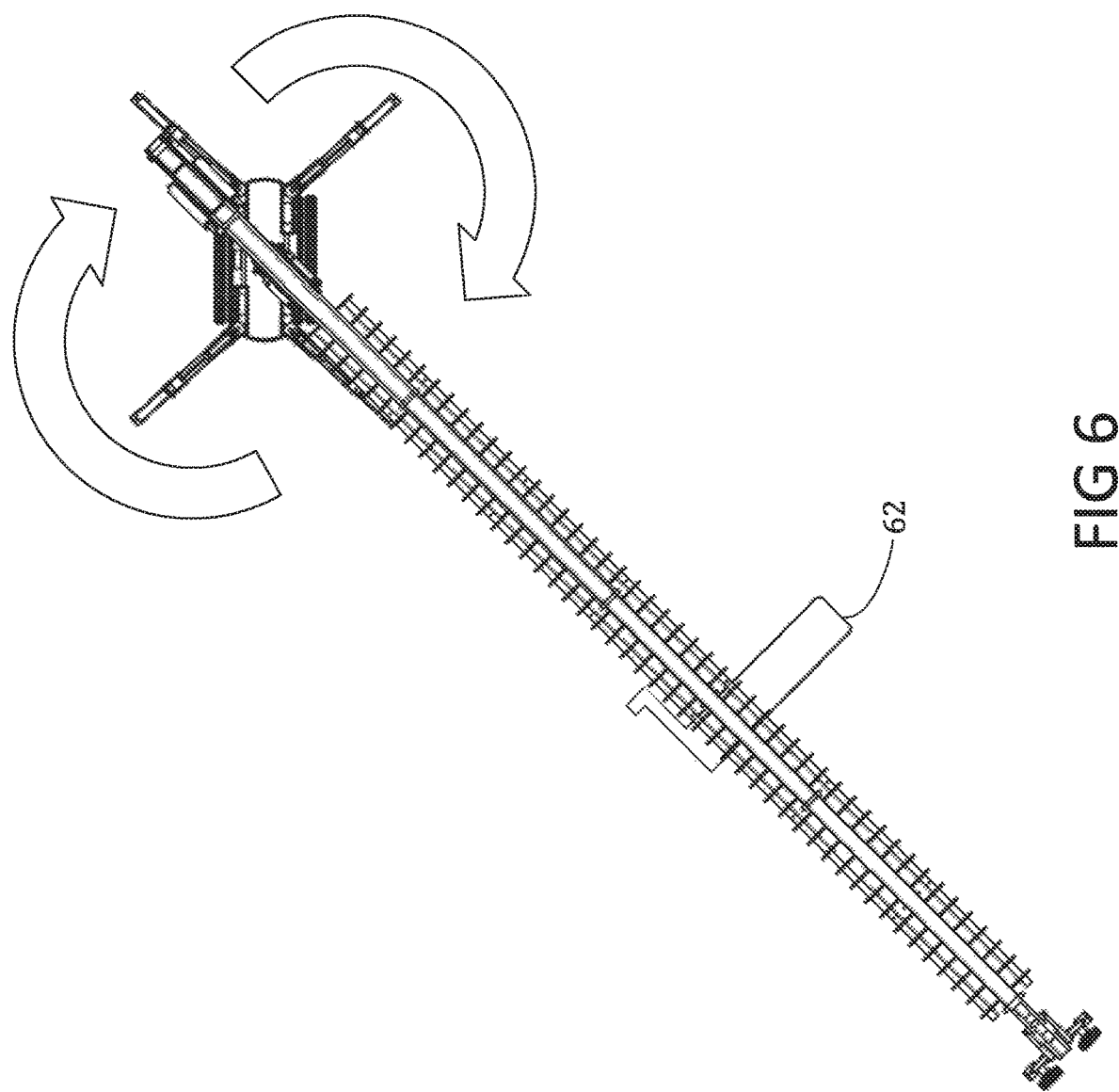
FIG. 6 is a schematic top view of the apparatus of FIG. 1 illustrating the 360-degree movement of the cross-beam bridge holding the trolley and robotic arm.
Figure 40:
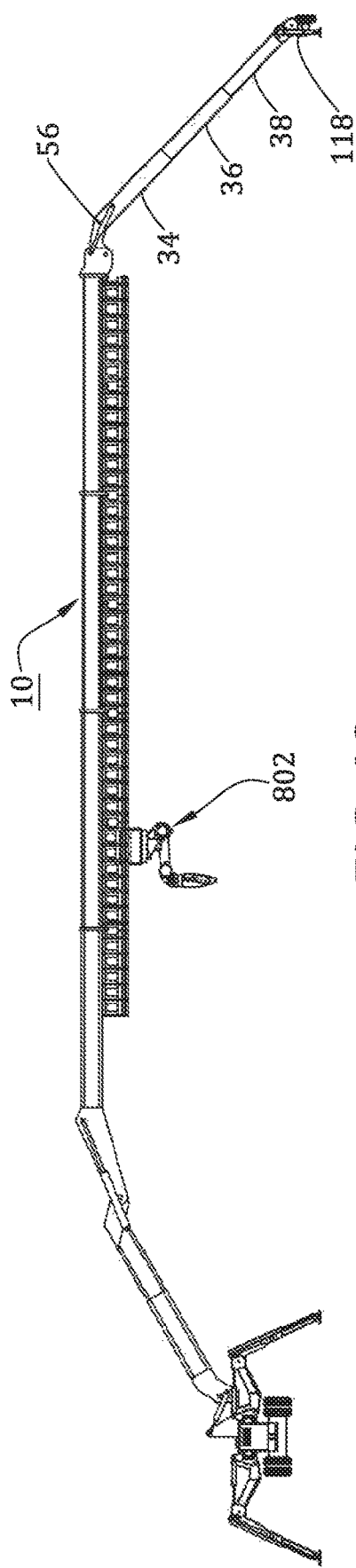
FIG. 40 is schematic side view of the apparatus of FIG. 1 illustrating the boom arm configuration to show the extended reach of the boom arm.
Figure 41:
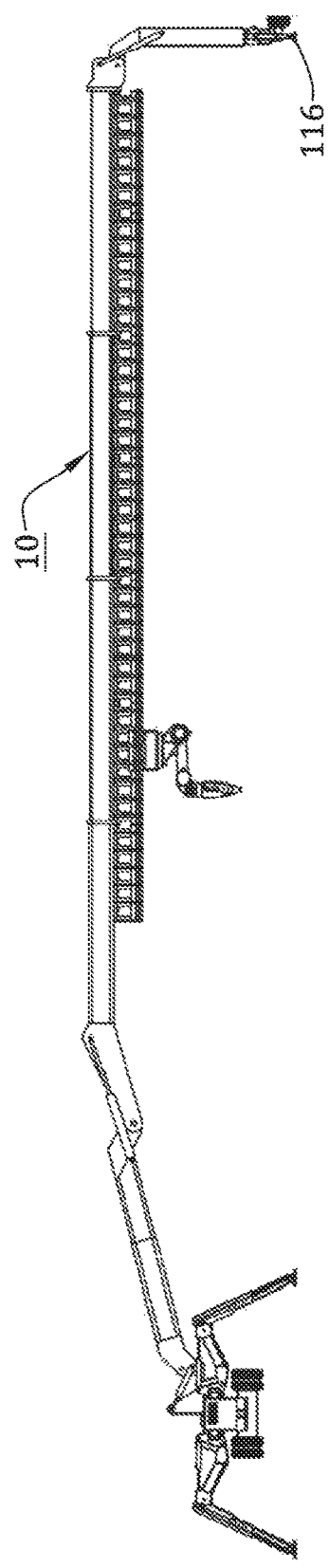
FIG. 41 is a schematic side view of the apparatus of FIG. 1 illustrating a different boom arm configuration.
Figure 42:
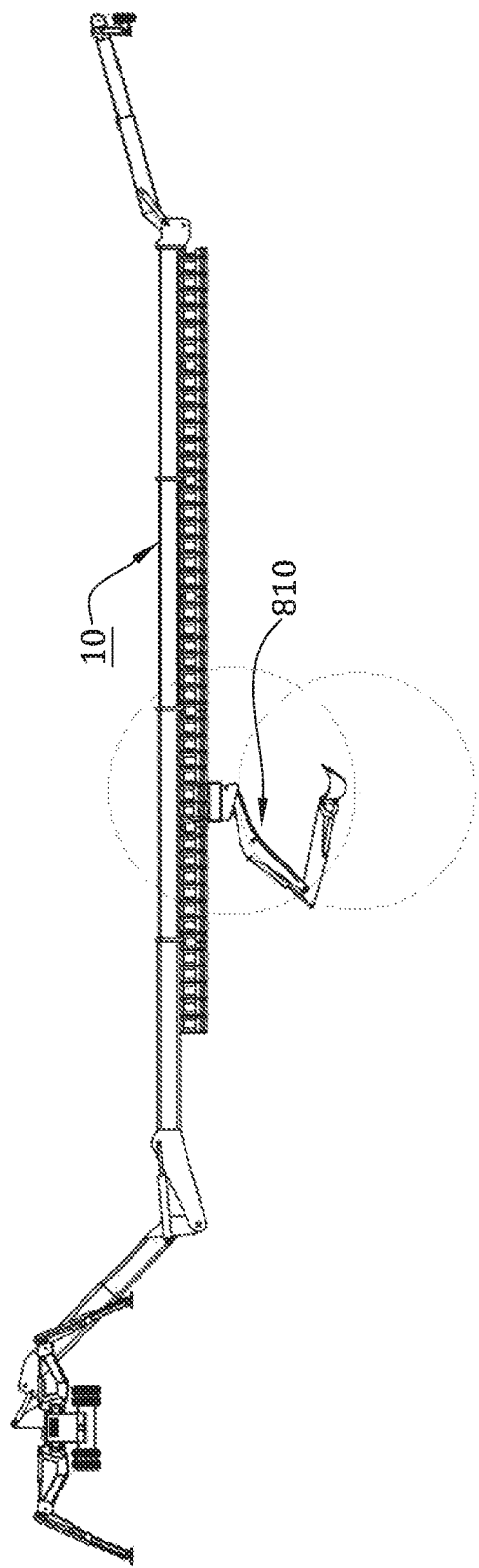
FIG. 42 is a schematic side view of the apparatus of FIG. 1 illustrating another boom arm configuration.
Figure 53:
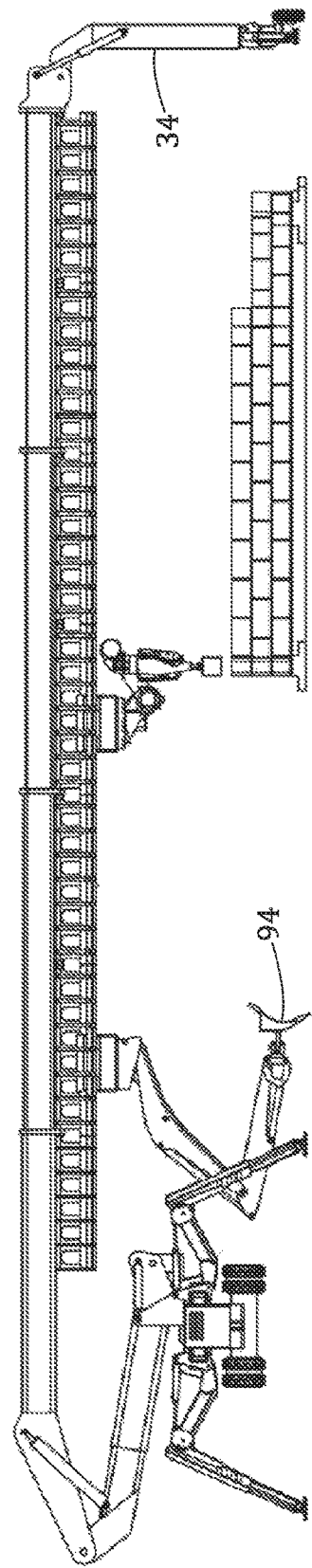
FIG. 53 is a schematic front view of the apparatus in FIG. 1 illustrating the apparatus in use building a brick wall with the robotic arm. Also illustrated, is the hydraulic arm with the construction blade tool attached.
Figure 54:
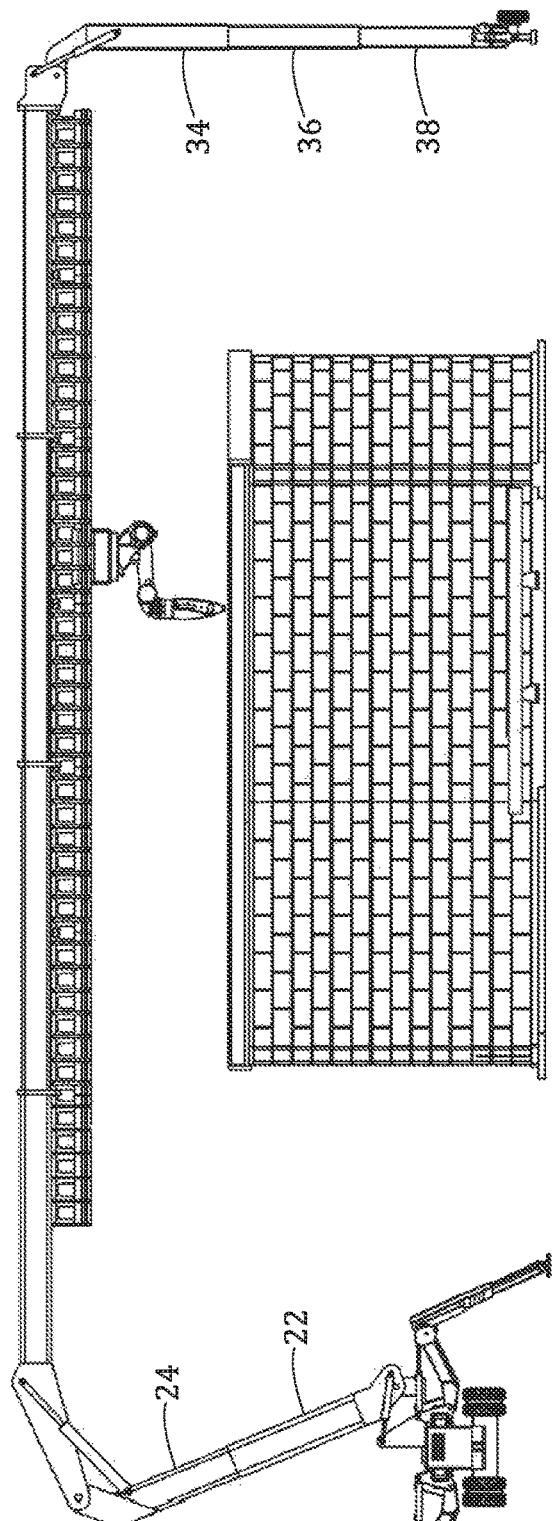
FIG. 54 is a schematic side view of the apparatus in FIG. 1 illustrating the raised height of the gantry due to the configuration of the beams and support legs.

FIGS. 1,2,3,4 and 5 illustrates the presently preferred embodiment 10 of the invention. The drawings illustrate a portable and expandable gantry with robotic arm attachments and implements 806 to oversee construction and assembly procedures. The bridge of the gantry 20 is made up of extendable bridge boom sections of the gantry 26, 28, 30 and 32. The main chassis 40 is connected to a lower turret boom riser 22 by a turret 42 that can be mechanically controlled to rotate 360 degrees as shown in FIG. 6. The lower turret boom riser 22 can pivot upwards as well as extend outward with the extendable boom 24 to increase the height of one side of the gantry. On the other side of the gantry bridge is a support jib boom leg 34 that can pivot from the extendable bridge boom section of gantry 32 shown in FIGS. 1, 18, 19, and 20. The support boom leg can articulate creating different gantry configurations which can be seen in FIGS. 40, 41, and 42. The support leg has Extendable Support Jib Booms 36 and 38 as in FIG. 54 which will raise support leg side of the gantry. In comparison, FIG. 53 has Extendable Support Jib Boom 36 and 38 that are un-extended. The gantry can be raised to perform construction procedures on upper levels. The support jib boom leg 34 can be locked to the bridge at specified angles by the hydraulic pistons 56 in FIG. 3, with cross bars and bolts, or by other mechanical means for locking beams in place.

Figure 3:
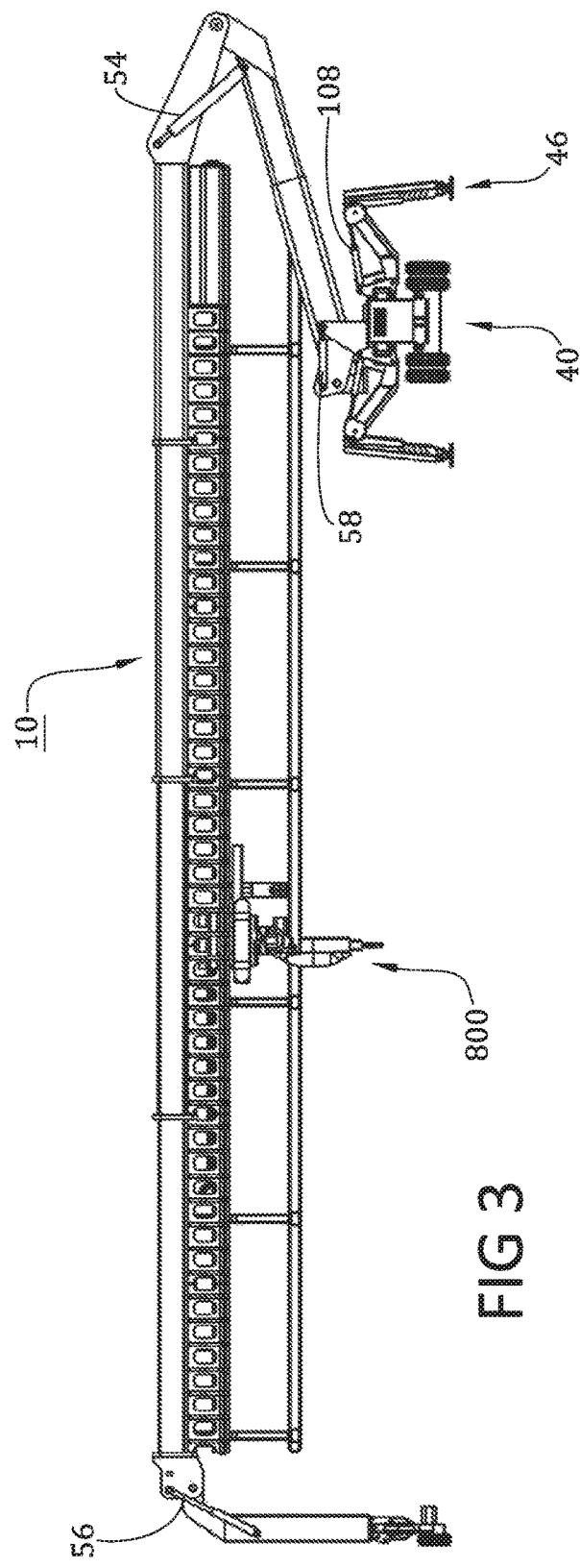
FIG. 3 is a schematic front view of the apparatus of FIG. 1.

The controller, CPU (computing processing unit), memory, and operating software reside inside the main chassis 40. Along with sensors throughout the device, the controller will insure that the bridge of the gantry 20 is parallel to the ground by directing microcontrollers to extend booms as well as change angles on risers through hydraulic pistons 54, 56, and 58 as shown in FIG. 3. The sensors and controller also can determine the weight load on the trolley and gantry and will determine what adjustments to the gantry are needed to distribute the weight load efficiently between the 2 gantry legs. The invention can be manually controlled by a touch control panel display 66 on the side of the main chassis 40 as in FIGS. 4 and 32. Or, be automated and controlled by software and applications. The device can also have autonomous functionality and an artificial intelligence or machine learning by using sensors to send data to the on-board processor to determine how to proceed with a project. For the software, there is a plurality of software that can be developed for the device including 3D software, management software, robot navigation and device software/machine code, and mobile applications. A presently preferred 3D program will integrate 3D terrain maps from 3D Digitize and scanning equipment with architectural program files as well as create fabrication plans, machining and tooling files, and export machine code for the devices to follow. The management application will determine the implements to be utilized and will be able to accurately calculate each project's timeline to completion. This will improve the efficiency of the contractor/technician in coordinating suppliers and workers for the different construction tasks The management software can calculate the amount of material that will be utilized through the additive fabrication nozzle and brick application nozzle which will save the cost on concrete and other additive materials. The operating system software and event applications reside in the computer within the main chassis 40 and will control the device according to the fabrication plan. Various ports on the onboard computer may include USB, SD, and HDMI. External memory may be added for added functionality.

The chassis has wireless features including without limitation: BT/BTLE, LFRF, RFID, WiFi, and telecommunication capabilities. This allows the device to connect to the internet, cloud, and local wireless networks 262 in FIG. 9, as well as to various sensors, peripheral devices, workers, and the main control computer of the technician/contractor. The device can also be the local hub and network for the jobsite and will be able to connect with each of the workers and keep track of them geo-spatially within the worksite.

Material can be RFID tagged or barcoded and be delivered directly to the worker at his/her request or as per the contractor's schedule. Cell phones or wireless devices can connect to a local network allowing the workers to communicate with each other as well as with the main control center and device. Safety will be improved with the wireless system and various sensors can keep track of the locations of the workers, equipment, implements, and supplies. The device will safely clear walkways, move debris out of paths for the workers, and only operate when workers are safely away from the fabrication area of the device. The device will also reduce worker injuries by overseeing the more strenuous and repetitive tasks directly as well as moving heavy equipment and supplies directly to the worksite locations.

Sensors and peripheral devices include cameras, RFID devices, geo-spatial positioning sensors, GPS, GNSS, geo-referenced control points, terrestrial LiDAR scanning devices, radar equipment, survey equipment, land penetrating scanners, object detection sensors, barcode readers, drones, scales, hoists, spray painting modules, additive printing modules, concrete mixers and screw drives, smart implements, trolleys, motors, microcontrollers, hydraulics, and other automated equipment and robotic devices. From sensors on the legs, robotic arm and gantry, measurements can be sent to the controller that provides control data to the robot to lay the bricks, excavate the hole, or extrude material at predetermined locations. The measuring system measures in real time the position of the implement and produces position data to the controller. The controller produces control data on the basis of a comparison between the position data and a predetermined or pre-programmed position of the head to lay the brick at a predetermined position for the building under construction. Scanners can determine the location of the implements and can also detect underground utilities and objects. This sonic or total station technology can accurately position the blade or bucket in real time. There are even sensors on the implements to determine excavating hazards as well as keeping workers safe.

With the use of sensors and the internal computer system of the devices, software will allow the device to learn how to optimize tasks and to autonomously connect jobsites as well as perform tasks. The smart management system will be able to coordinate workers, suppliers, and peripheral equipment. The device has artificial intelligence and machine learning capabilities. The device will also oversee performance and set up quality control checkpoints. Through sensors, a site can be checked thoroughly during or after each task is performed and analyzed by the device's computer system.

Figure 4:
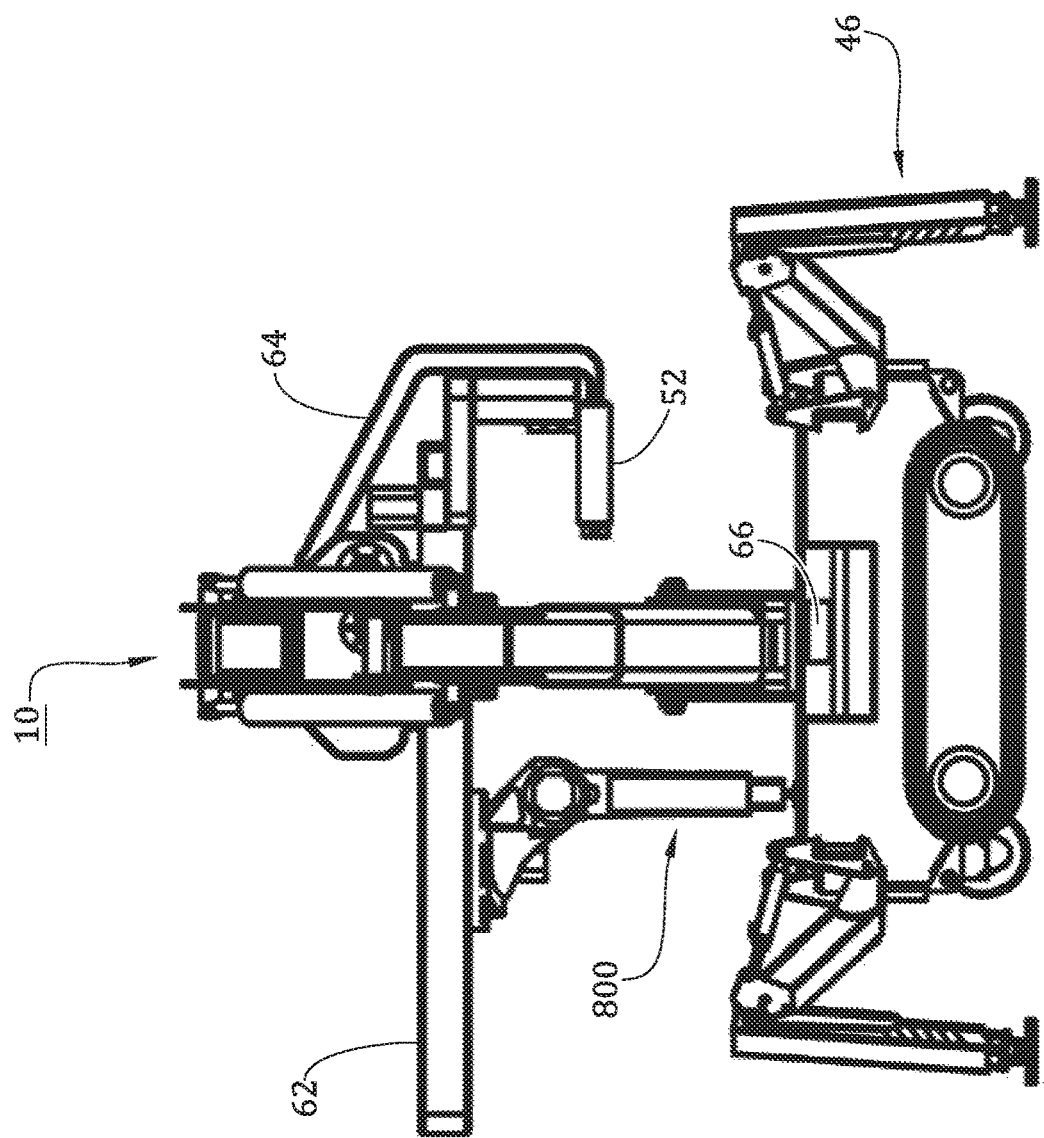
FIG. 4 is a schematic side view of the apparatus of FIG. 1.
Figure 5:
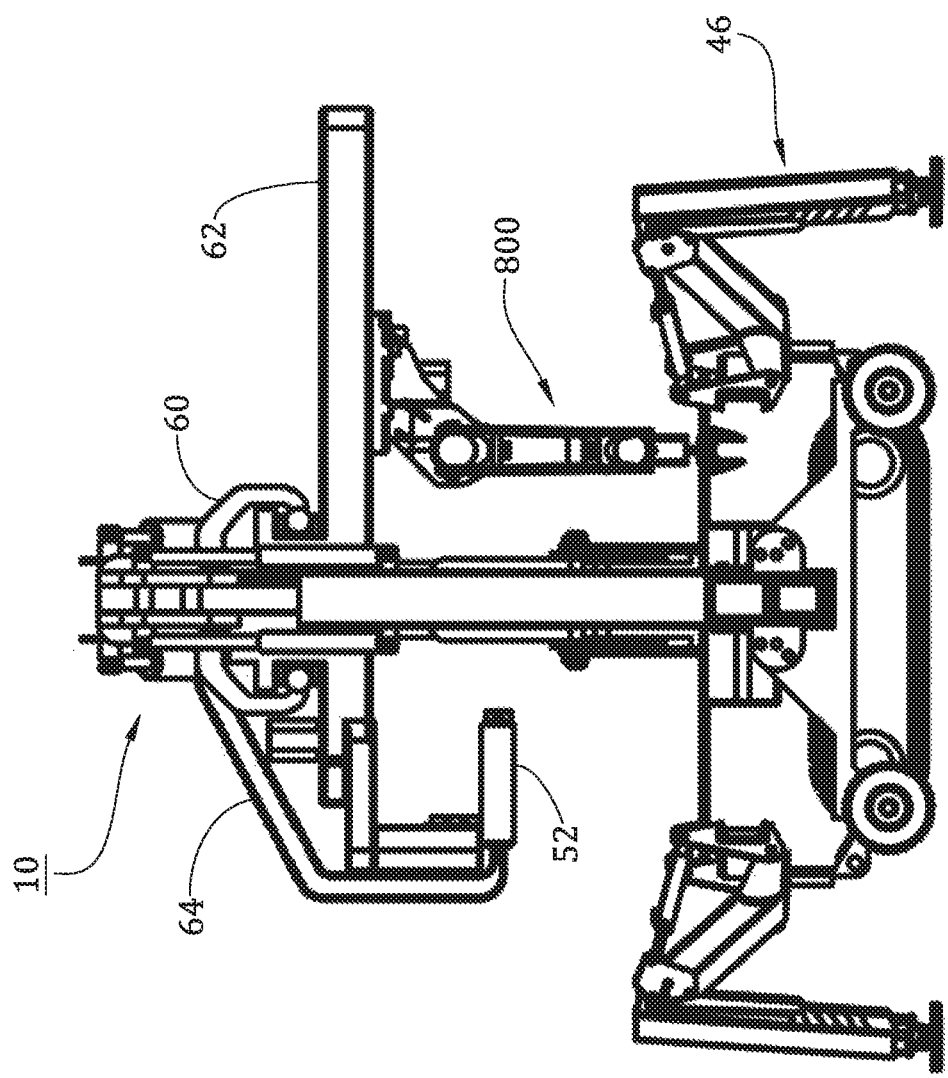
FIG. 5 is a different schematic side view of the apparatus of FIG. 1.
Figure 7:
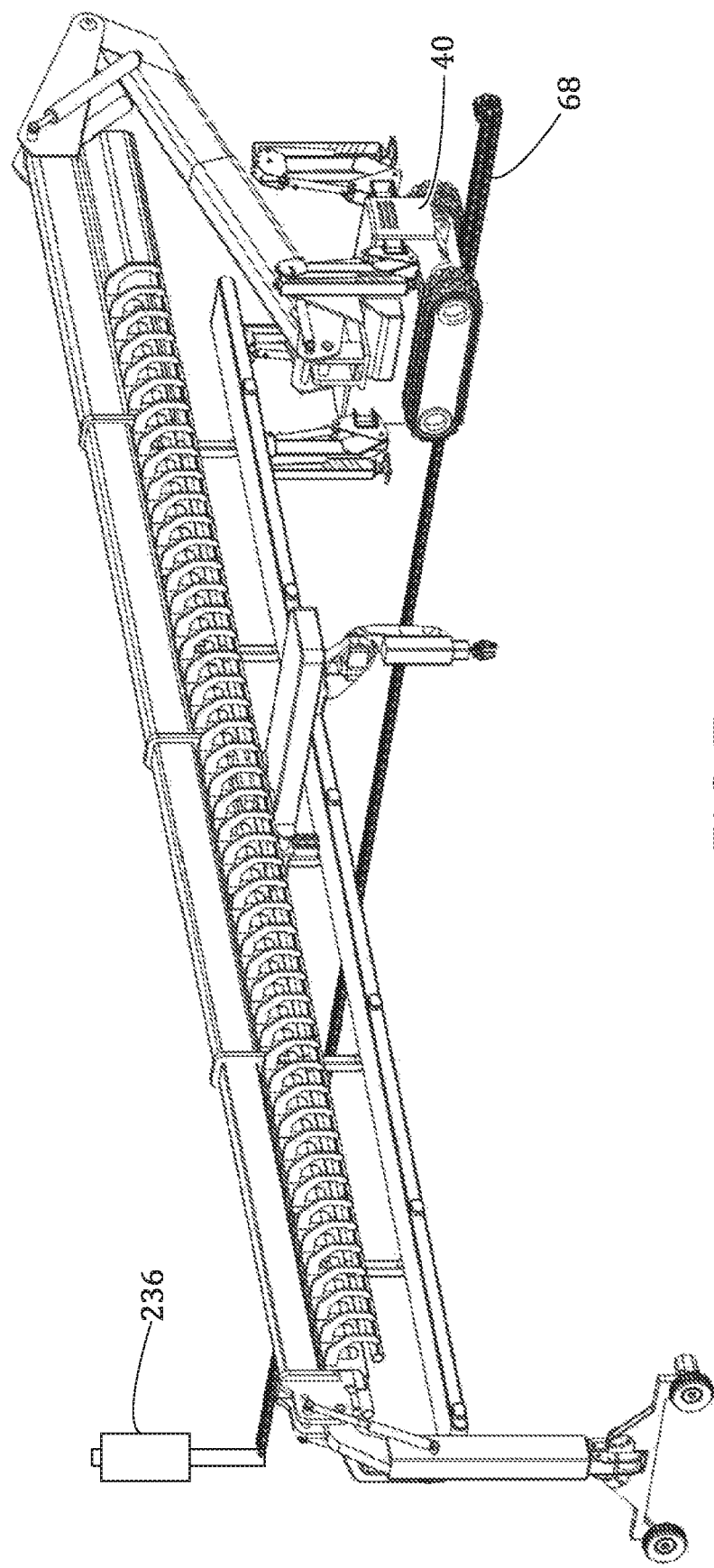
FIG. 7 is a schematic perspective view of the apparatus in FIG. 1 illustrating a presently preferred embodiment of an electrical power system for the apparatus.
Figure 32:
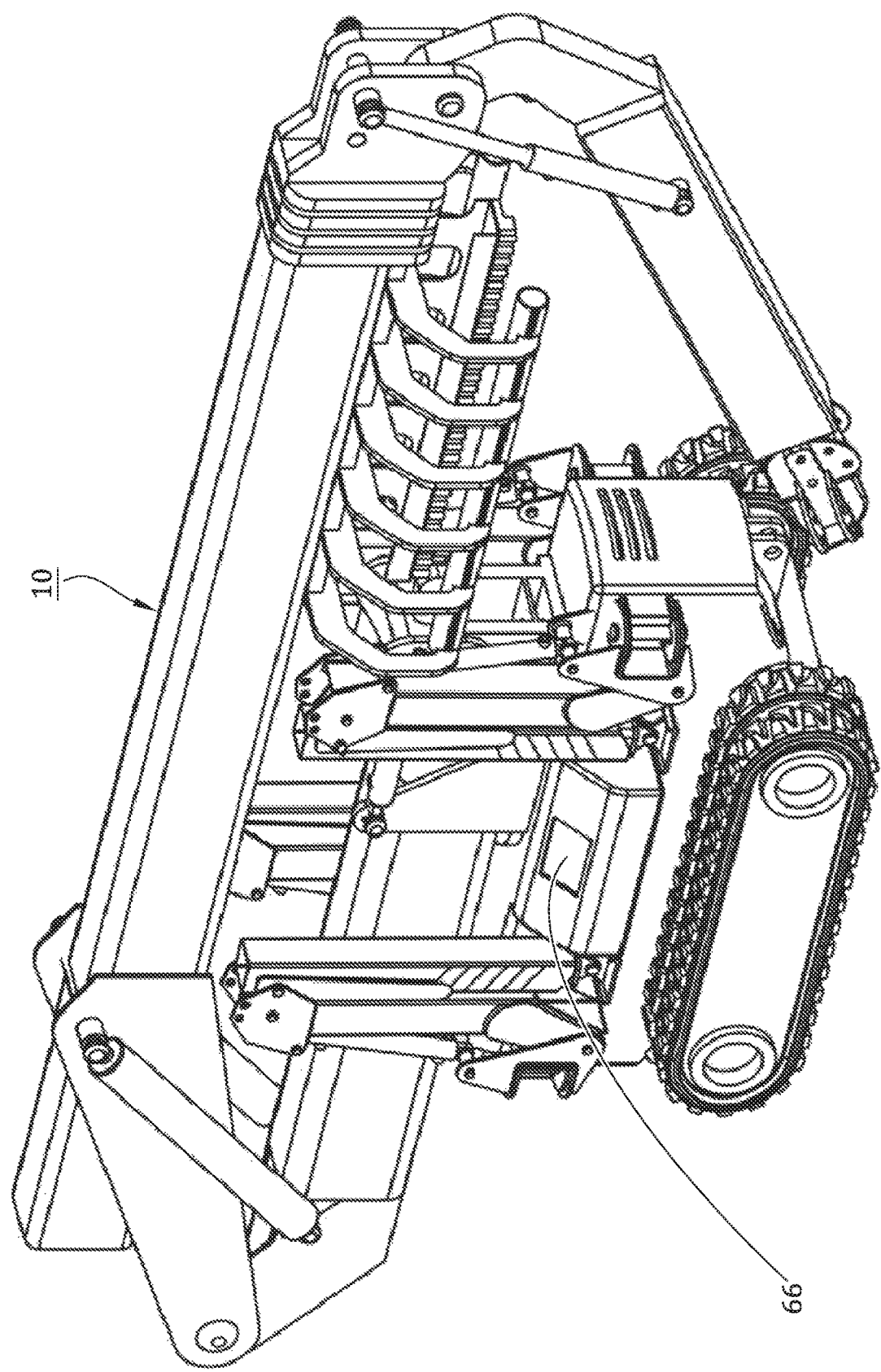
FIG. 32 is a schematic perspective view of a folded and unextended apparatus of FIG. 1.

There is a touch control panel display 66 shown in FIGS. 4 and 32 which is the user interface to operate the device manually as well as set up the network and communications with the technician, workers, and other electronic devices. The main chassis 40 can be powered by a combustible engine, battery, or in this presently preferred embodiment powered by electricity and connected to the power supply via a drag chain cable carrier 68 to an electrical source 236 as shown in FIG. 7. Various embodiments of the device can include individual or hybrid systems encompassing a single energy source or any combination of energy sources including, but not limited to, electricity from an onboard generator, gasoline, natural gas, propane, battery, electric, solar or hydro power. Electrical lines, hydraulic tubes, additive material tubes, water tubes and compressed air tubes are carried out to the trolley inside a drag chain cable carrier 88 in FIG. 8.

The main chassis 40 moves on crawler tracks 44 in FIG. 1 and can be supported by outrigger legs 46. The outrigger legs are extended by hydraulic pistons 108 and can rotate as well as extend to give more stability to the main chassis 40 as shown in FIGS. 28, 29, 30, and 31. Other embodiments may include other propulsion mechanisms such as wheels or robotic legs to propel device forward and backward. Robotic legs or wheels could be able to rotate which would allow for omni-direction movement. The device could also run on a track and utilize v groove wheels. An alternative to the preferred outrigger leg would be an outrigger jack support leg 246 in FIG. 78 which can extend outwards and then downwards to add stability to the chassis. For extreme situations, the chassis and support leg could be fastened to the ground with poles, stakes, or cables. Counter weights could also be attached to the beams to allow for the boom arm to lift heavier objects when the support leg is not being utilized.

Figure 23:
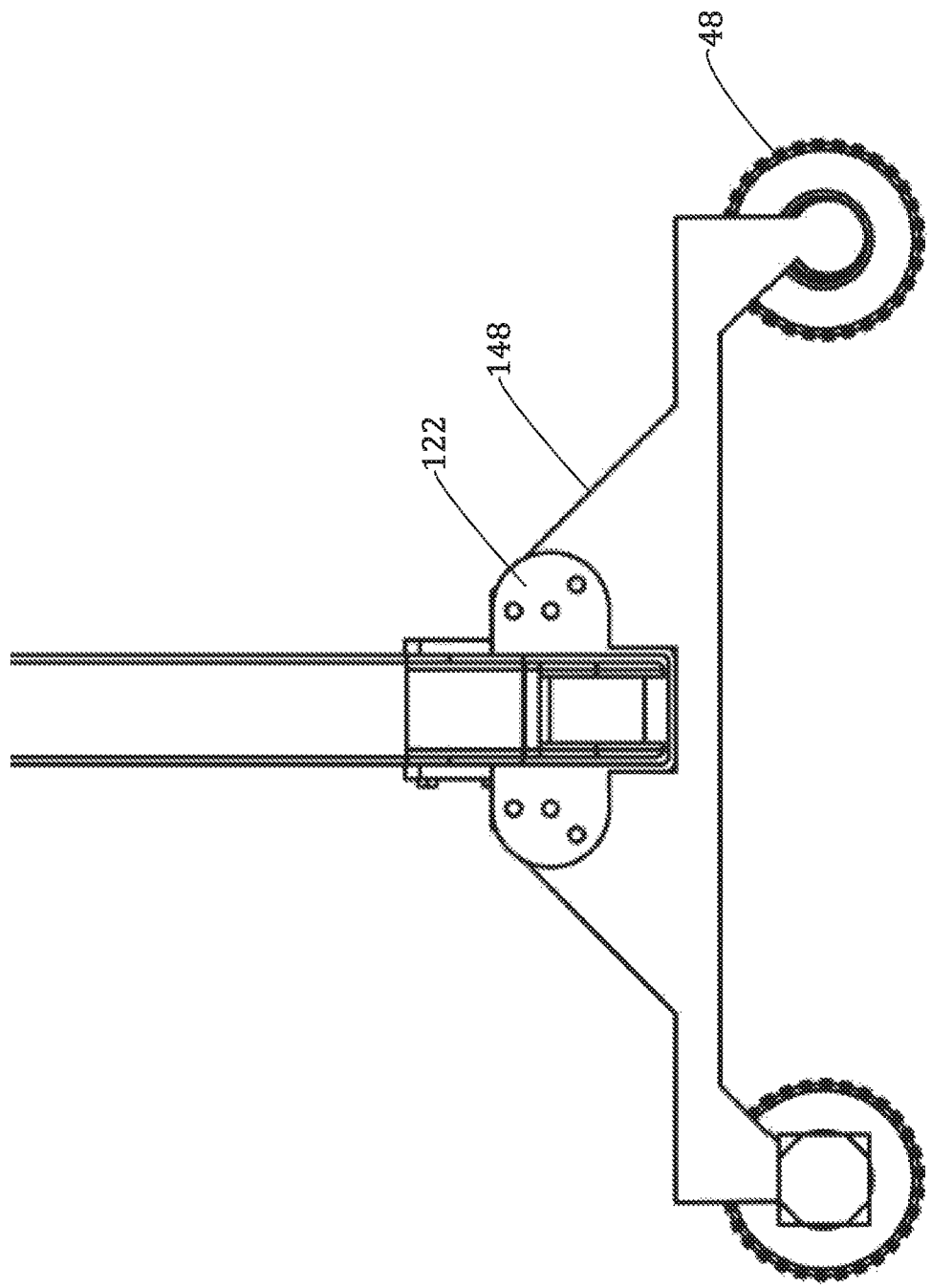
FIG. 23 is an enlarged schematic side view of the apparatus in FIG. 1 illustrating a wheel support attachment.
Figure 26:
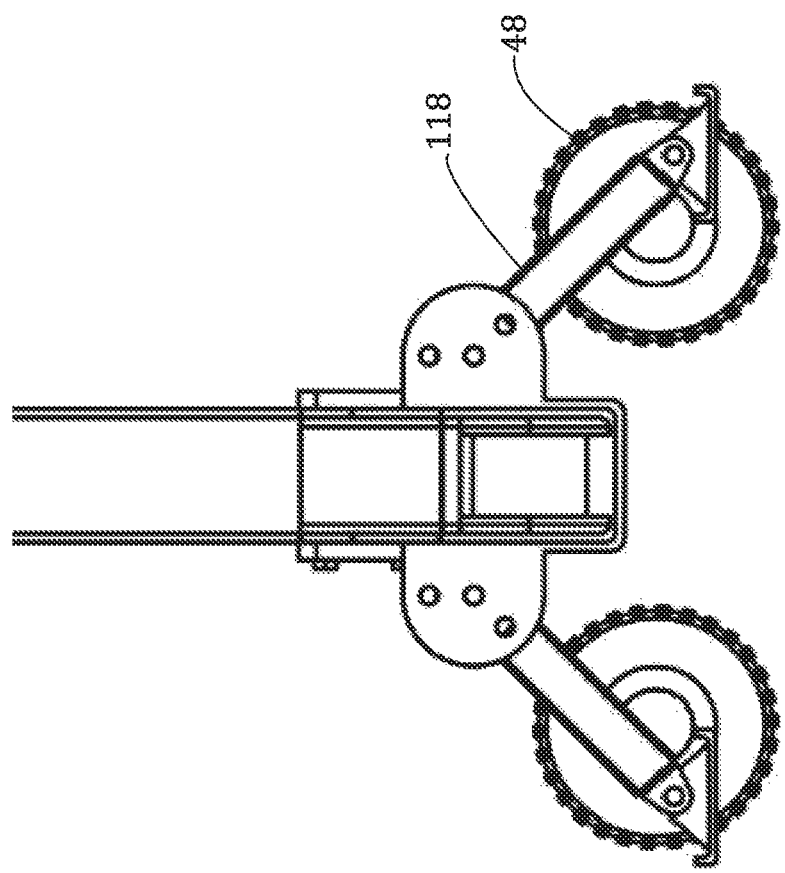
FIG. 26 is an enlarged schematic side view of the apparatus in FIG. 1 illustrating an open configuration of the support beam's wheel/outrigger attachment with the wheel being the main support.
Figure 25:
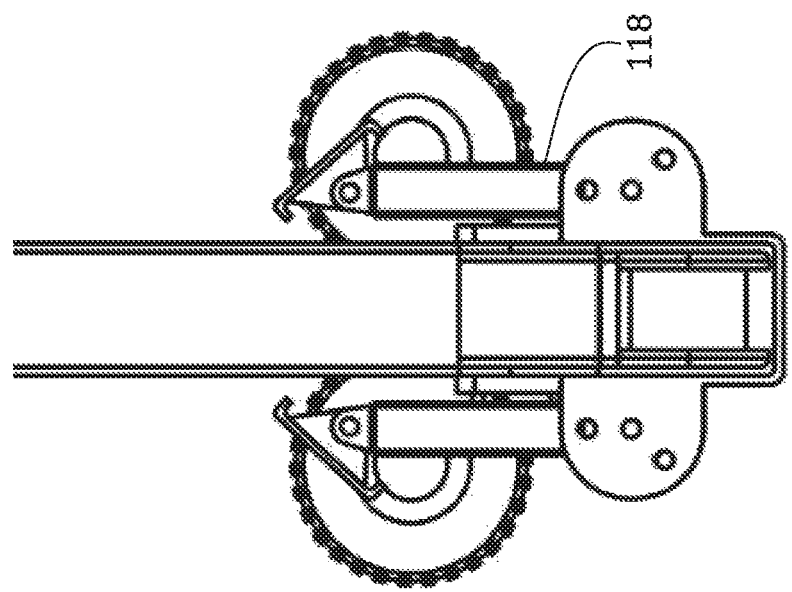
FIG. 25 is an enlarged schematic side view of the apparatus in FIG. 1 illustrating a closed configuration of the support beam's wheel/outrigger attachment.
Figure 27:
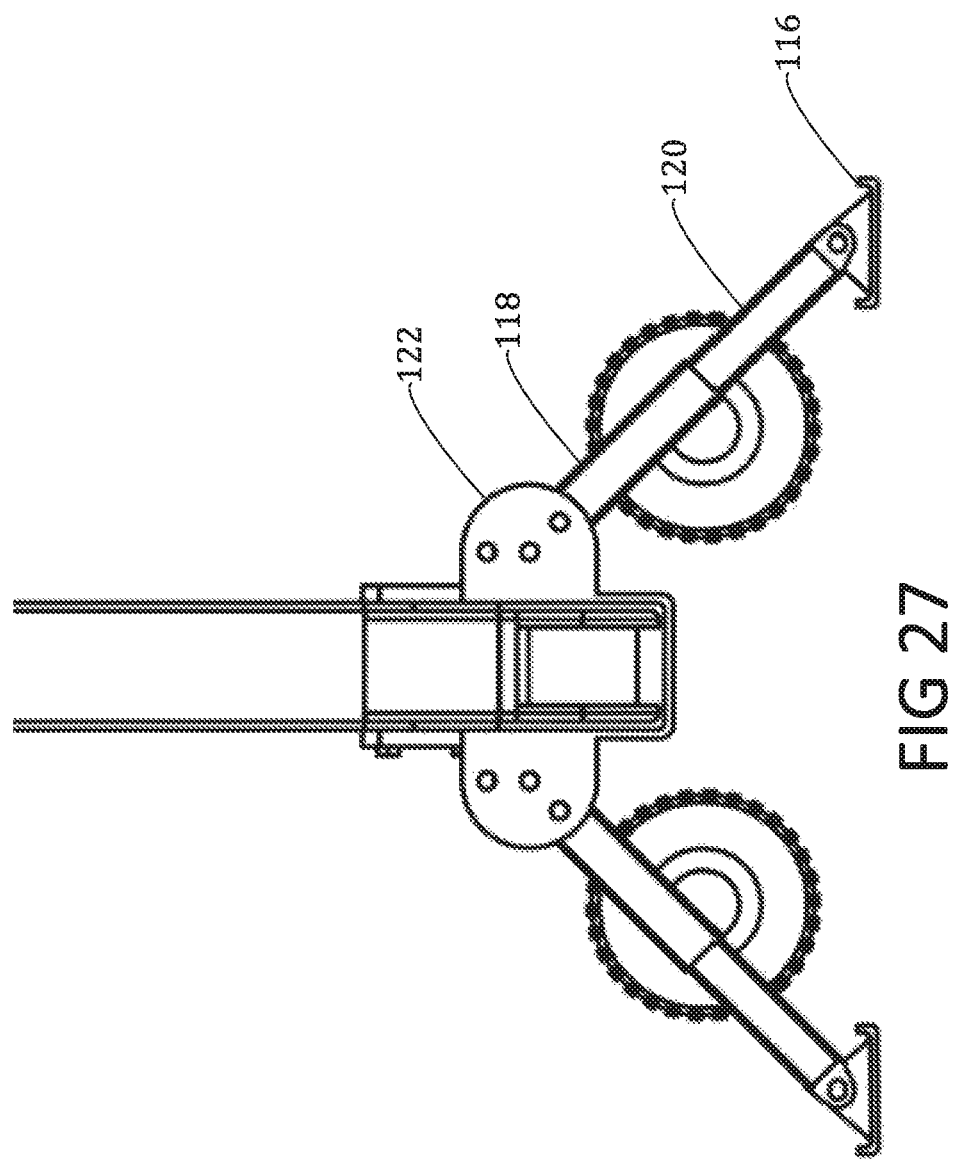
FIG. 27 is an enlarged schematic side view of the apparatus in FIG. 1 illustrating an open configuration of the support beam's wheel/outrigger attachment with the outrigger's foot pad being extended.
Figure 29:
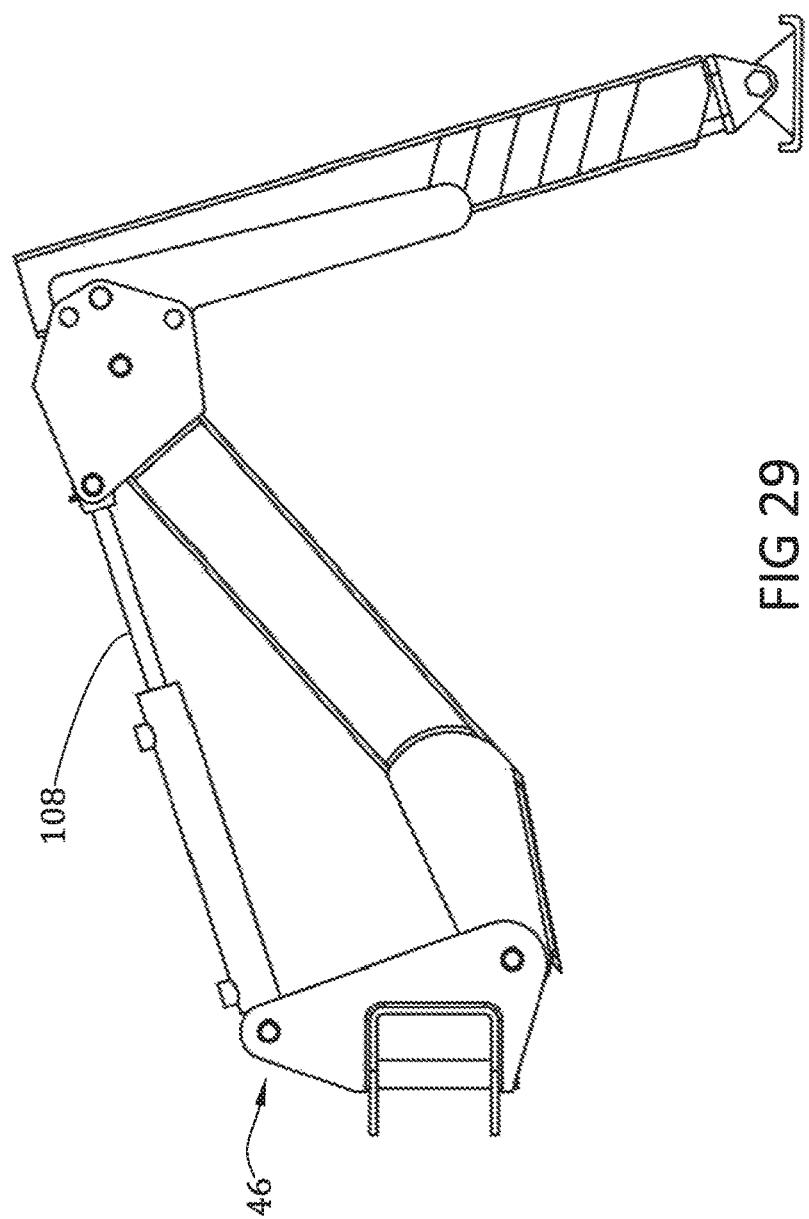
FIG. 29 is a schematic plan view of a chassis leg outrigger in the unfolded and unextended configuration.
Figure 28:
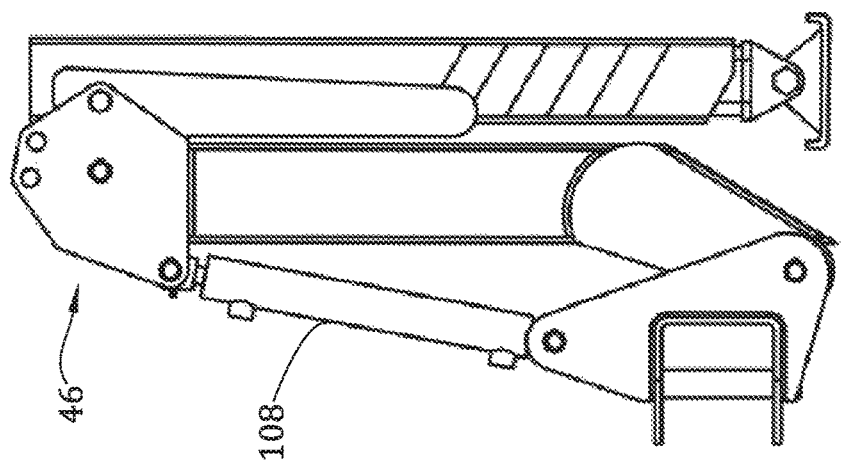
FIG. 28 is a schematic plan view of a chassis outrigger in the folded and unextended configuration.
Figure 30:
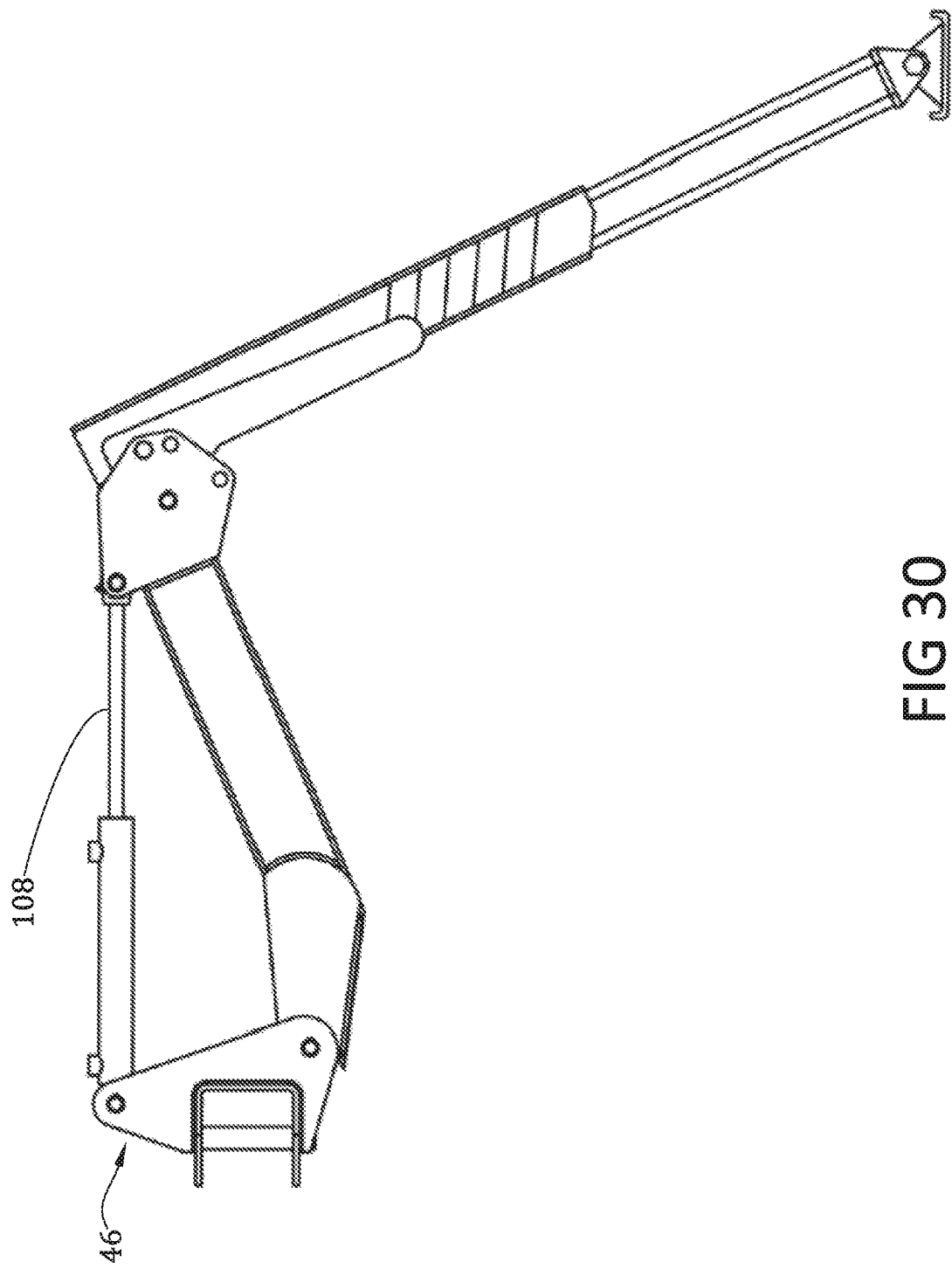
FIG. 30 is a schematic plan view of a chassis leg outrigger in the unfolded and extended configuration.
Figure 31:
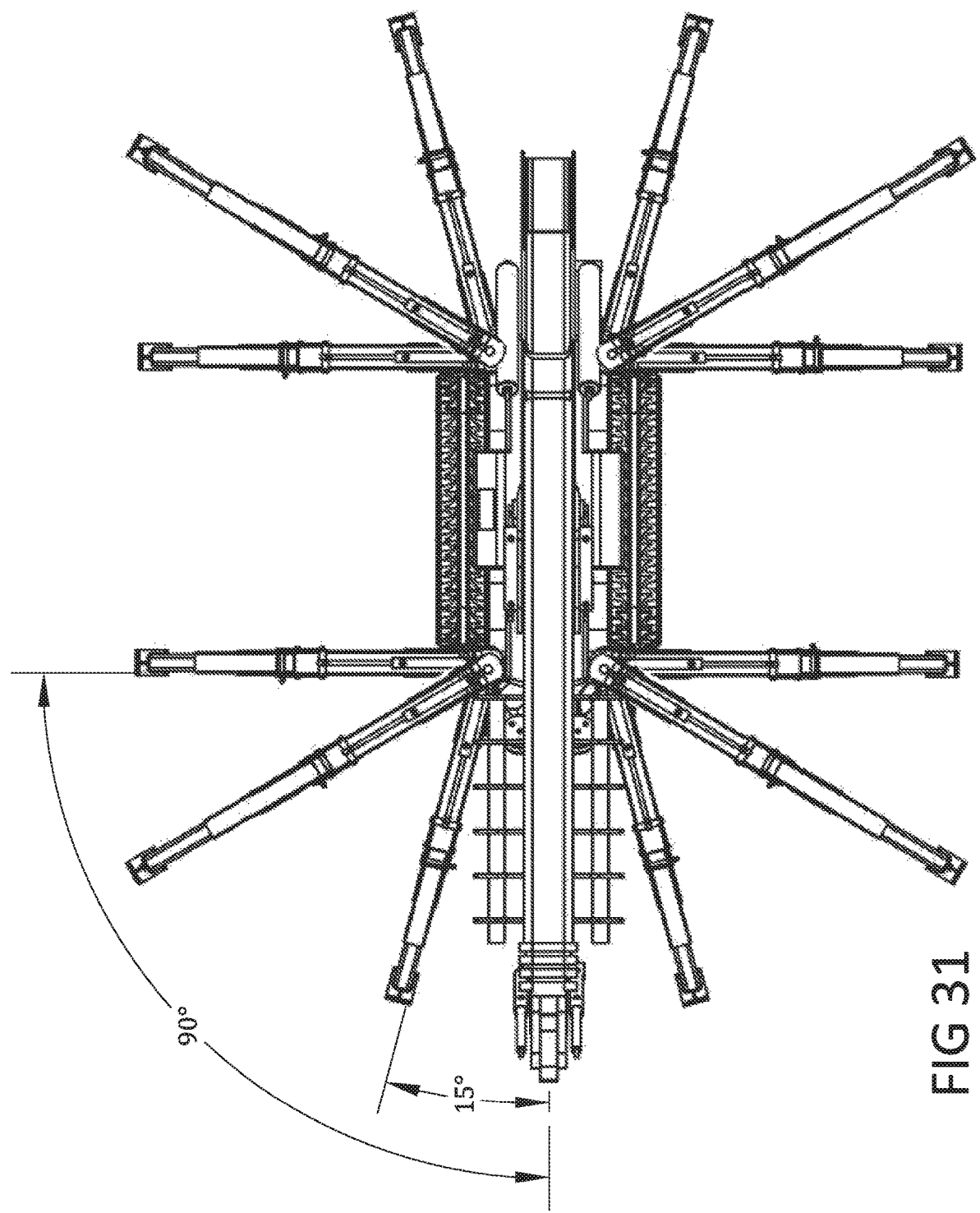
FIG. 31 is a schematic top plan view of the apparatus in FIG. 1 illustrating the different angles of the support leg outrigger in relations to the main chassis of the apparatus.

There is a rotating wheel attachment connector 122 as shown in FIGS. 18,19,20,21, and 24 that rotates around the extendable support jib boom 38 and can be angled for the best support stability of the gantry. This connector can attach to various mounts such as the wide wheel mount 148 in FIGS. 23 and 24 or the wheel outrigger boom riser 118 in FIGS. 25, 26, and 27. From these mounts attach various footing plates 116, wheels 48, or an extendable outrigger boom 120. Other attachments could include, but not limited to, clamps, V groove wheels, perforated or non-perforated metal plates, suction cups, or other connecting devices to attach to various surfaces hard and soft. The wheels can also be powered by a motor 50 to help propel the support jib boom leg 34 forward and backward. The motor can be controlled by the controller within the chassis either directly or wirelessly.

Figure 45:
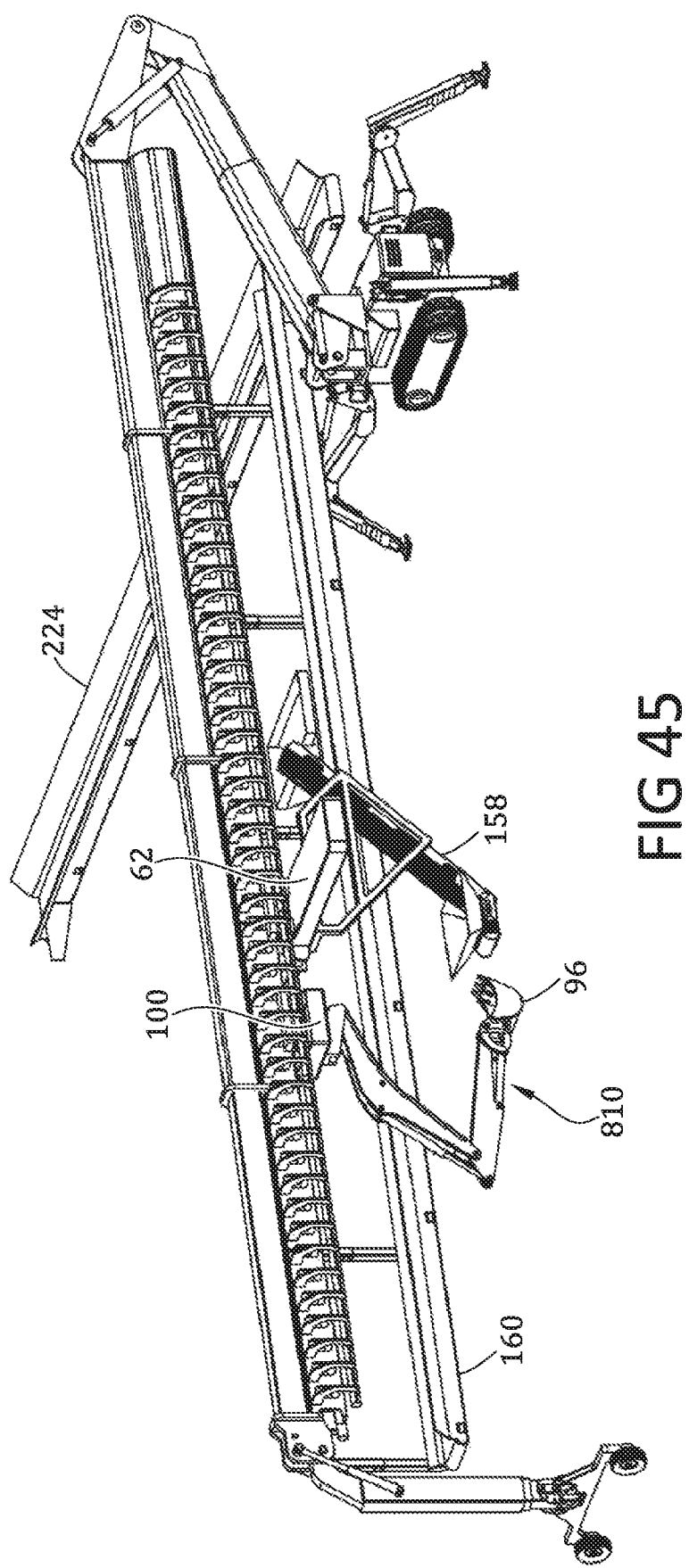
FIG. 45 is a schematic perspective view the apparatus in FIG. 1 illustrating the presently preferred embodiment of the conveyor belt system for dirt removal.
Figure 46:
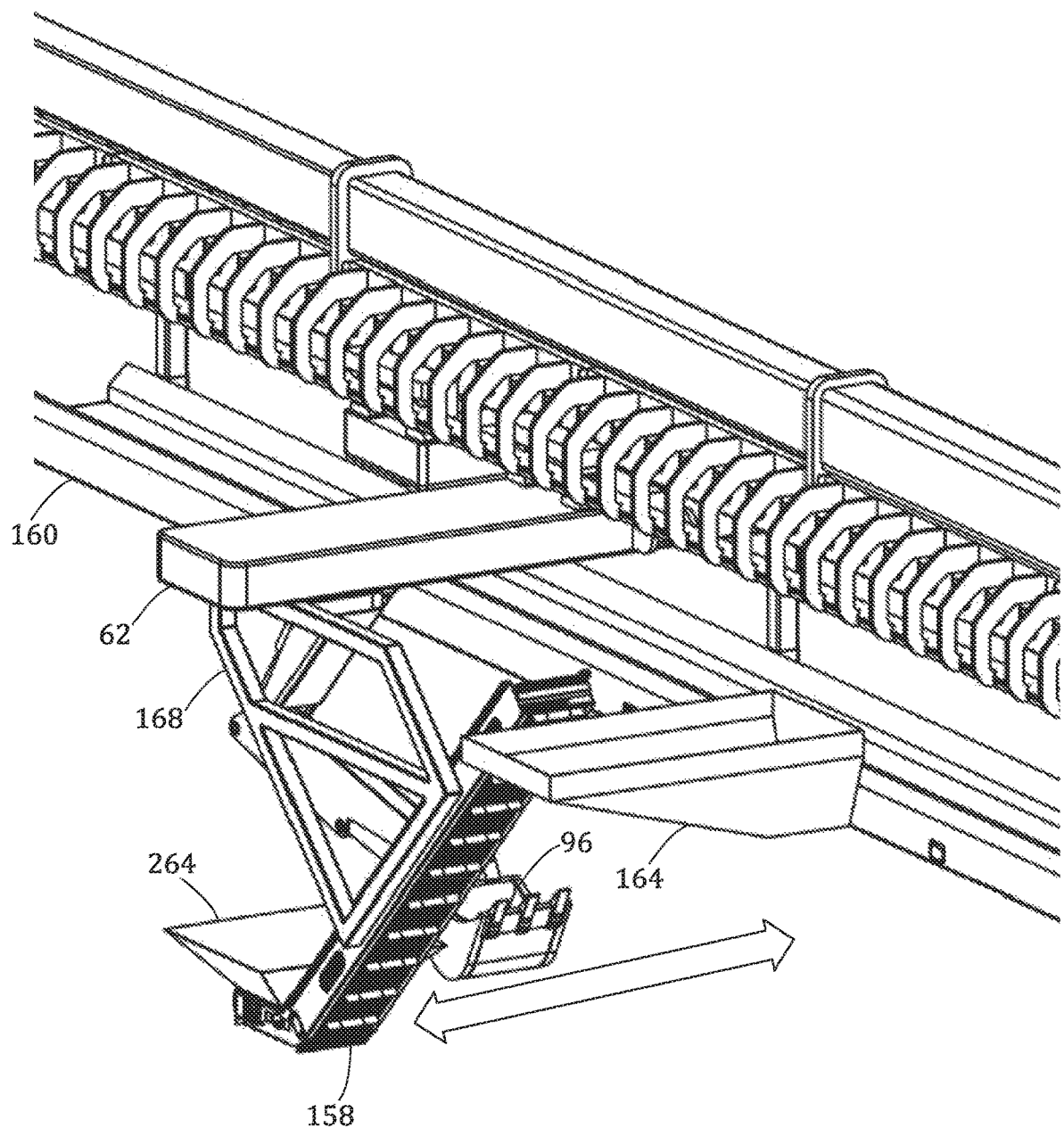
FIG. 46 is an enlarged schematic perspective view of a portion of the apparatus illustrating the presently preferred embodiment of the conveyor belt system for dirt removal.
Figure 49:
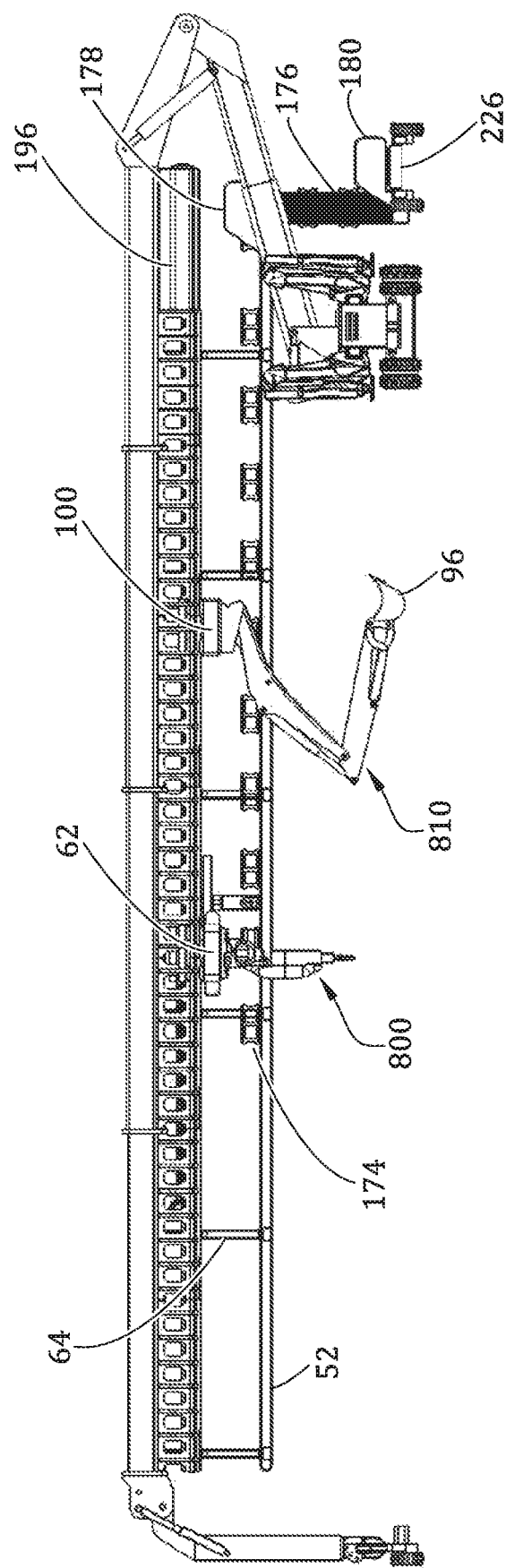
FIG. 49 is a schematic side view of the apparatus in FIG. 1 illustrating the robotic arm, conveyor belt for bricks, and the hydraulic arm with a bucket attachment.
Figure 50:
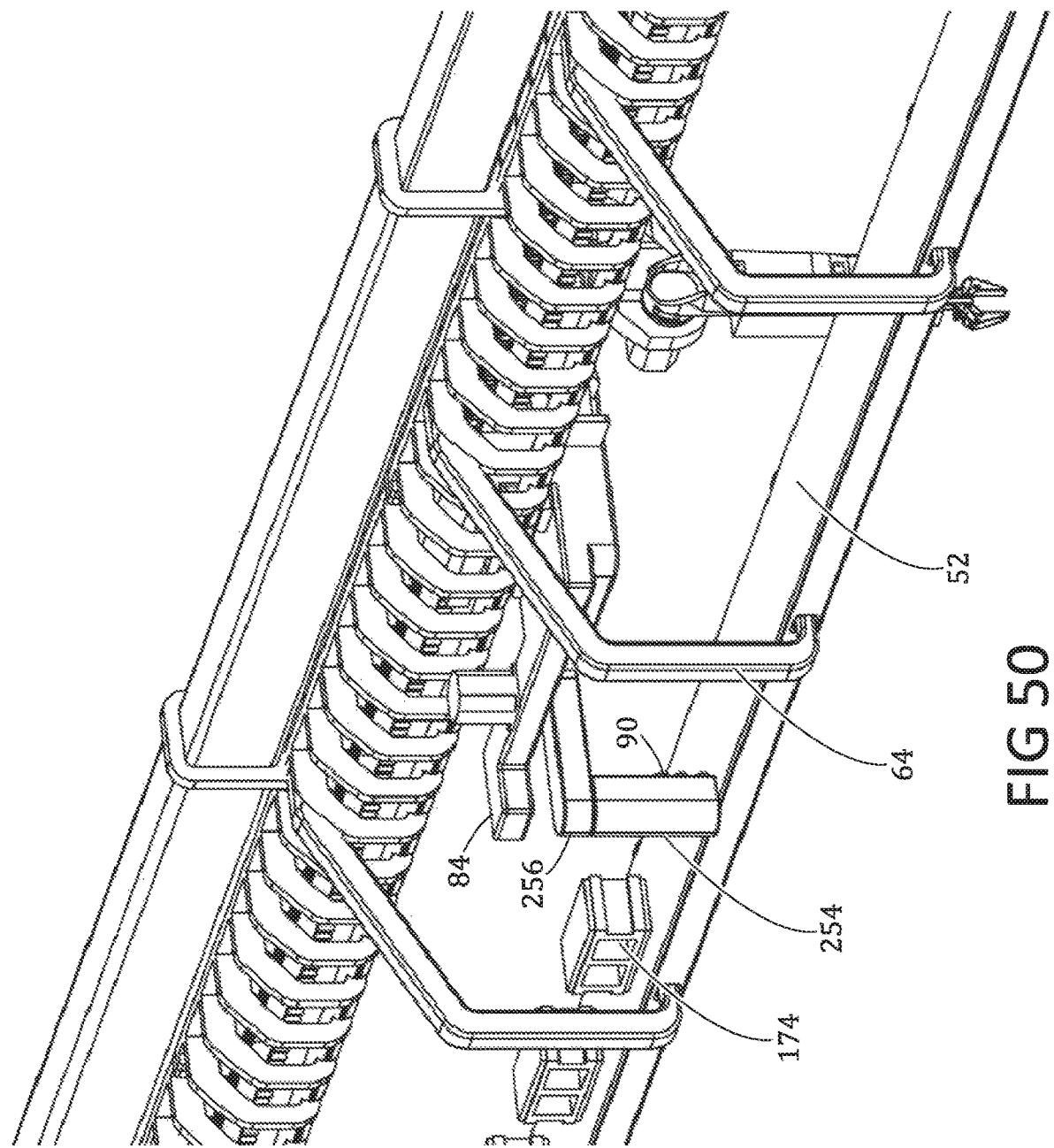
FIG. 50 is an enlarged schematic perspective view of a portion of the apparatus illustrating the concrete additive nozzle and brick scanning sensor.
Figure 51:
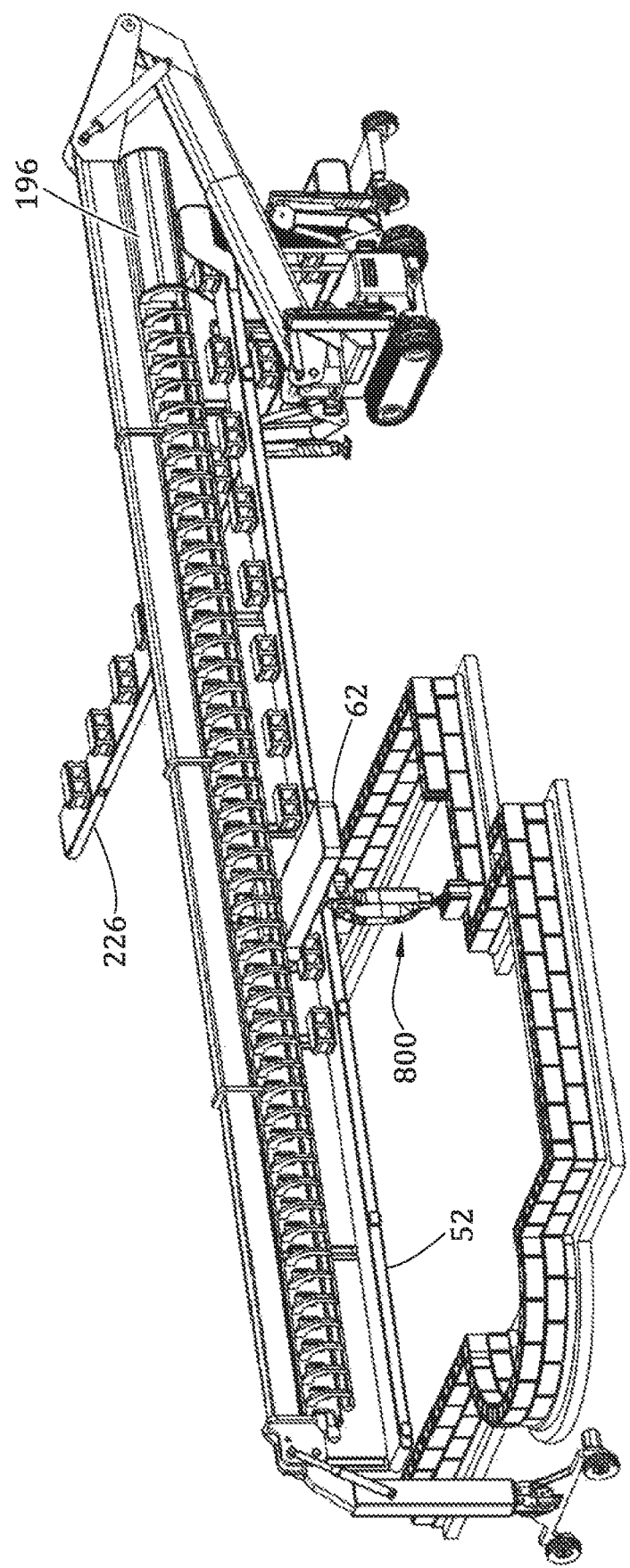
FIG. 51 is a schematic perspective view of the apparatus of FIG. 1 illustrating the presently preferred embodiment of the conveyor belt system for bricks.
Figure 52:
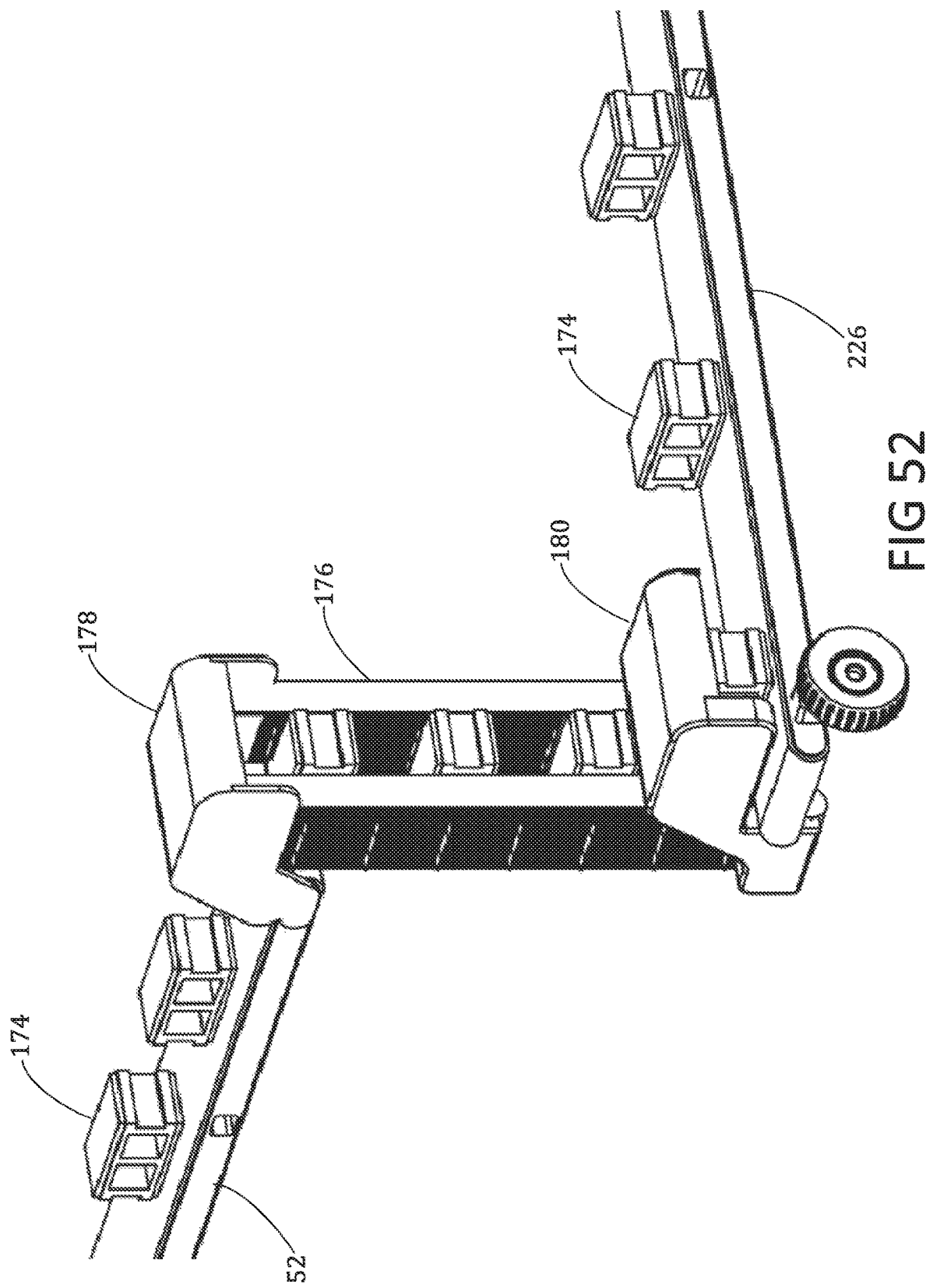
FIG. 52 is an enlarged schematic perspective view of a portion of the apparatus illustrating the presently preferred embodiment of the conveyor belt system for delivering bricks.

A bridge conveyor belt 52 as in FIGS. 49, 50, and 51 can be attached by a plurality of accessory arms 64 to run the length of the gantry in order to move bricks or material along the conveyor belt. The conveyor belt can have a siderail trough 160 to contain dirt and debris as shown in FIGS. 45 and 46 and can have a dirt funnels 164 and 264 that will direct dirt onto the conveyor belt. A lower conveyor belt 224 can be positioned at the end of the conveyor belt with siderail trough 160 to move top soil and spoils away from the worksite to specified dirt pile locations, into rock crushing or sifting devices, or into dump trucks. FIGS. 51 and 52 show the movement of bricks along various conveyor belt systems. A delivery conveyor belt 226 can deliver a brick 174 to the lower brick pusher 180 onto a vertical conveyor belt 176 and then pushed by a higher brick pusher 178 and onto the bridge conveyor belt 52 where it will be moved to the additive material nozzle 90 in FIG. 10 and finally to be picked and placed by the gripper attachment 72 on the electromechanical robotic arm 800. The conveyor belt can have a built in sensor or be controlled by a separate device which can interact with the robotic arm or site worker and deliver material to a specific spot on the conveyor belt.

The accessory arms 64 can be configured to hold an assortment of implements, tool changers, construction material, tanks, concrete mixers, prefab material, tiles or other supplies. The device can become a superstructure that can carry all of the equipment associated with a project. A catwalk, scaffold, or cherry picker bucket could be attached to the accessory arms 64 or attached to current boom arms or excavator arms to allow site workers higher access to worksites. The robotic arm or hydraulic arm could assist the site workers with tasks while on or off the raised platforms.

Figure 14:
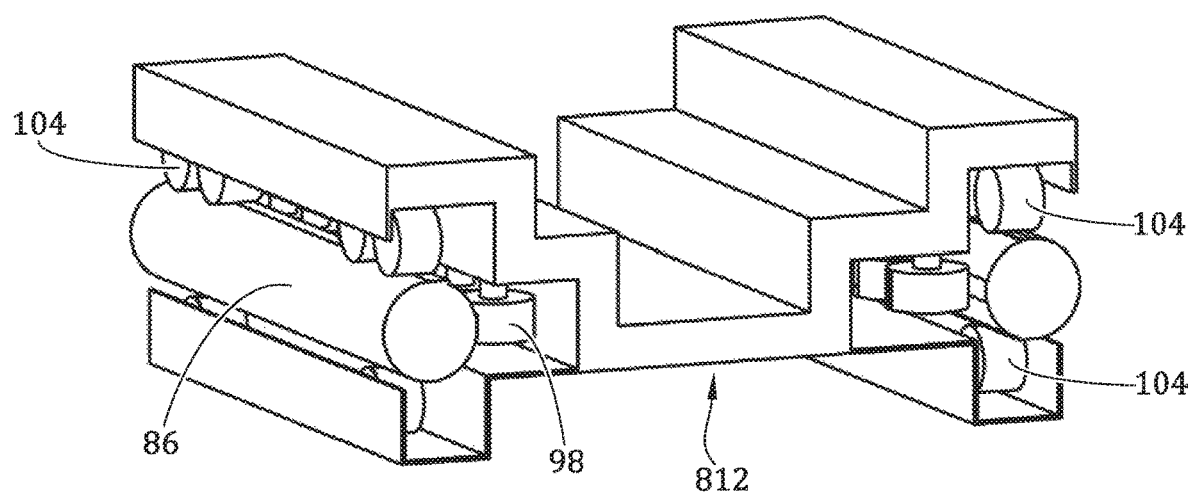
FIG. 14 is a schematic perspective view of the Trolley on a cross section of the track of the apparatus in FIG. 1.
Figure 15:
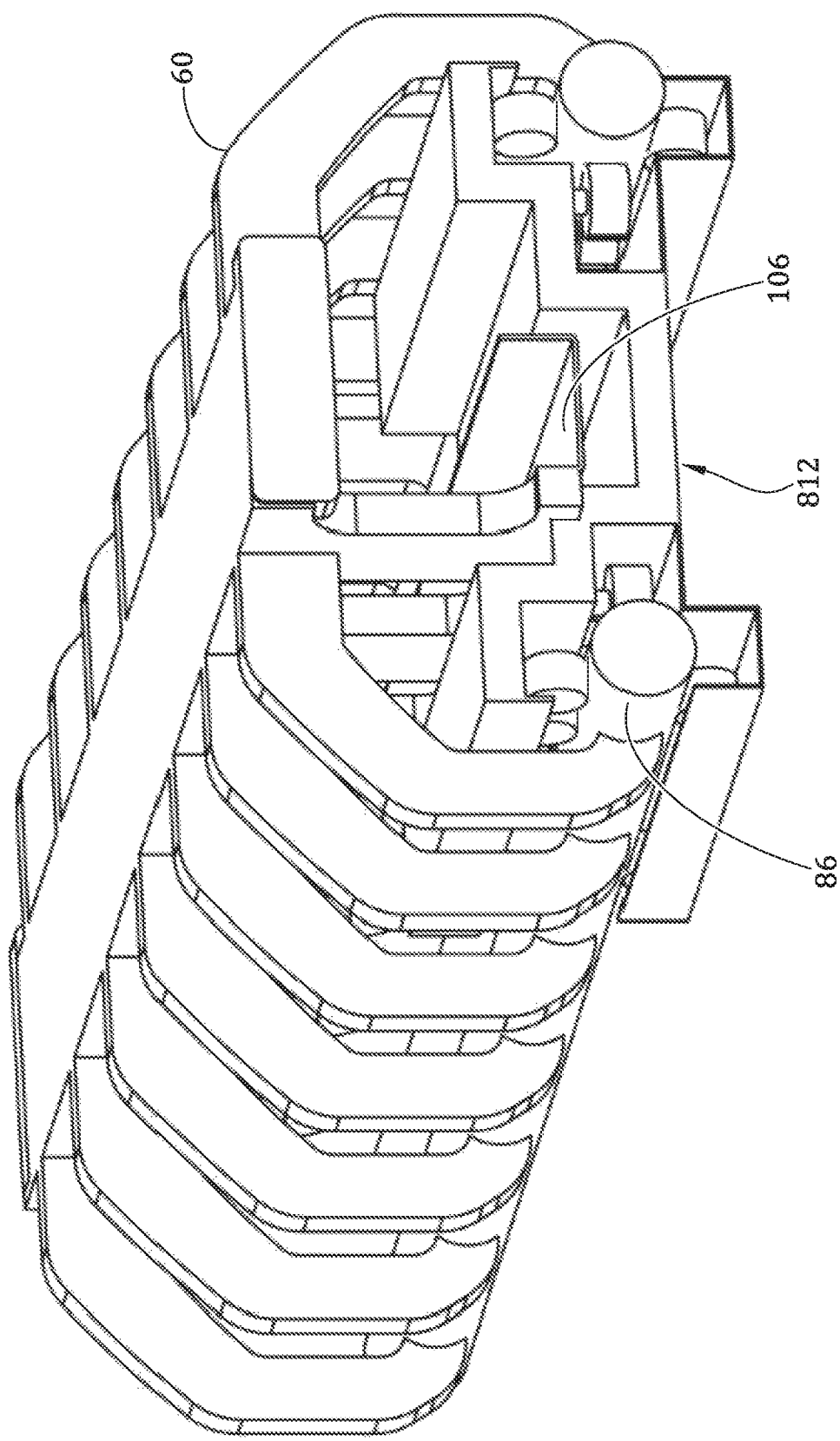
FIG. 15 is a schematic perspective view of the Trolley on a section of the track of the apparatus in FIG. 1.

Under the extendable bridge boom sections of the gantry 26, 28, 30, and 32 are trolley track frame and rails 60 that the extended trolley 62 or the simplified trolley 100 slide along. The trolley chassis 812 shown in FIGS. 14 and 15 is similar to roller coaster rail and trolley systems which can handle extreme torque and pressure because of the dual track rails 86 and numerous trolley wheels 98 and 104 on the trolley chassis 812. The wheels can keep the trolley from pitching and rolling when force is applied to the trolley from the robotic electromechanical or hydraulic arms. The trolley uses a rack and pinion system 70 shown in FIG. 8 to move along the trolley and track frame and rails 60. Other various mechanical mechanisms to move the trolley and/or the linear robotic arm and hydraulic arm include cog, worm gears, and motor direct friction gears/wheels. Other embodiments of the track could be tracks that can slide, contract, or fold in together (expand or contract) as well as be of a variety of shapes and designs such as girders, channels, rails, v grooved rails or tubes. The alternative embodiment of the track rails could be singular or plural. The trolley could also be of an alternative embodiment to fit an alternative track system.

Figure 8:
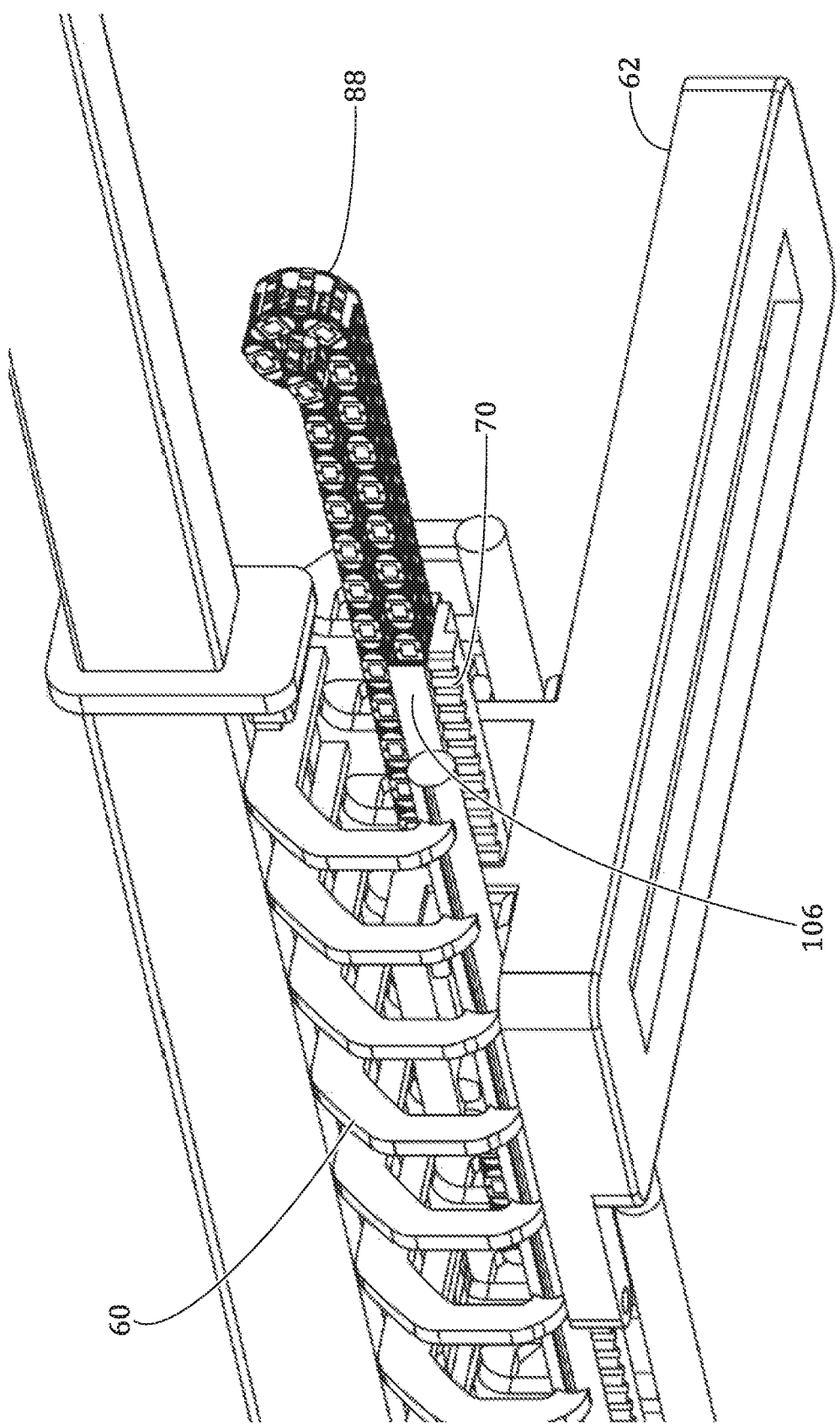
FIG. 8 is an enlarged perspective view of the chain conduit for the electrical, hydraulic, additive material, air and fluids as it is held in place by a channel under the track and connected to the trolley.

Also, attached to the bottom side of the track is a chain cable channel 106 in FIGS. 8 and 15 where a drag chain cable carrier 88 is supported. The trolley can be of a design to have an extended beam outwards from the track as in FIG. 16 with the extended trolley 62 resulting in the attachments such as a robotic arm or a conveyor belt support arm 168 in FIG. 46 being able to move along the trolley independent of the trolley moving along the trolley track frame and rails 60. This will create a local trolley platform reach area 702 in FIGS. 9 and 16 for the robotic arm. A simplified trolley 100 can also be more compact as in FIG. 17.

Figure 9:
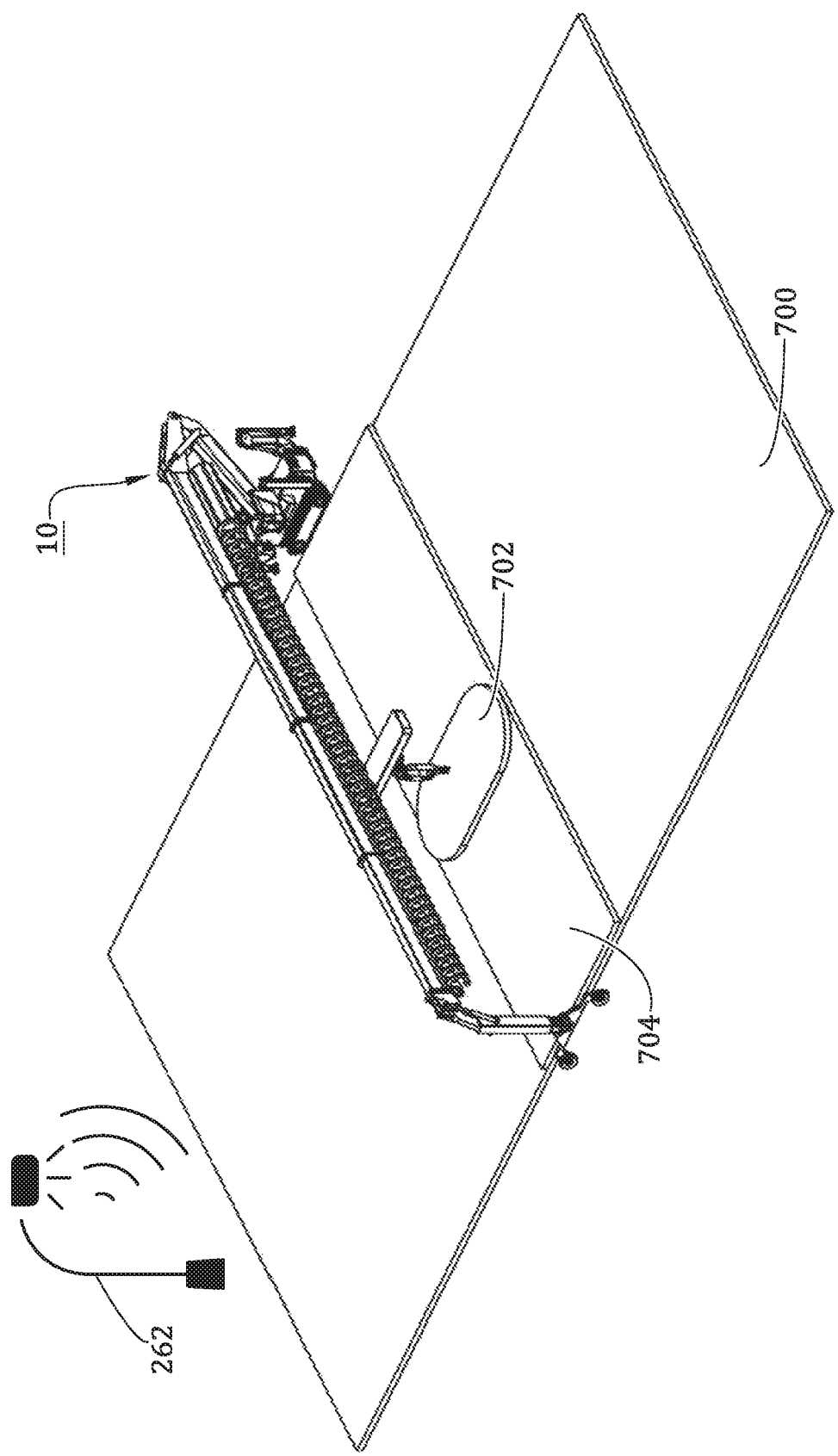
FIG. 9 is a schematic perspective view of the apparatus in FIG. 1 illustrating the operational reach of the gantry, gantry beam, and local reach of the robotic arm.
Figure 16:
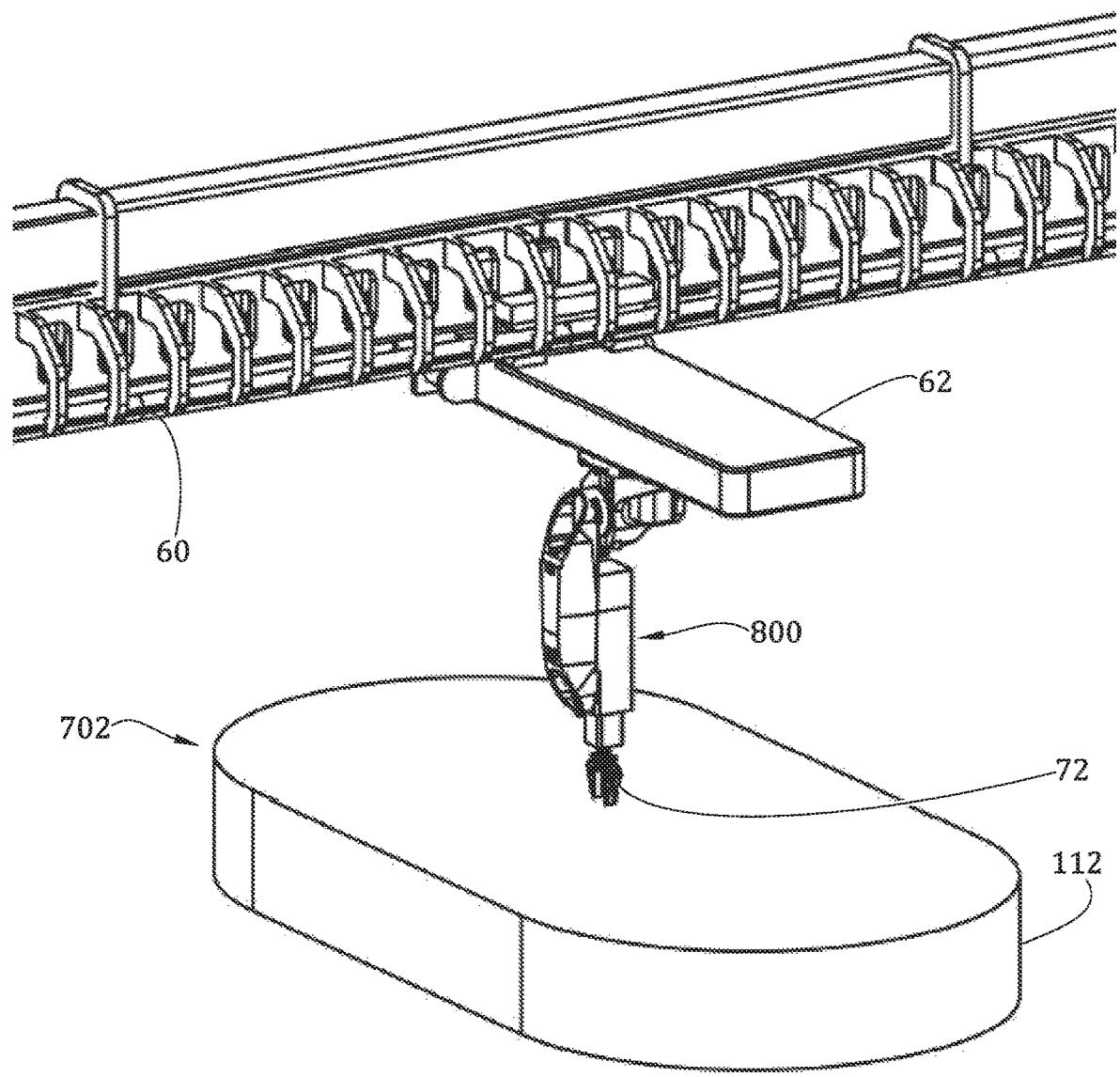
FIG. 16 is an enlarged schematic perspective view of a portion of the apparatus illustrating the local reach of the electromechanical robotic arm on the trolley.
Figure 17:
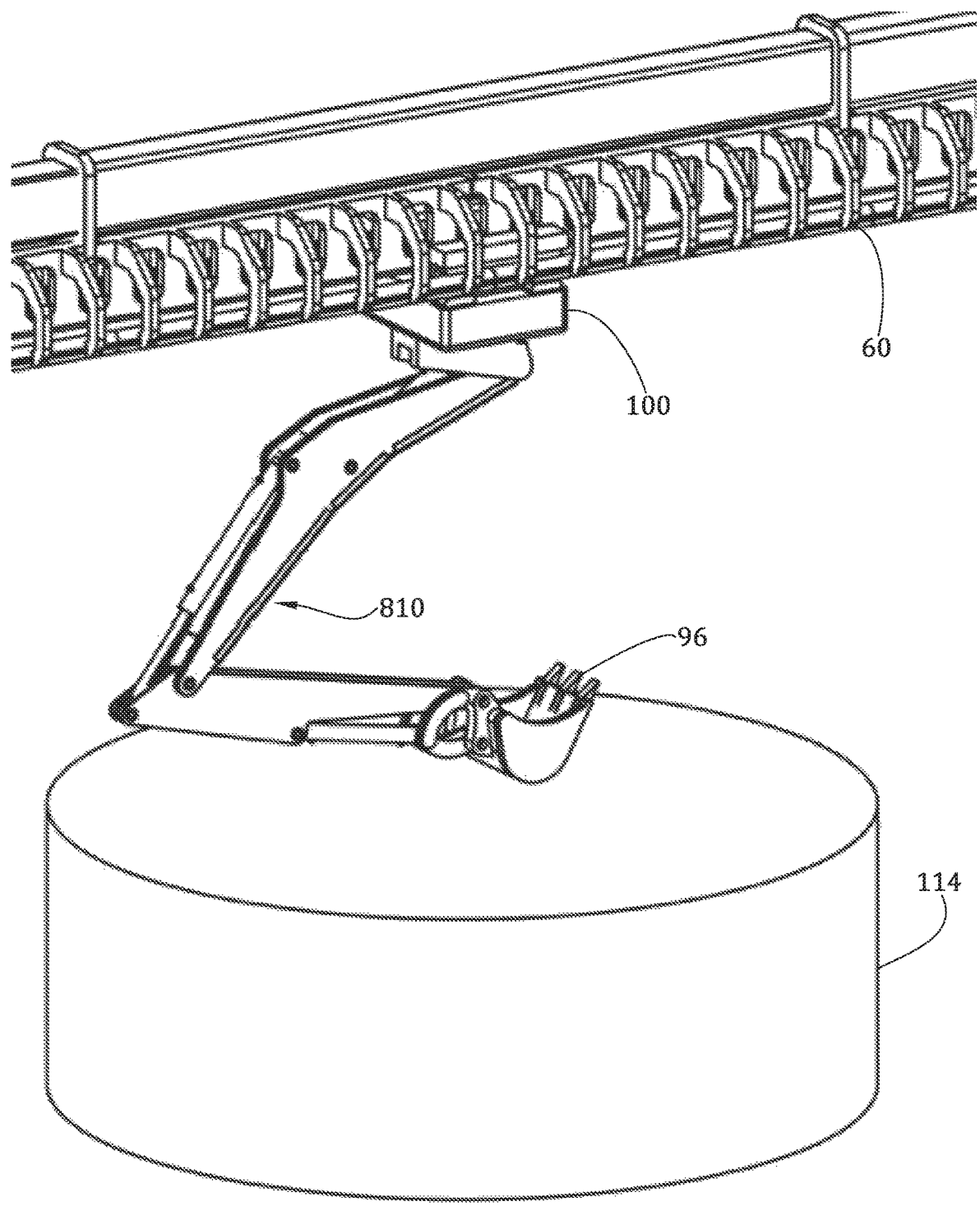
FIG. 17 is an enlarged schematic perspective view of a portion of the apparatus illustrating the local reach of the hydraulic arm with a bucket attachment.
Figure 18:
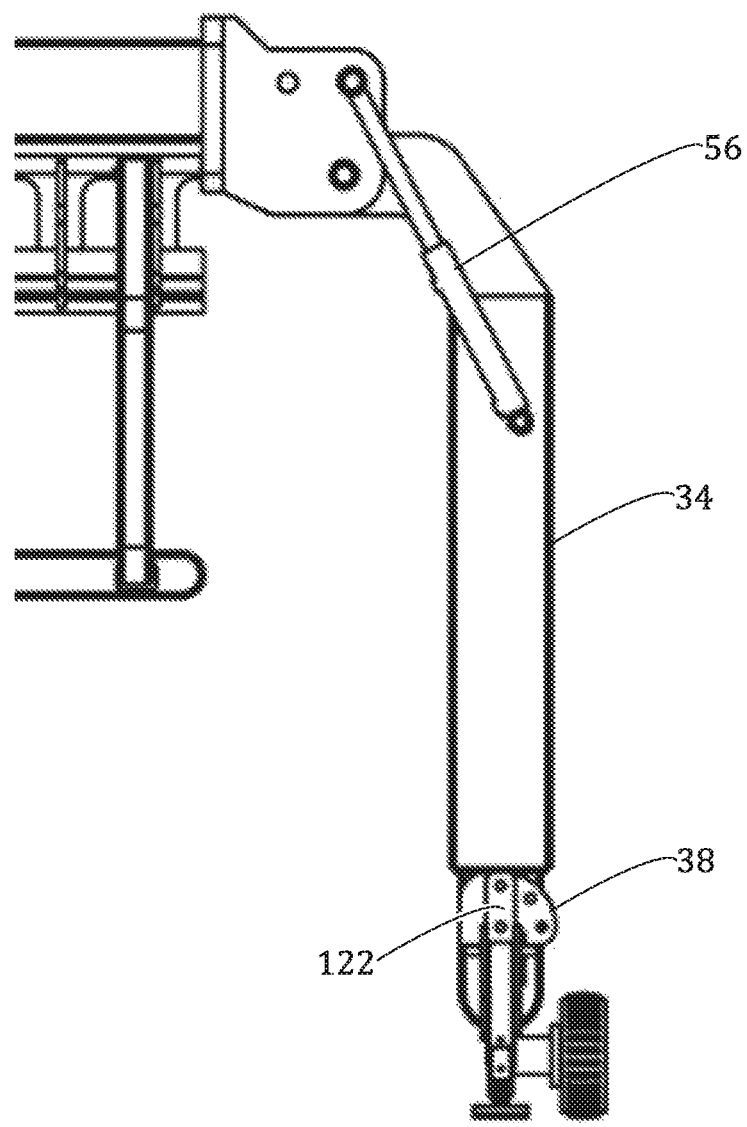
FIG. 18 is an enlarged schematic side view of the apparatus in FIG. 1 illustrating a configuration of the support beam and the support beam's wheel/outrigger attachment.
Figure 19:
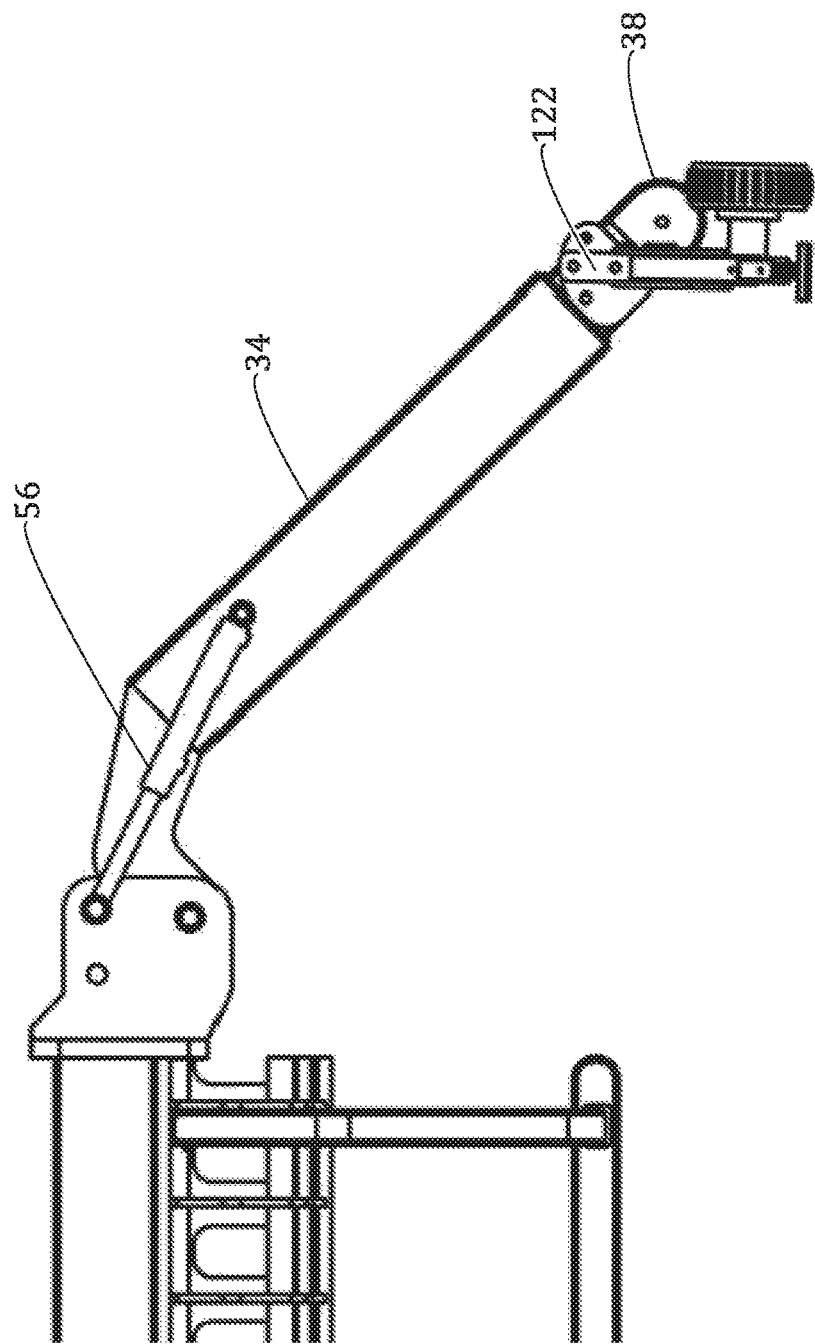
FIG. 19 is an enlarged schematic side view of the apparatus in FIG. 1 illustrating a different configuration of the support beam and the support beam's wheel/outrigger attachment.
Figure 20:
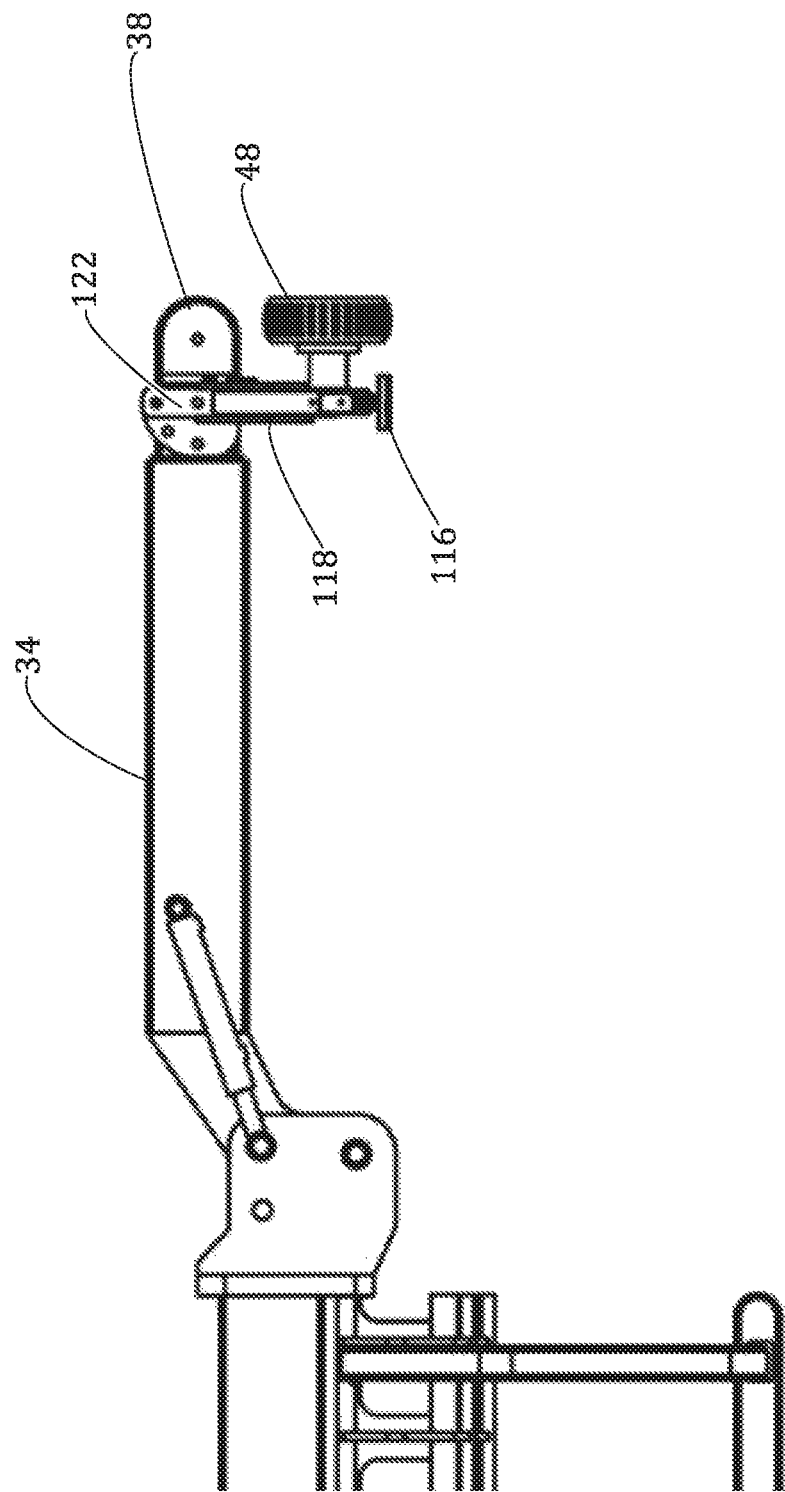
FIG. 20 is an enlarged schematic side view of the apparatus in FIG. 1 illustrating another configuration of the support beam and the support beam's wheel/outrigger attachment.

FIG. 9 shows the working platforms or site perimeters of the device with the perimeter Y axis platform reach area 700, cross bridge X axis platform reach area 704, and local trolley platform reach area 702 with an additional local Y axis. The device can move along the site in the Y axis as long as possible due to the wheels or tracks on both ends. The Trolley can move back and forth on the track (bridge) in the X axis. But, what makes the device perform most efficiently with the robotic electromechanical and hydraulic arms attached to the trolley is the local trolley platform reach area 702 which has a local Y axis capabilities. With the robotic arm having a local Z axis as well as being able to pivot and rotate, the robotic arm can perform tasks quickly in a linear motion and within the reach of the arms without having the entire device or trolley move. FIG. 16 shows the local depth reach area 112 of the electromechanical robotic arm 800 within the local trolley area 702. FIG. 17 shows the hydraulic arm reach area 114 of the hydraulic robotic arm 804 with the excavation bucket 96.

FIG. 10 shows an enlarged perspective view of the device's track, trolley, and electromechanical robotic arm 800 and details the robotic arm consisting of an implement connector 804, grip attachment 72, extendable arm 74, lower pivot arm 76, upper pivot arm 78, rotating base 80, as well as motors 82. Also, shown is a linear local Y axis track 102 located on the bottom side of the extended trolley 62 in which the electromechanical robotic arm 800 can move back and forth.

Figure 55:
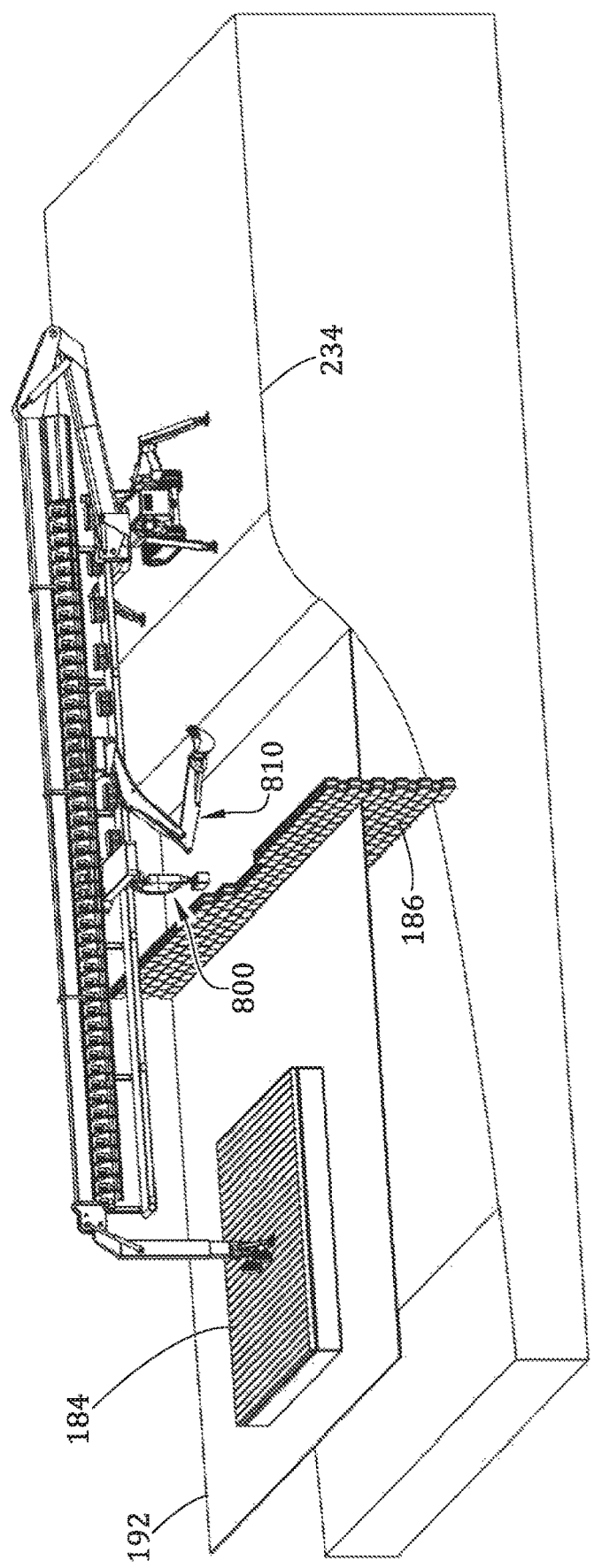
FIG. 55 is a schematic perspective view of the apparatus in FIG. 1 illustrating the apparatus in use dredging the sea bed as well as building the sea wall. This configuration shows the use of a floating dock to hold up the support leg of the apparatus.
Figure 56:
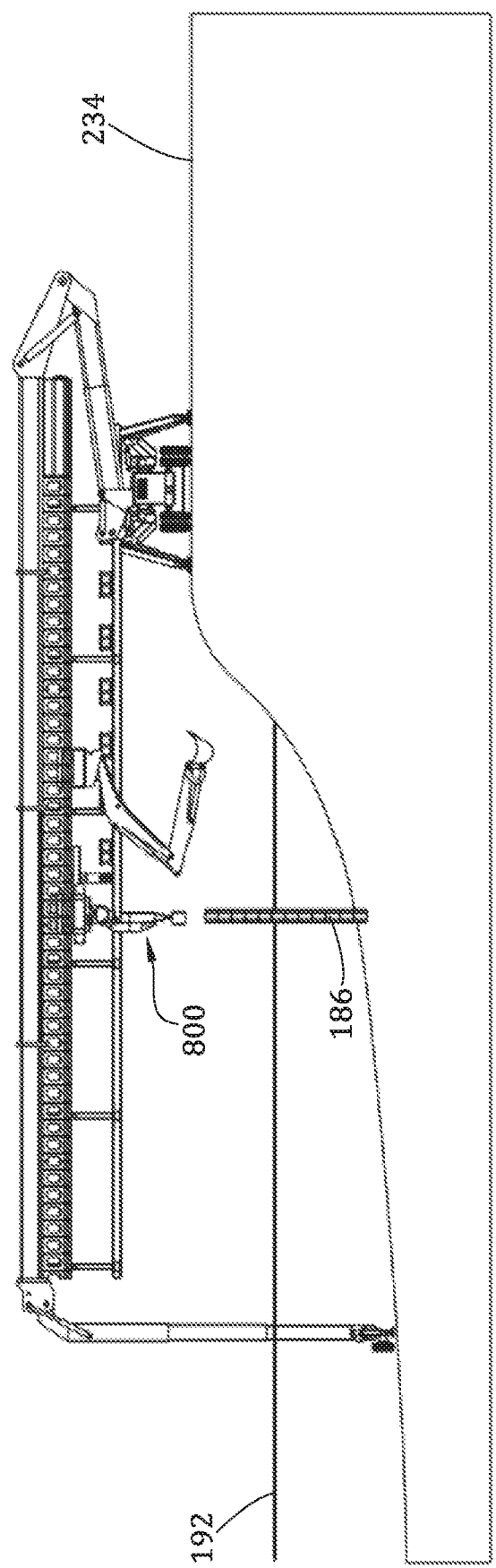
FIG. 56 is a schematic side view of the apparatus in FIG. 1 illustrating a different configuration of the apparatus in use dredging the sea bed as well as building the sea wall. This drawing shows how the support leg can be extended below water to the sea bed to create vertical support for the apparatus when dredging or building a sea wall.
Figure 57:
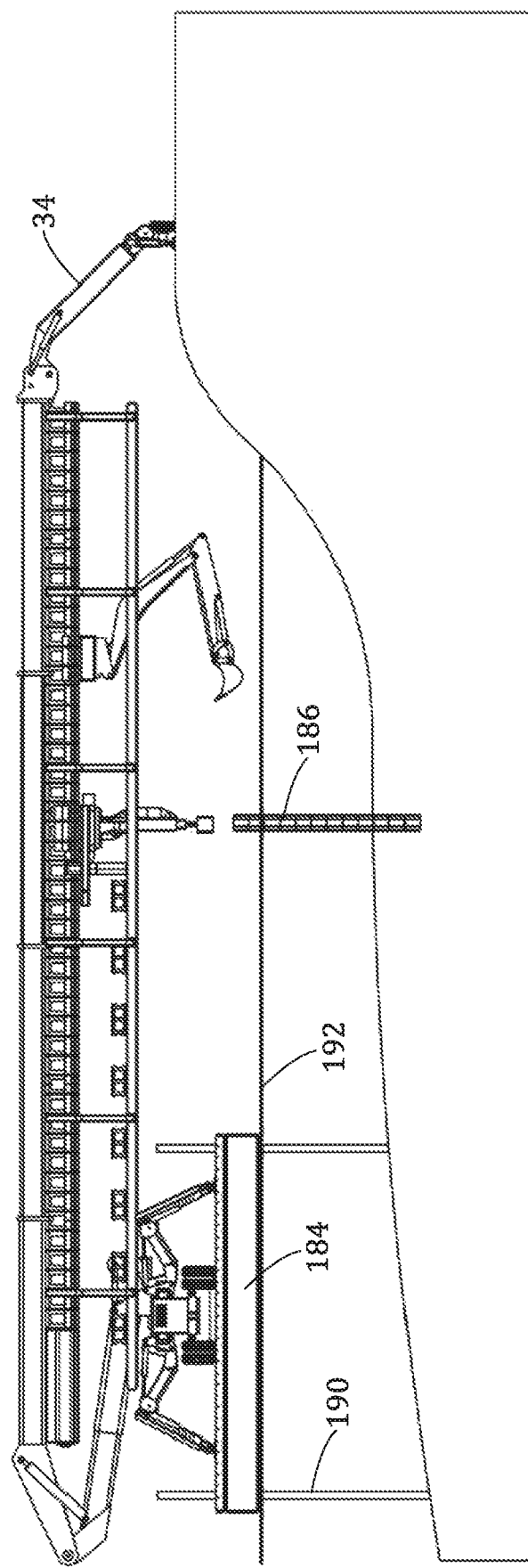
FIG. 57 is a schematic side view of the apparatus in FIG. 1 illustrating a different configuration of the apparatus in use dredging the sea bed as well as building the sea wall. This drawing shows the apparatus on a floating dock and with the support leg on land.
Figure 58:
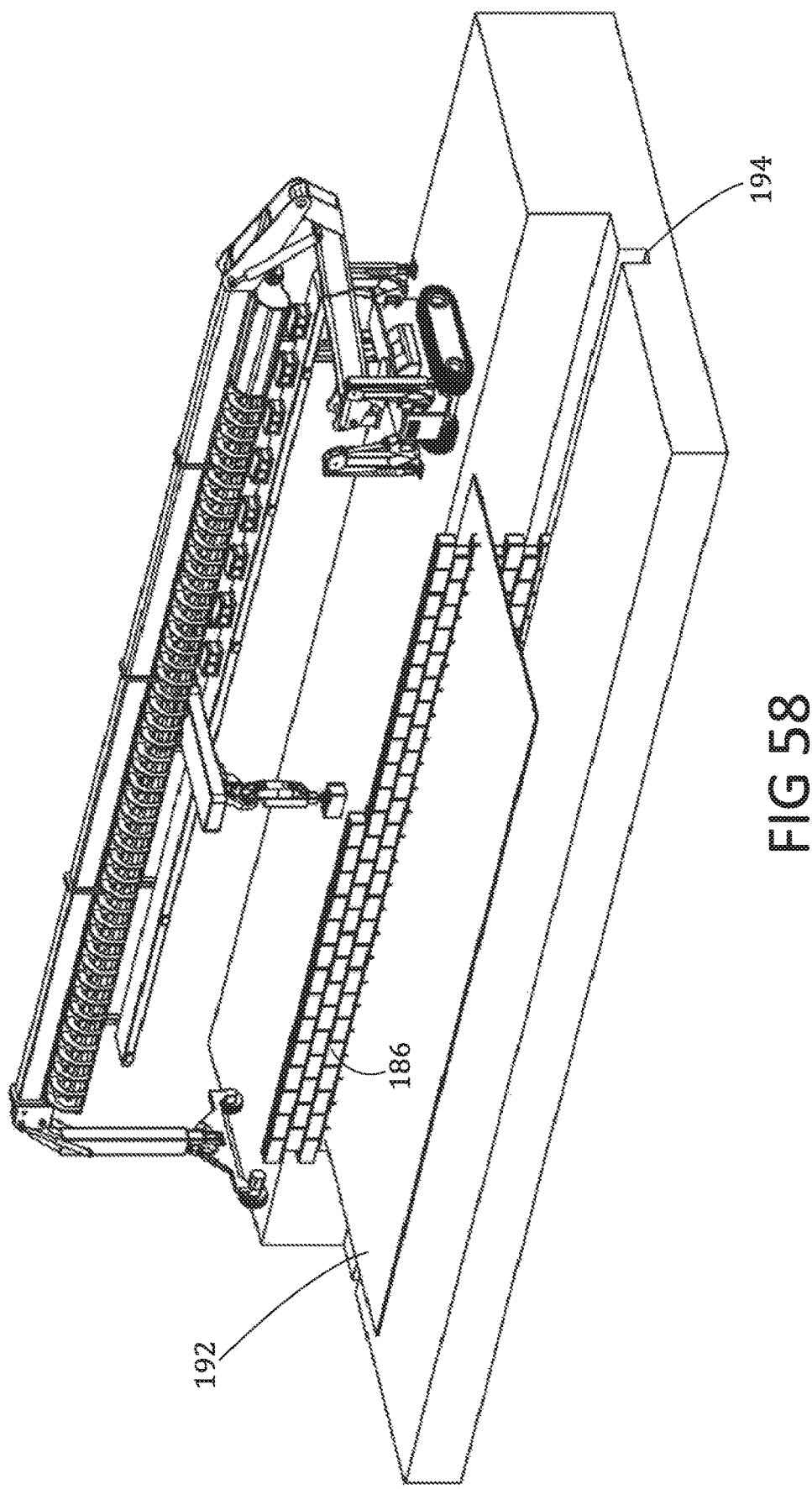
FIG. 58 is a schematic perspective view of the apparatus in FIG. 1 illustrating a different configuration of the apparatus in use building the sea wall. This drawing shows the apparatus and support leg on land with the Trolley and the robotic arm extended over the water to deliver bricks in a parallel line to the apparatus extended arm.

Also shown in FIGS. 10 and 50 is a camera and sensor 84 which can determine the type of brick/block/object that is on the conveyor belt 52 and direct the application nozzle arm 254 to move and rotate along the application upper arm 256 which also can rotate 180 degrees. This allows the additive material nozzle 90 to be able to apply jointing or packing material such as mortar to the entire brick 360 degrees. The additive material is mixed and pushed to the application nozzle by the screw drive and mixing module 196 shown in FIGS. 49 and 51. Once the brick has the additive material, the gripper attachment 72 on the electromechanical robotic arm 800 can pick up the brick and place it into the site as shown in FIGS. 51, 55, and 58. The device can handle repetitive and strenuous tasks of brick laying and adding mortar in order to automate wall building including structural walls, basements, crawl spaces, retaining walls, gates and gate posts, levees and sea walls.

Figure 12:
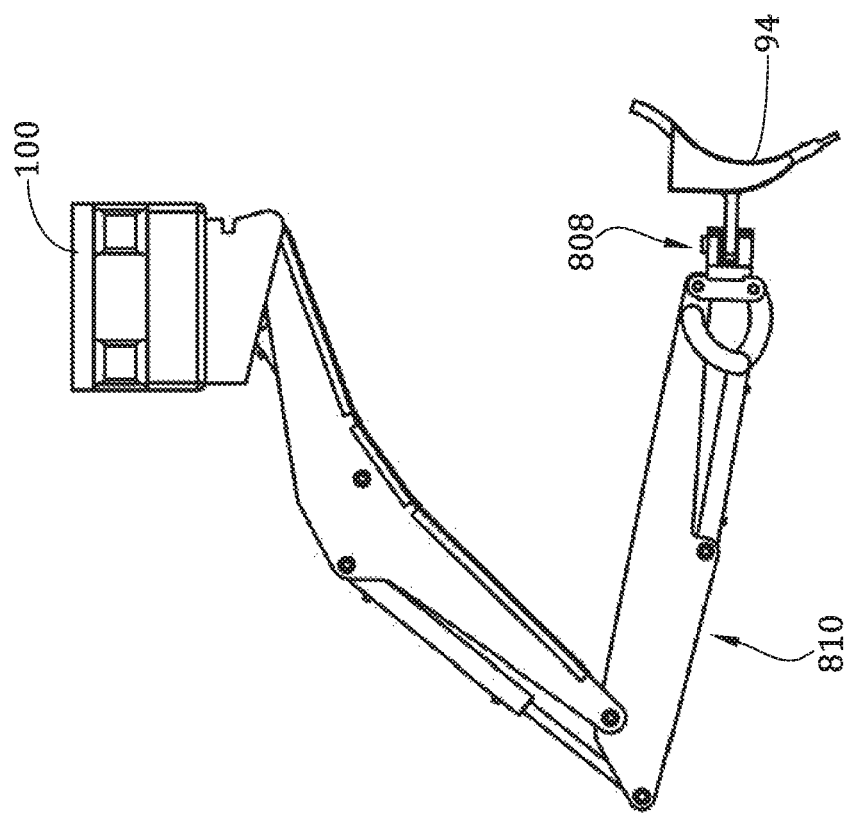
FIGS. 11, 12 and 13 are a schematic side views, respectively, of an electromechanical robotic arm and grip attachment; a hydraulic arm with a construction blade attachment and a hydraulic arm with a construction bucket attachment.
Figure 11:
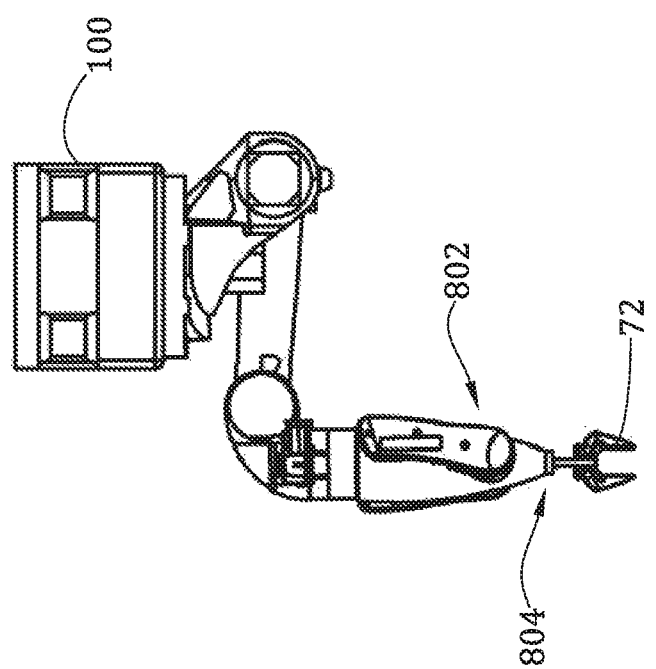
Figure 13:
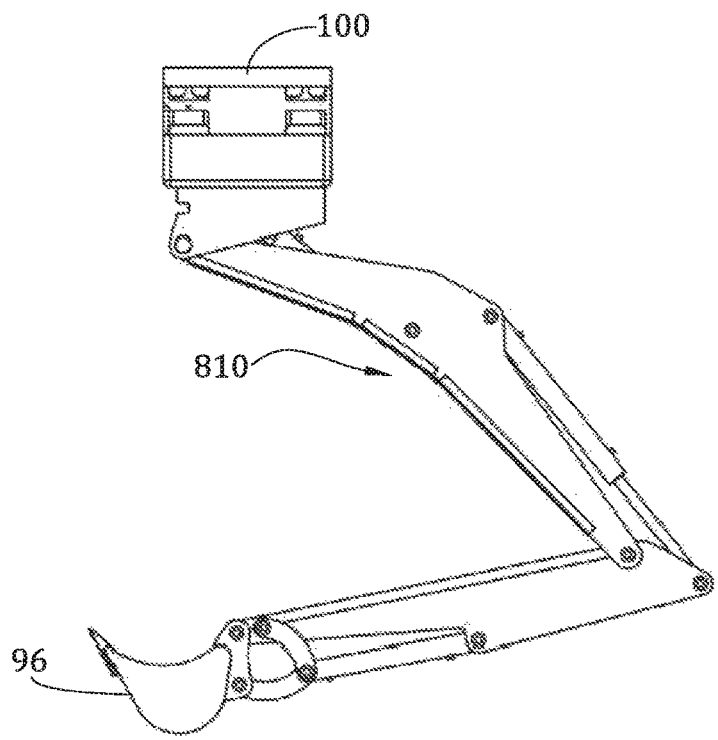
Figure 47:
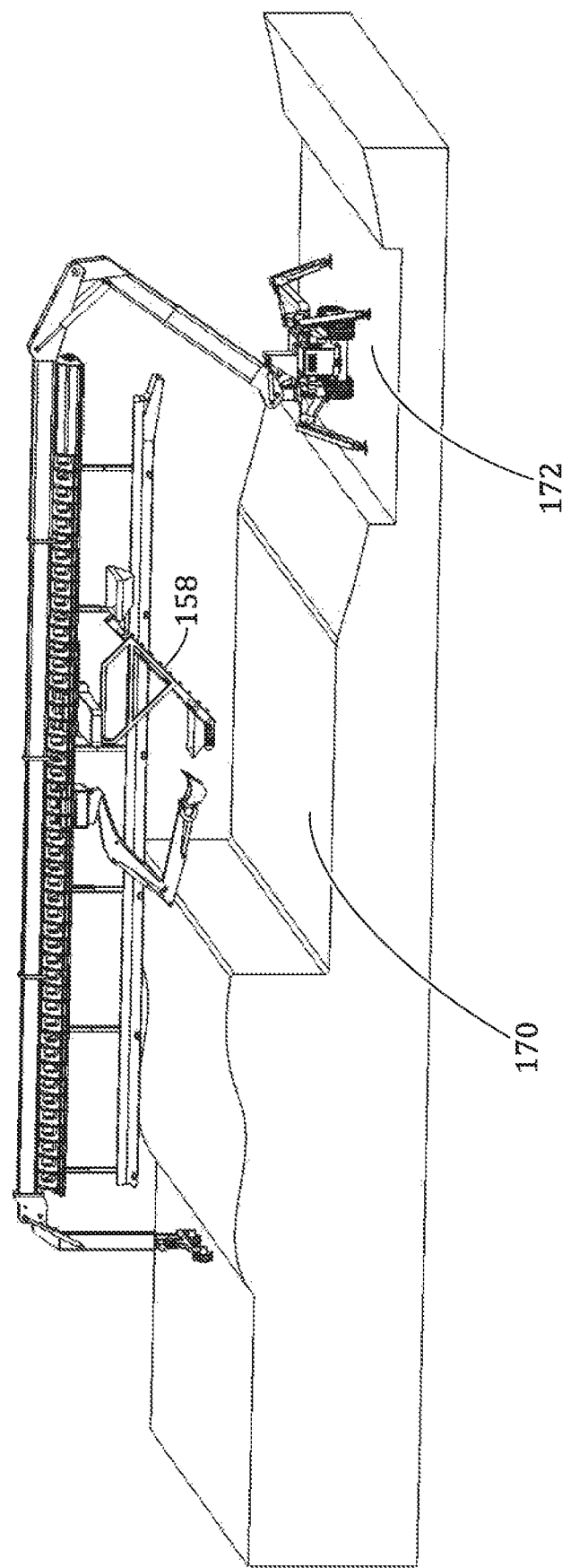
FIG. 47 is a schematic perspective view of the apparatus in FIG. 1 illustrating the apparatus in use excavating a retaining wall.
Figure 59:
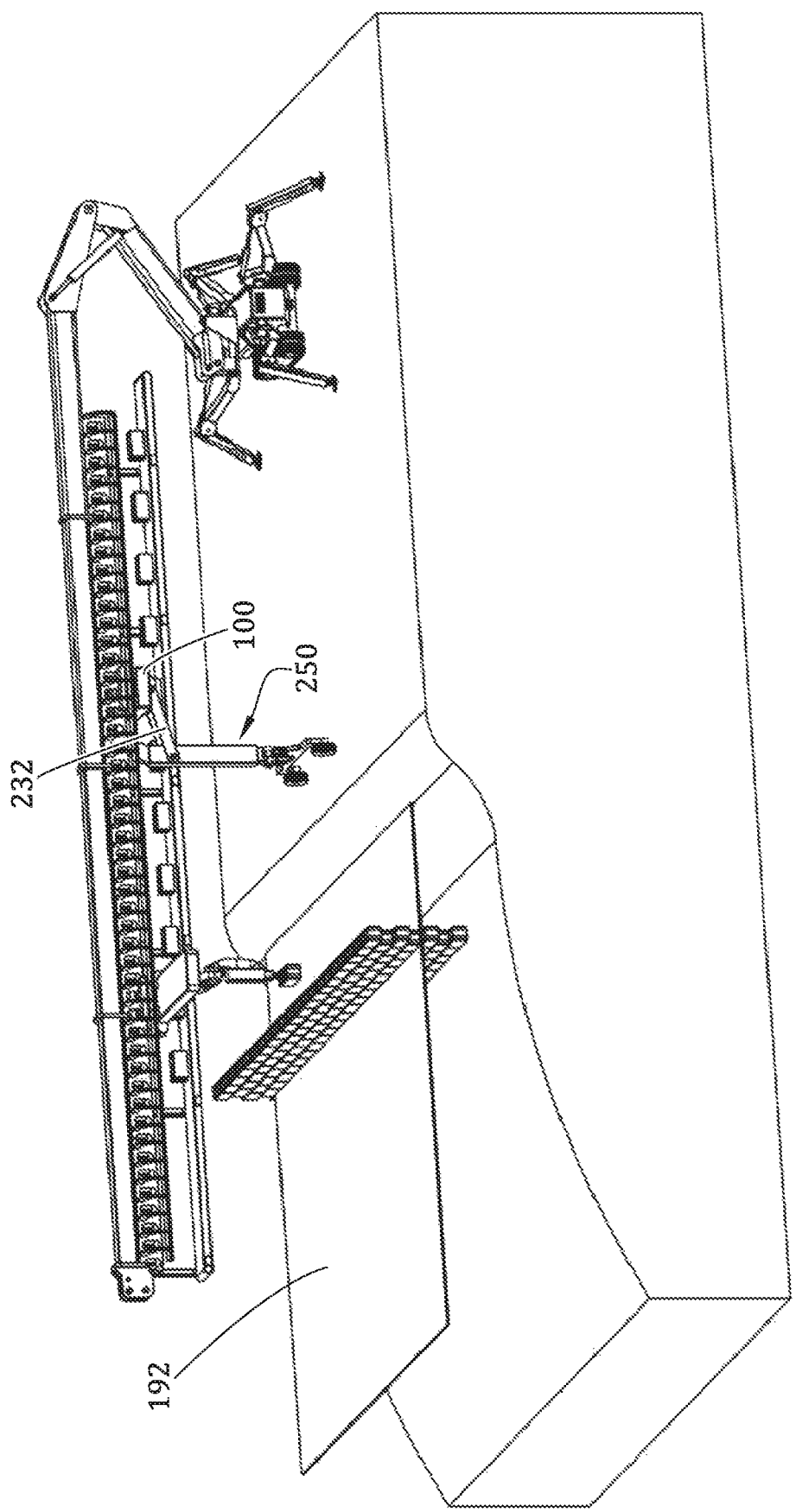
FIG. 59 is a schematic perspective view of the apparatus in FIG. 1 illustrating an alternative configuration of the apparatus in use building a sea wall. This drawing shows the apparatus with the support beam being moved to the center of the beam resulting in a cantilever structure.
Figure 65:
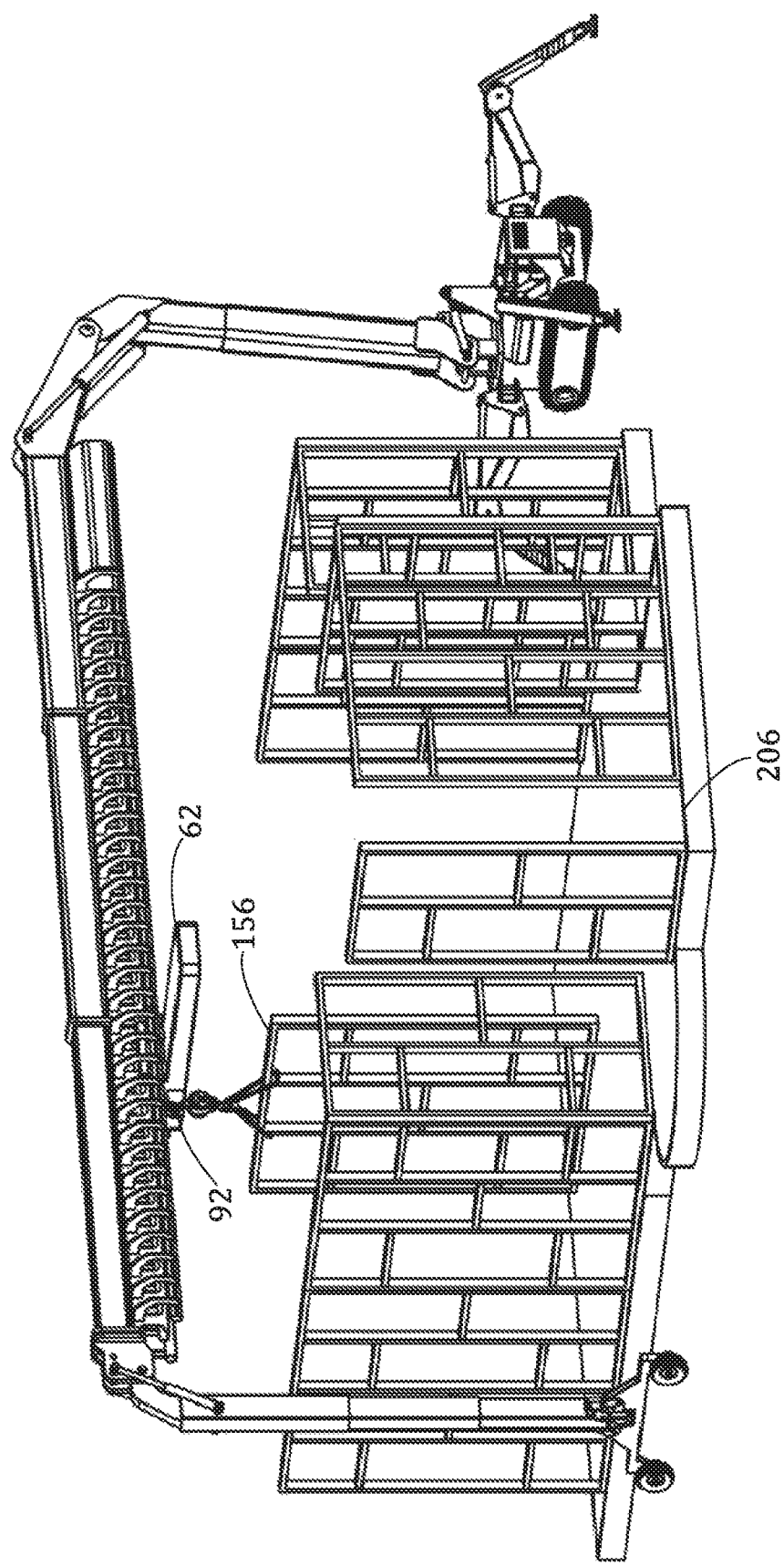
FIG. 65 is a schematic perspective view of the apparatus in FIG. 1 illustrating the apparatus lifting a building frame into place.
Figure 68:
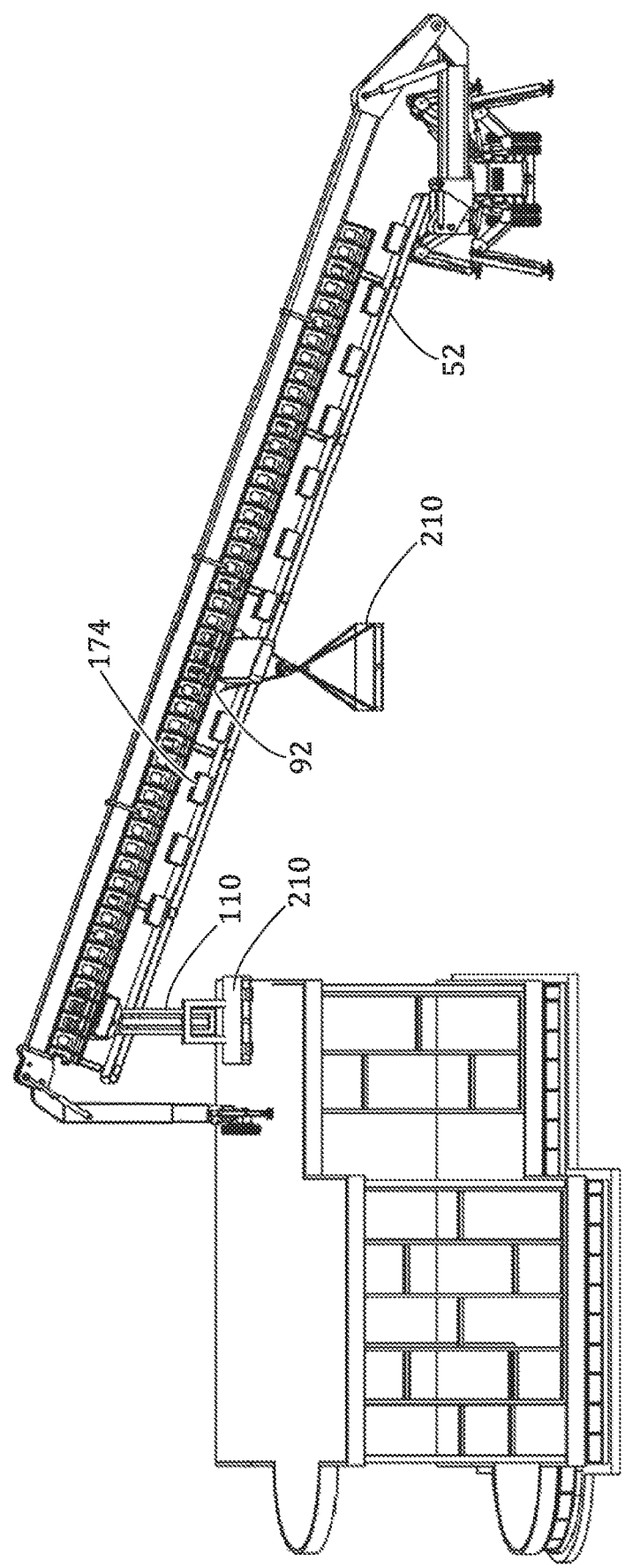
FIG. 68 is a schematic perspective view of the apparatus in FIG. 1 illustrating lift and hoist attachments to the trolley which can travel along the apparatus' bridge from the ground to an upper level. This drawing also shows the conveyor belt delivering material up or down to/from the upper floor.
Figure 71:
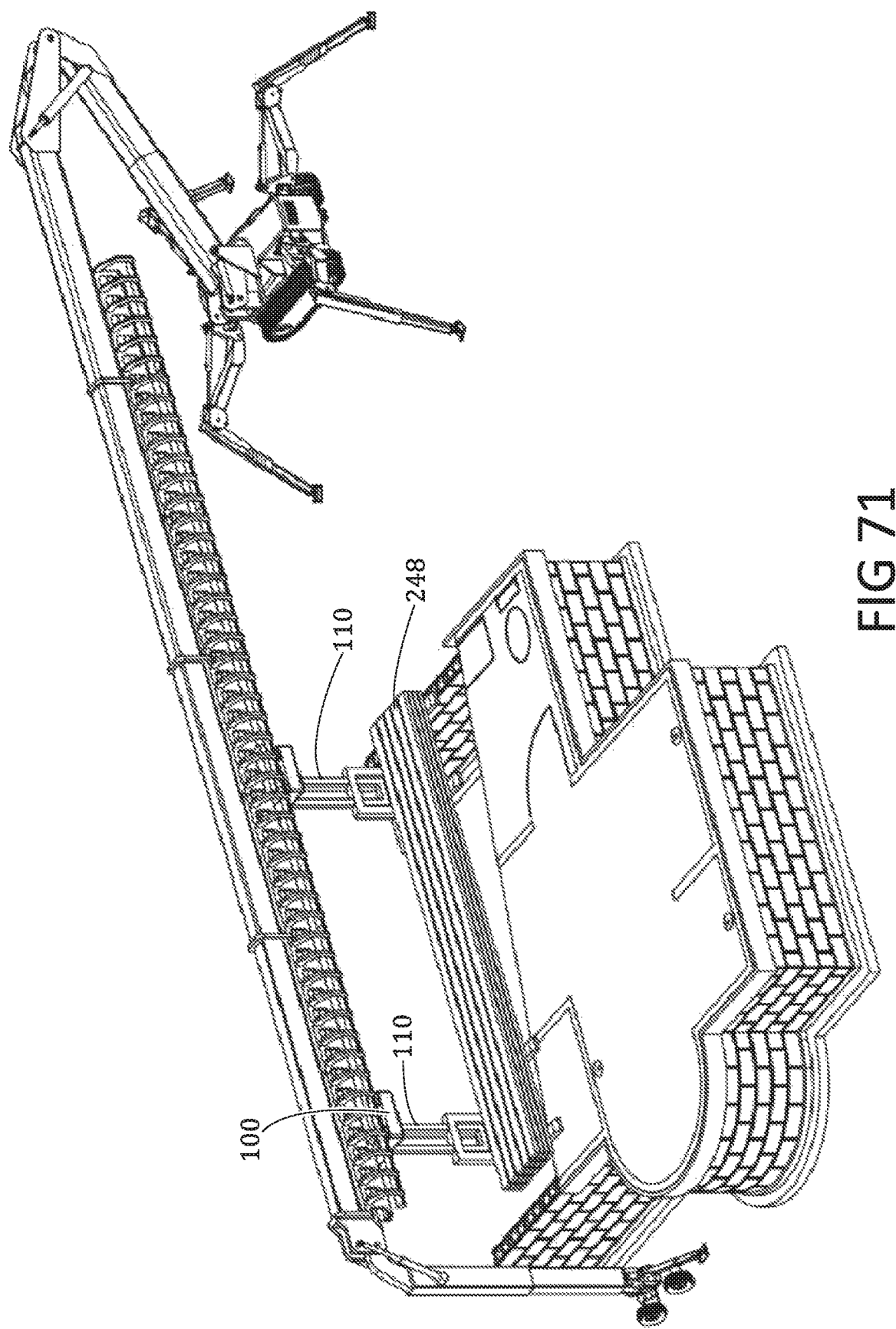
FIG. 71 is a schematic perspective view of the apparatus in FIG. 1 illustrating how the apparatus can lift lumber onto a construction site.
Figure 72:
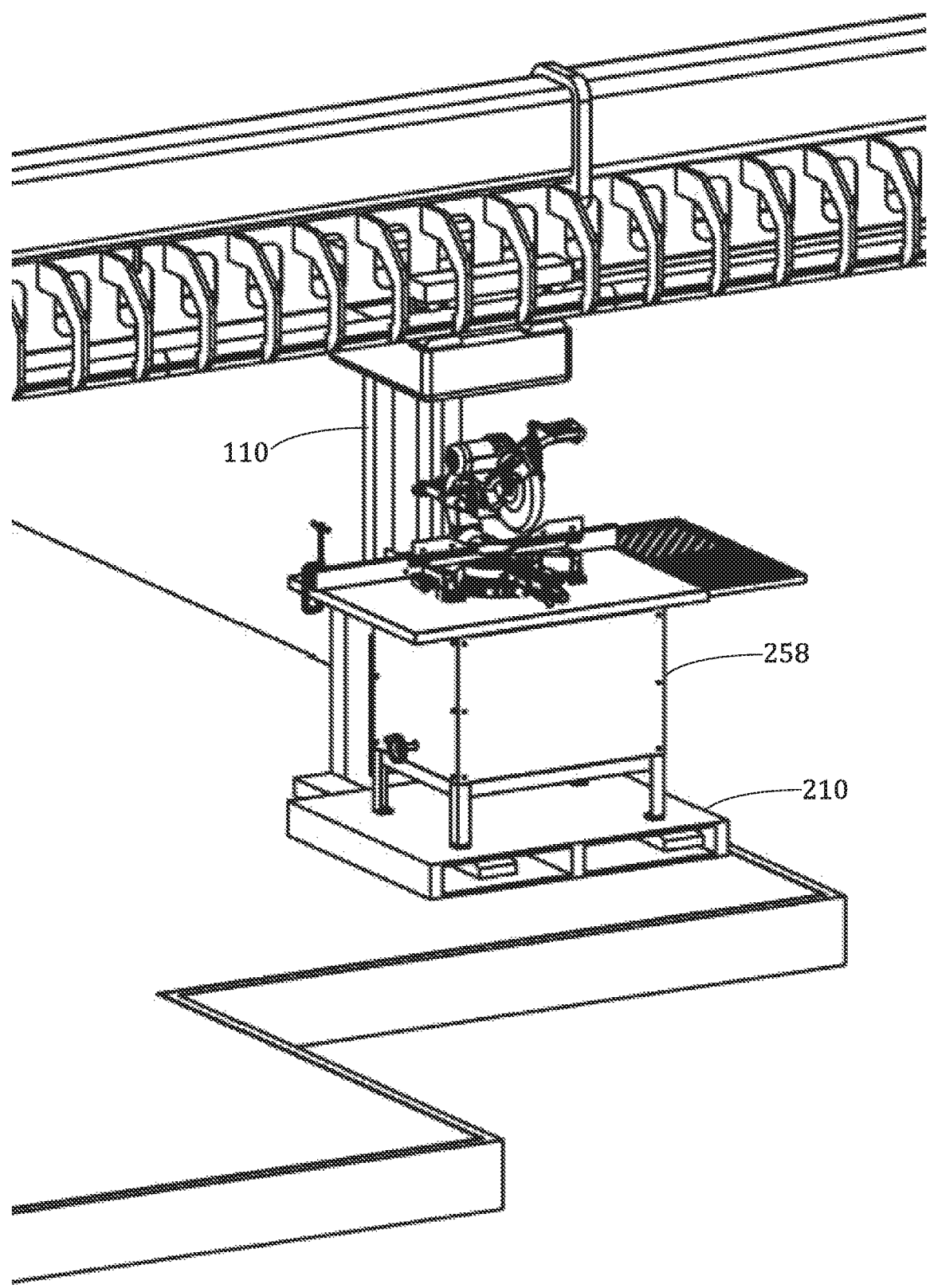
FIG. 72 is an enlarged schematic perspective view of the apparatus in FIG. 1 illustrating how the apparatus can lift a moveable workstation onto a construction site location.

Attachments to the trolley can include a forklift attachment 110 in FIGS. 68, 71, and 72; or a hoist attachment 92 shown in FIGS. 10, 65, and 68; or a moveable angled conveyor belt 158 in FIGS. 45, 46, and 47; or different types of robotic arms such as the alternative multi-axis robotic arm 802 and hydraulic robotic arm 810 in FIGS. 11, 12, and 13; or a mid-support cantilever leg 250 shown in FIG. 59 which depicts how the device can be reconfigured into a cantilever type configuration. Multiple other attachments can include, but not limited to, other construction tools, large augers and drilling devices, pneumatic equipment, scaffolds, waste bins, cherry picker buckets, ladders, boom arms, vertical and horizontal saws, tool and material supplies, workstations, bending equipment, soldering equipment, tanks, concrete mixers, screw feeders, compressors, electrical outlets, water outlets, extension cable holders, air pressure hoses and outlets, industrial vacuums and blowers, fans, and awnings. Multiple trolleys with robotic arms can be functional at the same time and do separate tasks or work together to complete a task. An example of working together would be one robotic arm holding up material for another robotic arm to secure.

Different construction implements can be attached to the implement connector for mechanical arm 804 (FIG. 11) or to the implement connector for the hydraulic arm 808 (FIG. 12) for doing specific projects. More than one implement or peripheral device can be attached to the robotic arm such as a camera and a grip implement.

Figure 61:
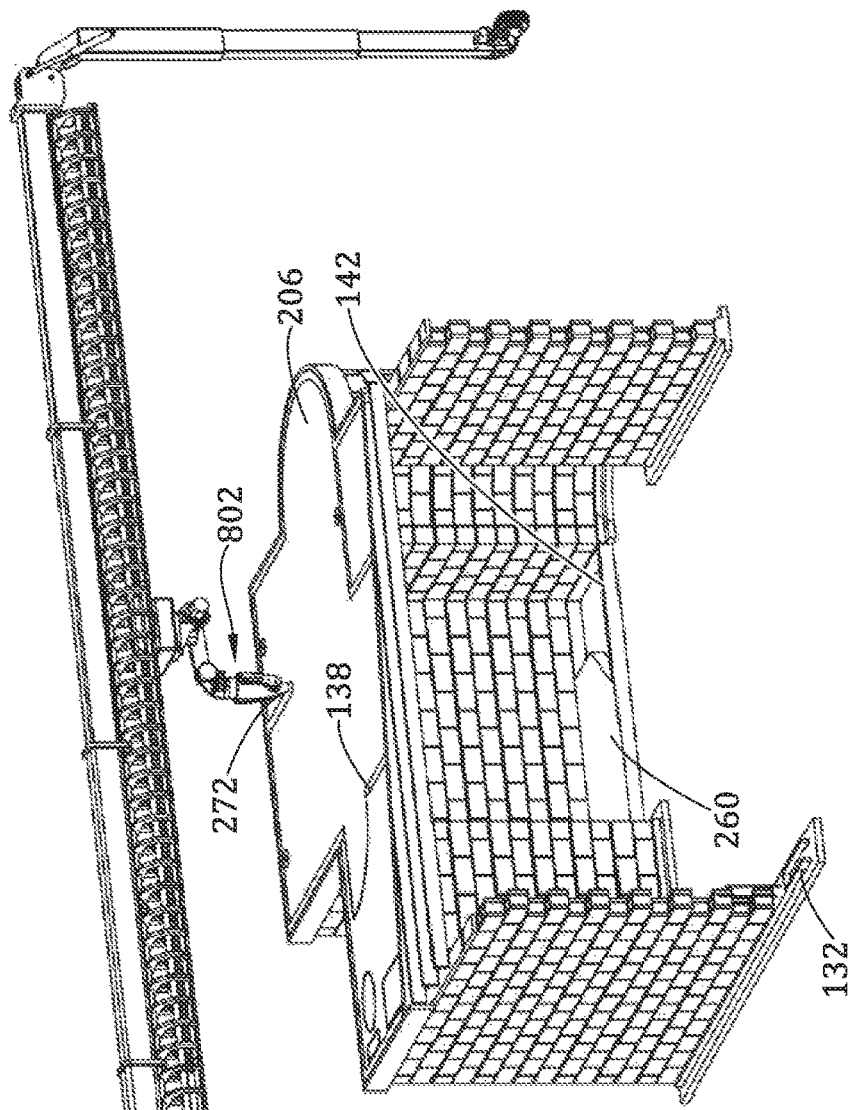
FIG. 61 is a schematic perspective view of the apparatus in FIG. 1 illustrating the extended gantry position and shows the robotic arm with the spray nozzle attachment spraying the floor with a floorplan layout.
Figure 62:
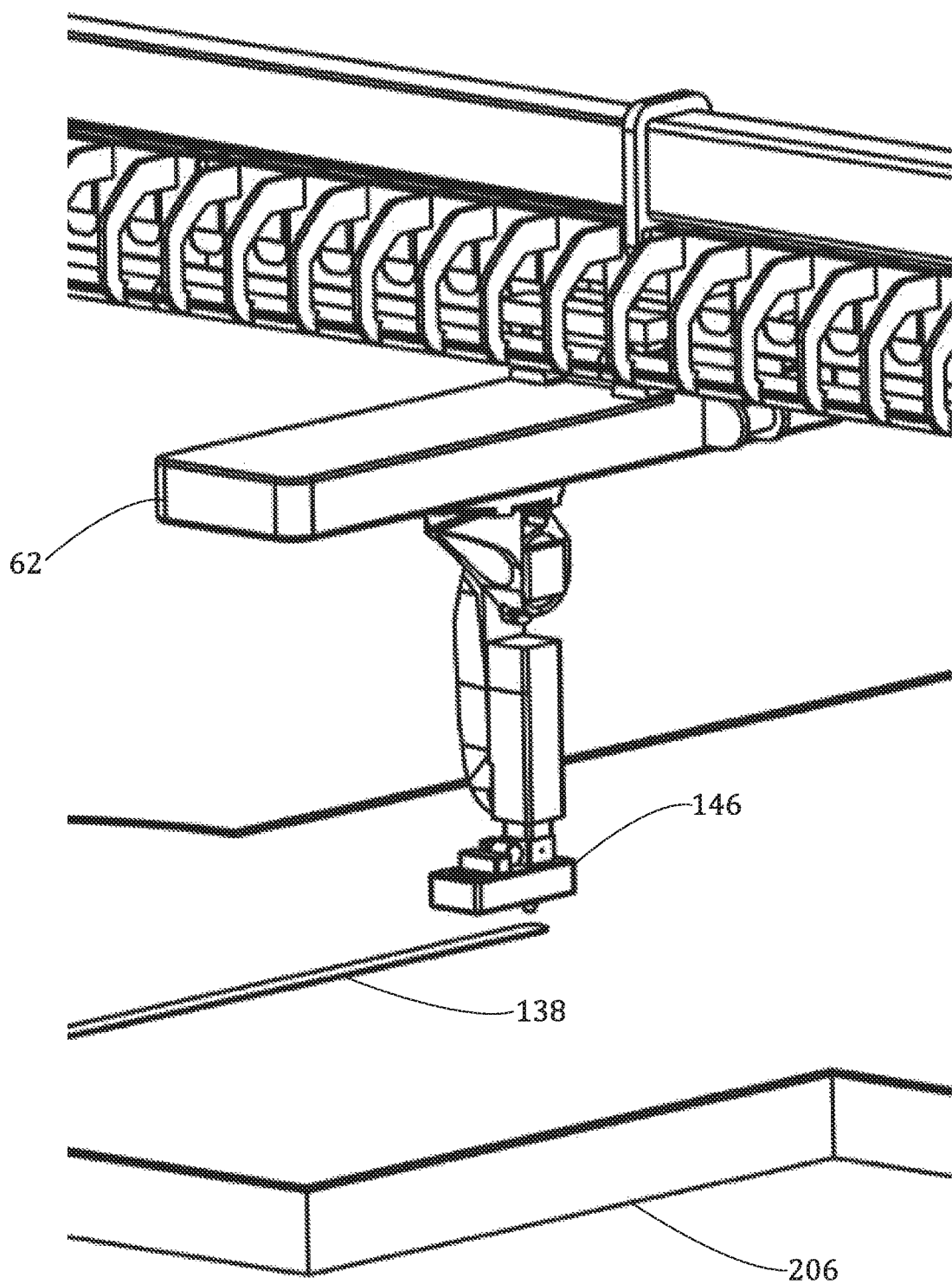
FIG. 62 is an enlarged schematic perspective view of a portion of the apparatus illustrating the robotic arm with the spray nozzle attachment spraying the floor with a floorplan layout.

Some examples of the implements shown in FIGS. 11, 12, and 13 are the gripper attachment 72, blade 94, and excavation bucket 96. Other implements include rototiller blades 220 (FIGS. 75 and 76), additive fabrication nozzle 198 (FIGS. 63 and 64), and spray marking nozzle 146 (FIGS. 61 and 62). Various other attachments may include survey and land penetrating equipment, stake driver, grapple, hoist, forklift, spray gun, loader shovel, dozer blade, breaker, excavator arm, trencher, tiller, earth drill, compactor wheel, soil compactor, plate compactor, rebar tie device, power trowel blade, large circular saw, concrete mixer, circular trencher, large drill, side clamp, suction cup, grass fork, log grapple, screening bucket, cutting drum, road sweep, scraper, auger, tamper, backhoe, ripper, plow, compactor jumping jack, rammer, blade finisher, brush, paint spray gun, power saw, quick coupler, quick hitch, lights, fans, heat guns, machining mill/drill and bit holder, water jet cutters, welding equipment, laser cutters, etching equipment, pile driver, laser pointer, pruning equipment, concrete pouring tube holder, plaster implementation device, soft clamp, suction cup device, snow blade, vibratory roller, clamshell bucket anvil, rock crusher, and rebar benders.

The gripper attachment 72 can be used for a variety of applications for construction of buildings, construction of driveways gates, walls and fences, landscaping, and pool and patio by picking and placing bricks, rockwork, cobblestones, paver stones, trim, molding, plaster, boards, tiles, anchor bolts, concrete spacer blocks as well as rebar. The robotic arm with the grip can lift heavy components into place or hold tools and materials for site workers as well as place windows, frames, mirrors, cabinets, molding, and shelving with precision. The robotic arm can also have smaller devices attached such as sensors, scanners, and cameras that can relay information to the controller in order check project development, real time feedback on a task, and insure high quality control checkpoints. The robotic arm can also have machining tools attached that can mill out stone, rock, wood, foam or other material that can be sculpted. The multi-axis robotic arm can create large format free standing sculptures, 3D wall murals, or environmental forms such landscaping rockwork and landscapes. The device can create unique rock walls and environments that would be expensive using traditional construction techniques. The design and engineering can be done on the computer and then be milled out accurately by the robotic arm. The linear robotic arm can also act as a large industrial CNC that can mill out large tools, forms, and parts for industries such as the auto, boat, and aeronautics. The device can act as a portable assembly line for just in time assembly applications at factories. Other uses may include installations for exhibits and trade shows as well as lighting and camera support for the movie industry or concert venues.

A 3D scanner/digitizer can be attached to the end of the robotic arm to create accurate 3D topographical computer models of the area or of details on walls, rockwork, or other objects. The 3D models can then be utilized by software programs for integration with architectural models as well as to create land grading, excavation, or CNC machining plans. Combined with information from survey equipment, site excavation will be very accurate. A camera can be attached along with other sensor devices such as land penetrating equipment and 3D scanners to photograph a site and include metadata information including a grid overlay with accurate coordinate information, site information, 3D mapping and sub-terrain information. This will be a good tool for investigation areas, archeological or scientific exploration, and remote site planning and operations. The device can be sent to a site terrestrial or non-terrestrial to accomplish tasks necessary for future development or recovery. The camera can also have motion sensor and night vision capabilities in order to act as a security camera at the worksite The drill tool is good for boring holes for poles, fences, and larger stakes. A water nozzle and water outlet will allow the device to automatically spray water at the site to suppress dirt, clean areas, prep ground for cement, and spray water on the cement during curing. Cutting tool attachments such as saws, laser cutters, milling bits, and grinders can cut and detail boards, rocks, counter tops, cement, and metal following predetermined files or on demand by the operator/technician. An alternative use of the device for the military and police is to utilize sensors on the device as well as to attach a mine field clearing implement and special grips to clear areas of mines, improvised explosive devices (IED), and other dangerous material. The device can be used for search and recovery applications. Using sensors and being capable of moving large objects, the device can be used to locate people and assist in recovery operations. The robotic arm can utilize a plurality of spray paint gun attachments as well as trim brushes to automatically paint or spray sealant on an object or building or in more precise and detailed methods.

Figure 21:
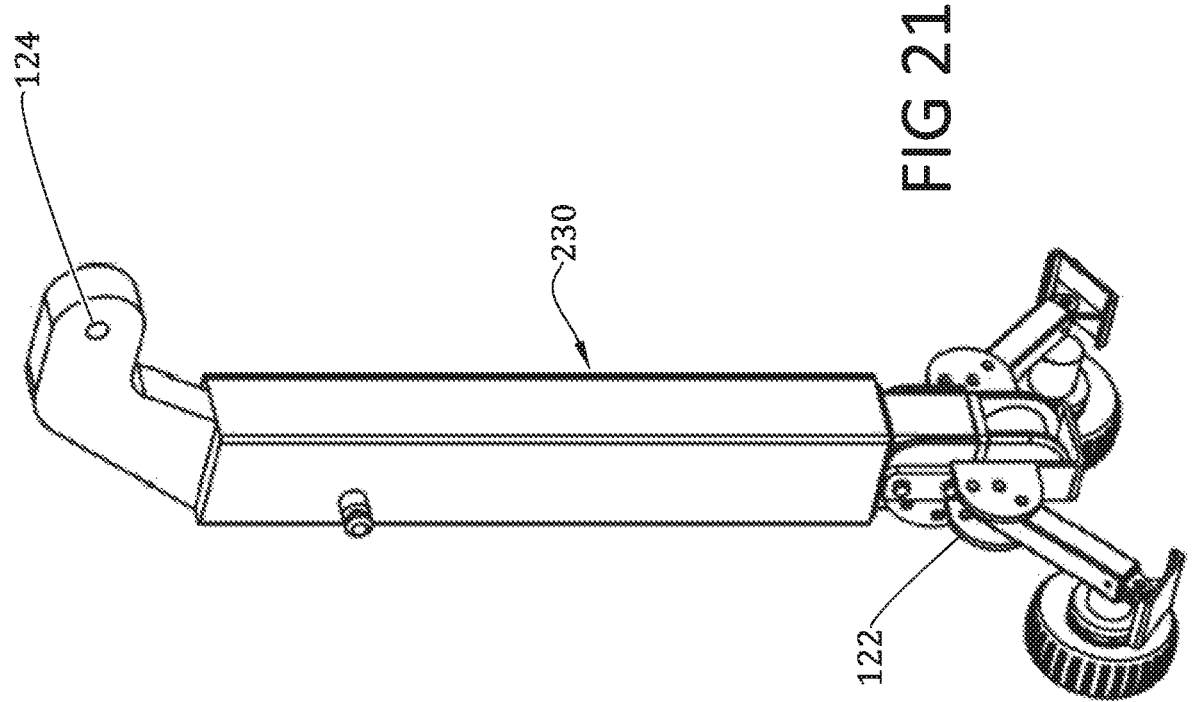
FIG. 21 is a schematic perspective view of a support leg accessory attachment.

FIG. 21 is an alternative to the current preferred embodiment with an accessory support leg 230 that can transform current boom lifts and excavators into heavy lifting gantry devices. This will allow current boom lifts and excavators to lift more weight and stabilize the equipment during lifting as well as create a superstructure that a track and linear robot can connect to. The attachment can be a bolt hole 124 as shown in FIG. 21 or be attached via clamps, hydraulics, or other mechanical locking mechanisms.

Figure 22:
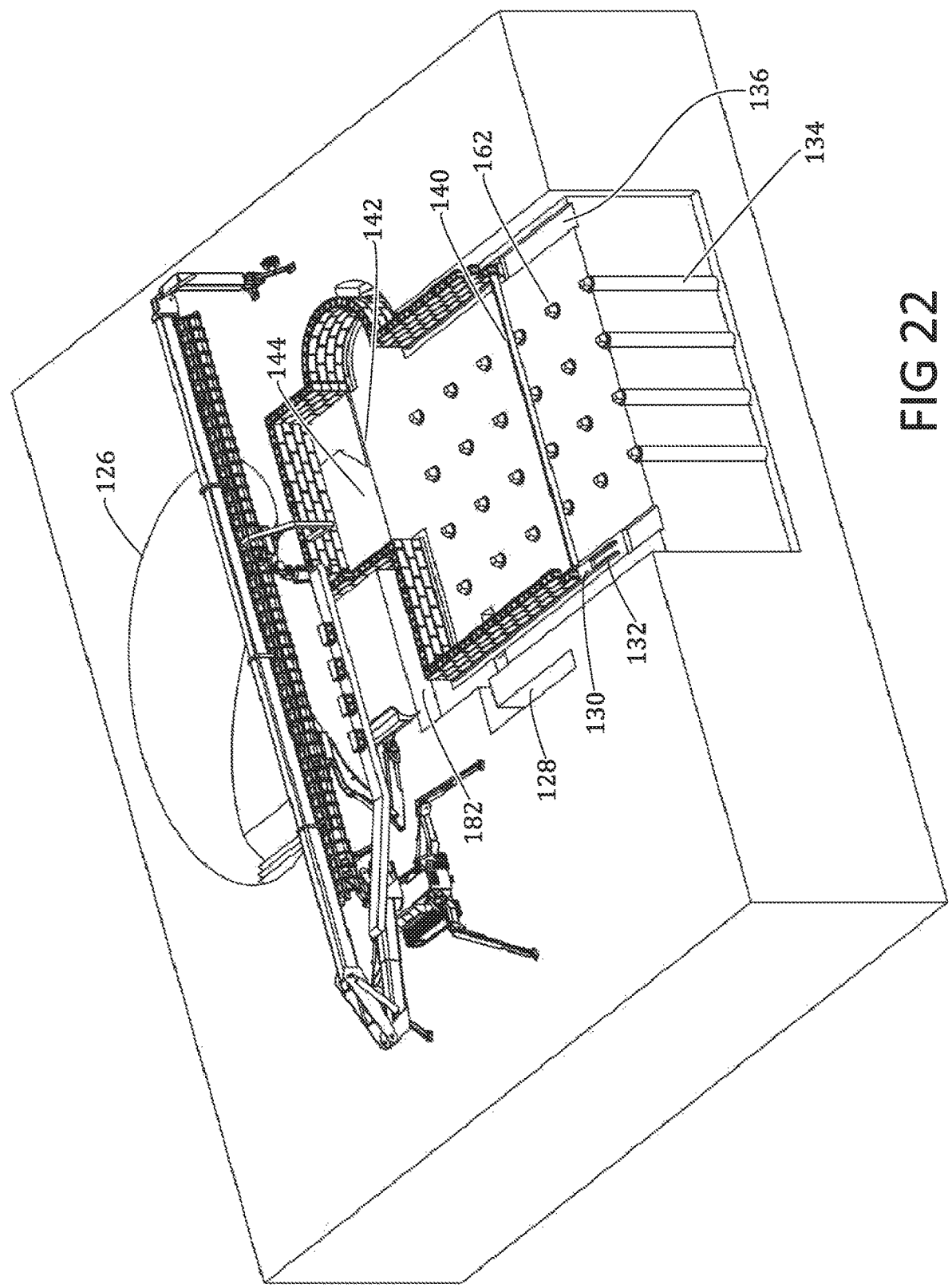
FIG. 22 is a schematic perspective view of the apparatus in FIG. 1 illustrating the apparatus in use during construction of a building.

FIG. 22 illustrates some of the functionality of land preparation and foundation of the device such as excavating a basement 182, excavating drainage, utility lines, septic lines, or ditches 128, drilling pillar supports and pouring concrete 134, excavating the foundation footer 136, additive fabrication of the foundation border 132 (replaces the use of batter boards), additive fabrication of the basement slab wall 142, pouring of the basement slab 144, pouring of the foundation wall 130, precision placement concrete spacer blocks 162, placement of wood beams 140, and excavating a pool 126.

Figure 33:
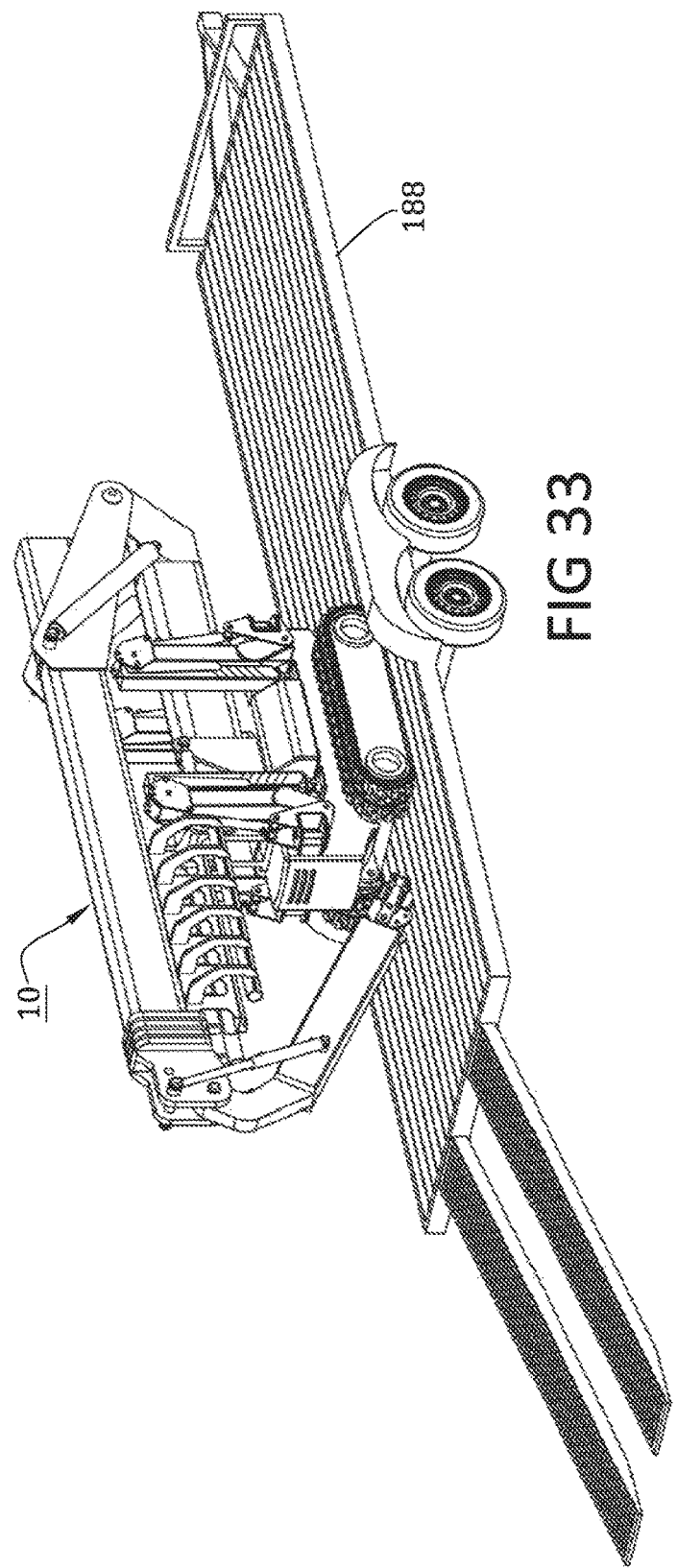
FIG. 33 is a schematic perspective of the folded and unextended apparatus if FIG. 1 illustrating how the apparatus can be transported on a trailer.
Figure 34:
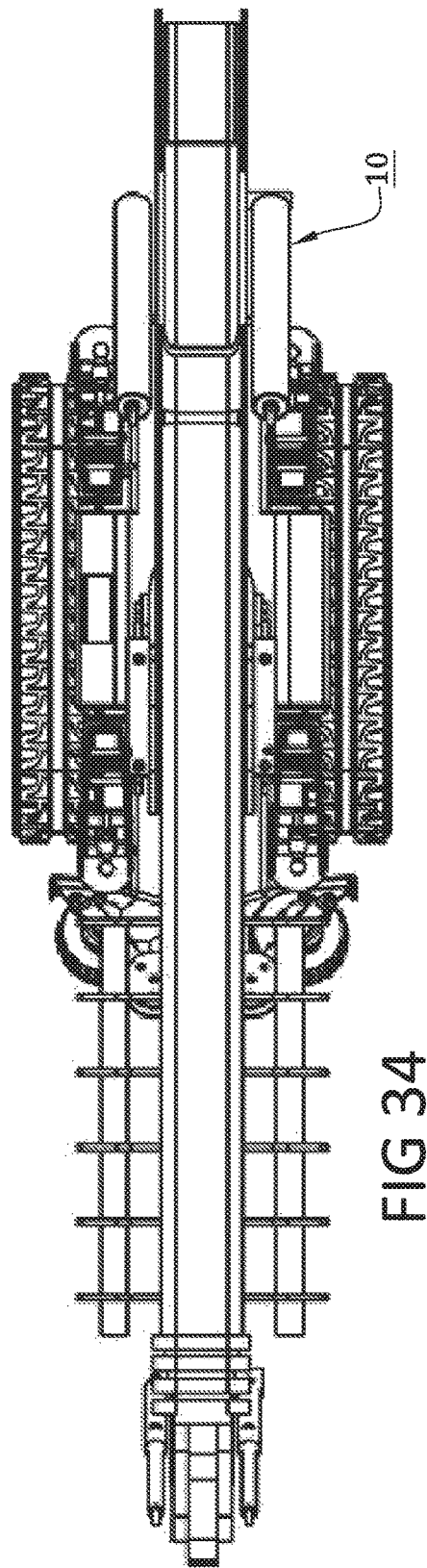
FIG. 34 is a schematic top view of a folded and unextended apparatus of FIG. 1 illustrating the compact design of the apparatus when not extended.
Figure 35:
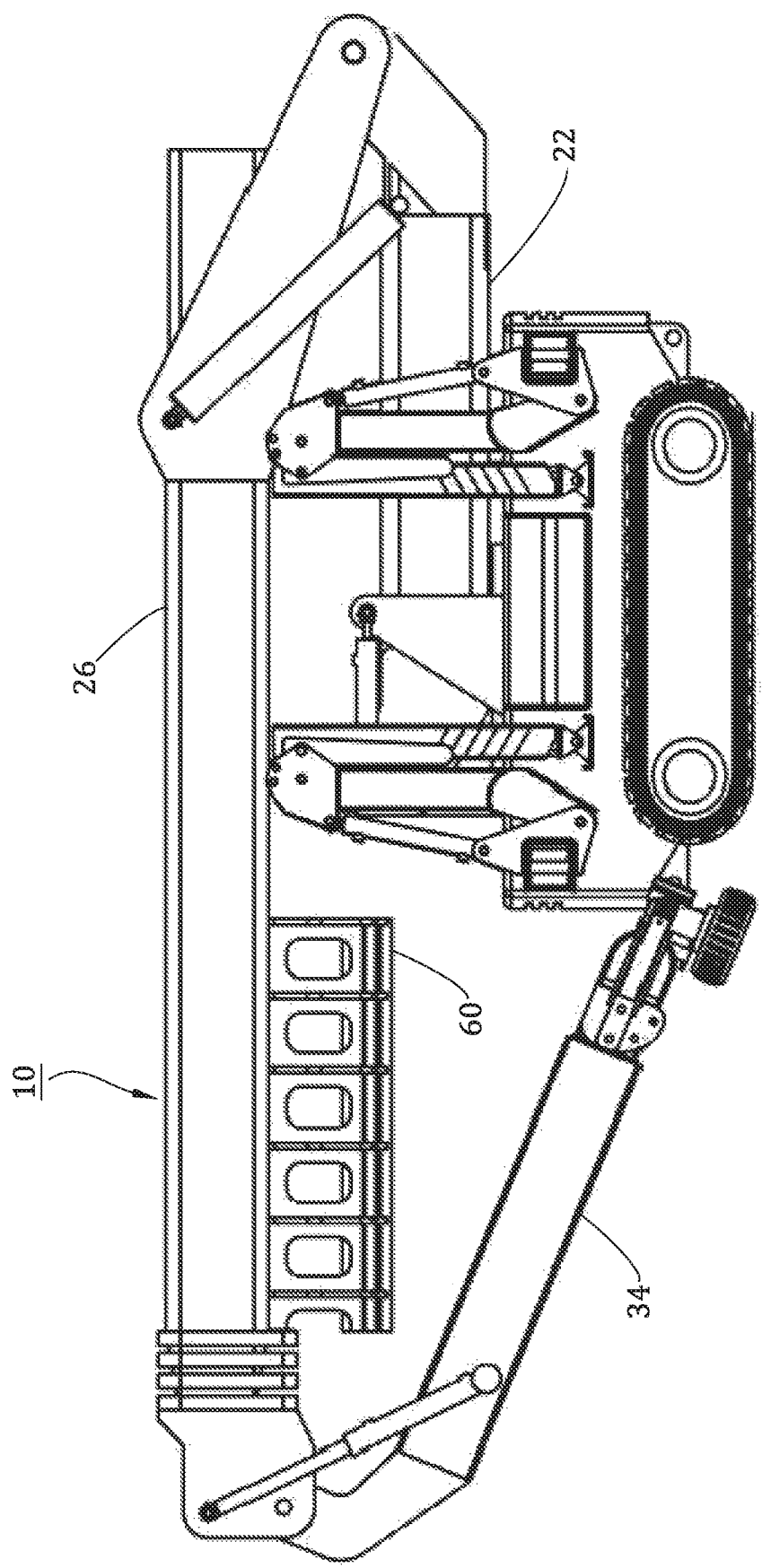
FIG. 35 is a schematic front view of a folded and unextended apparatus of FIG. 1.
Figure 37:
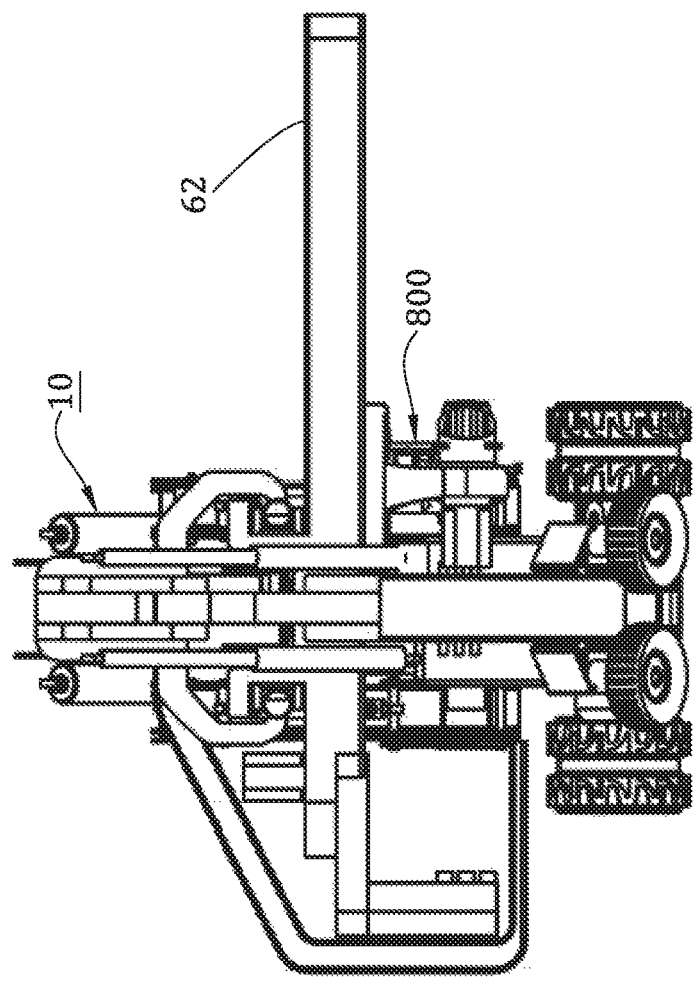
FIG. 37 is a schematic side view of a folded and unextended apparatus of FIG. 1 with the extended trolley and Linear Robotic Arm attached.
Figure 36:
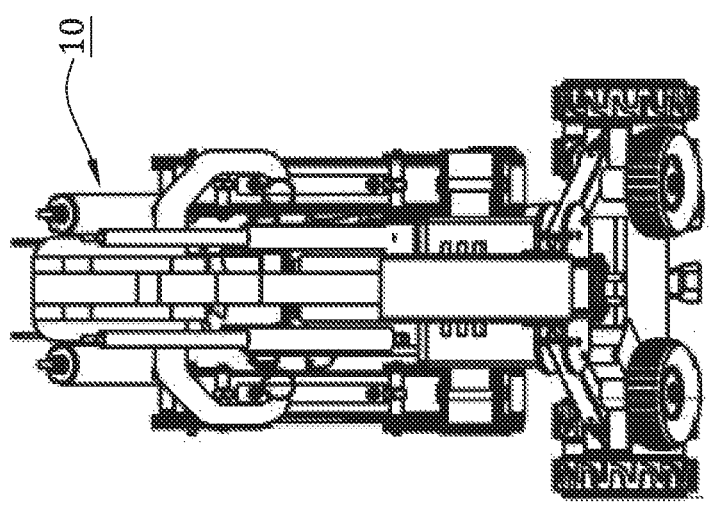
FIG. 36 is a schematic side view of the folded and unextended apparatus of FIG. 1.
Figure 38:
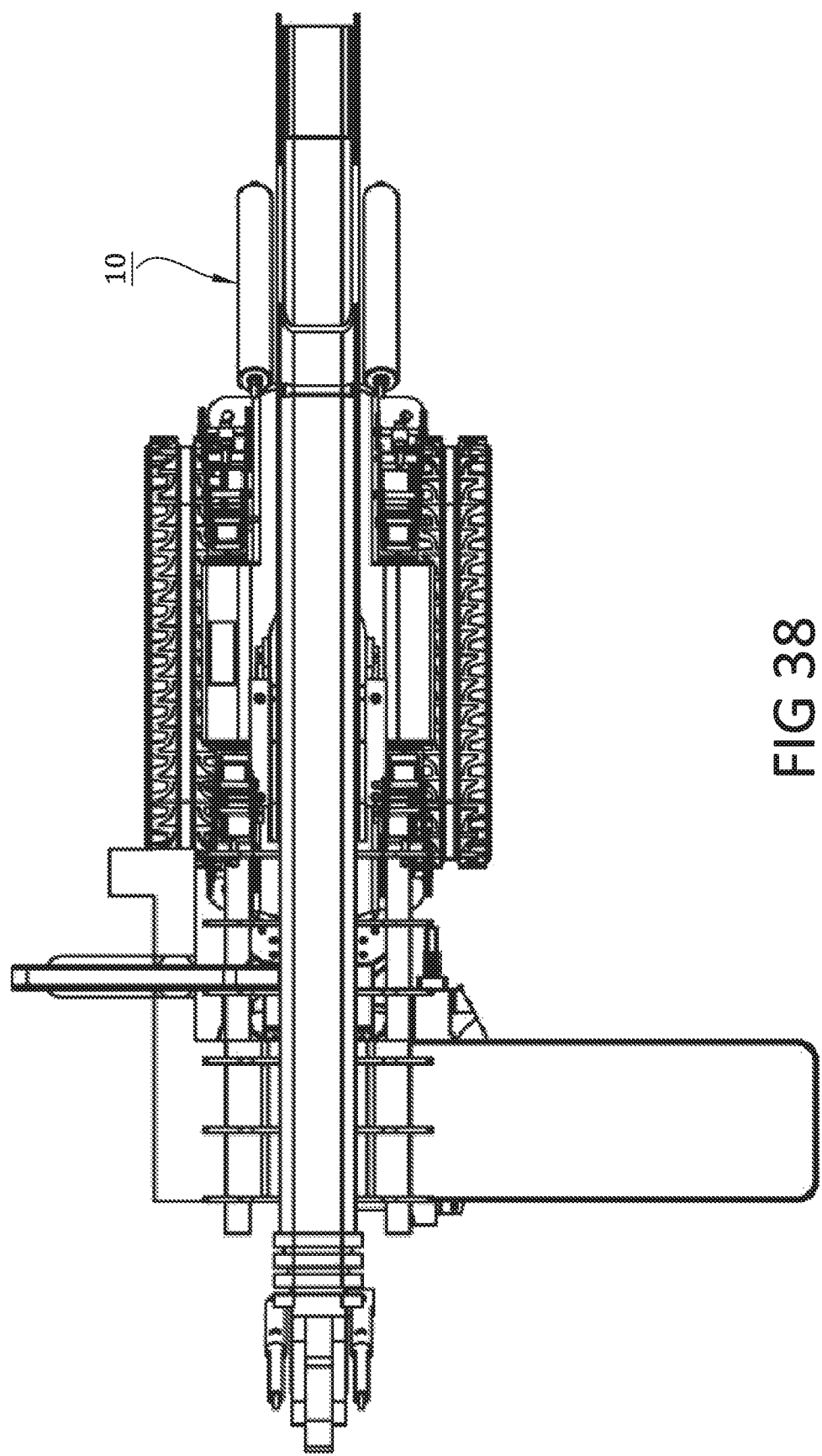
FIG. 38 is a schematic top view of a folded and unextended apparatus of FIG. 1 with the extended trolley and Linear Robotic Arm attached.
Figure 39:
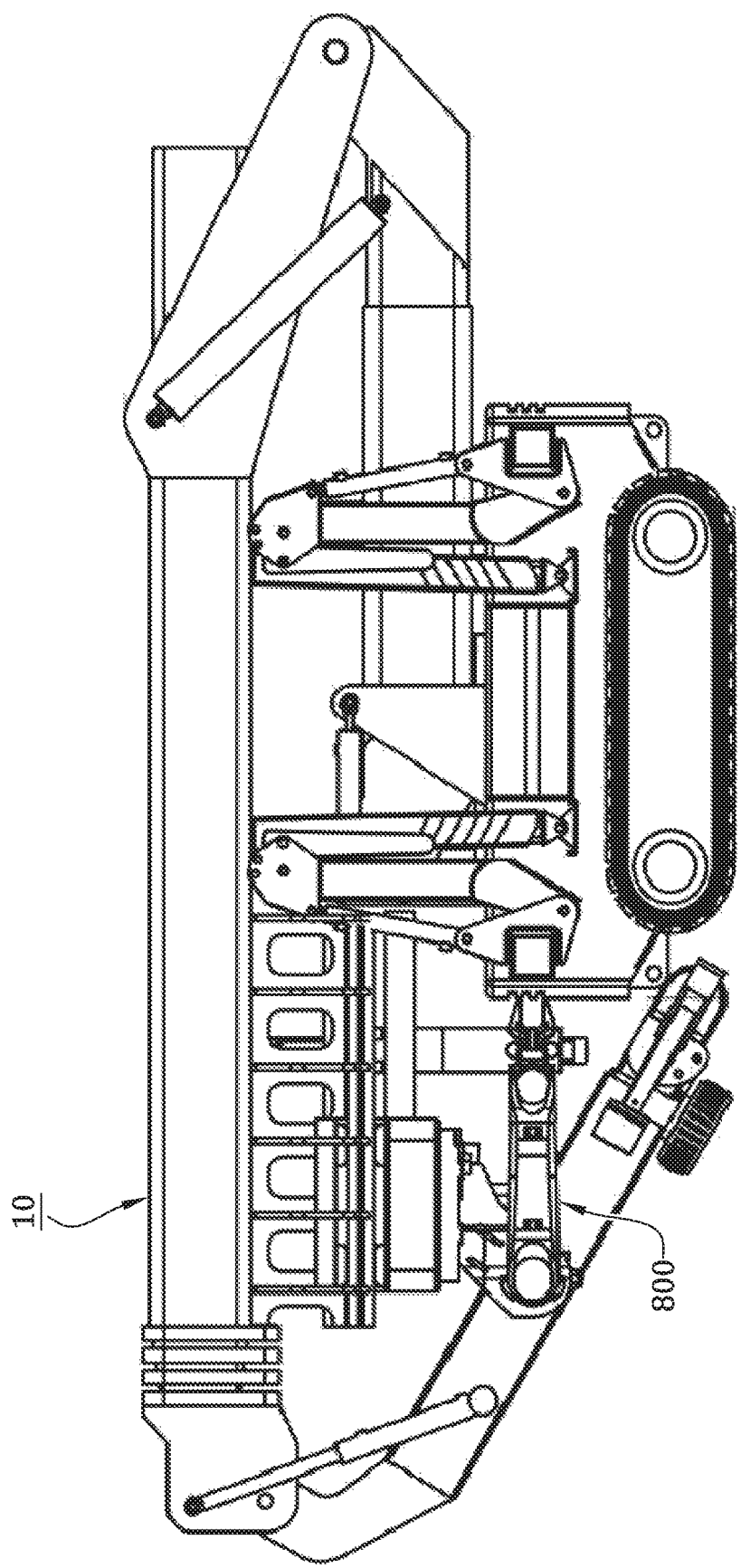
FIG. 39 is a schematic front view of a folded and unextended apparatus of FIG. 1 with the extended trolley and Linear Robotic Arm attached.
Figure 43:
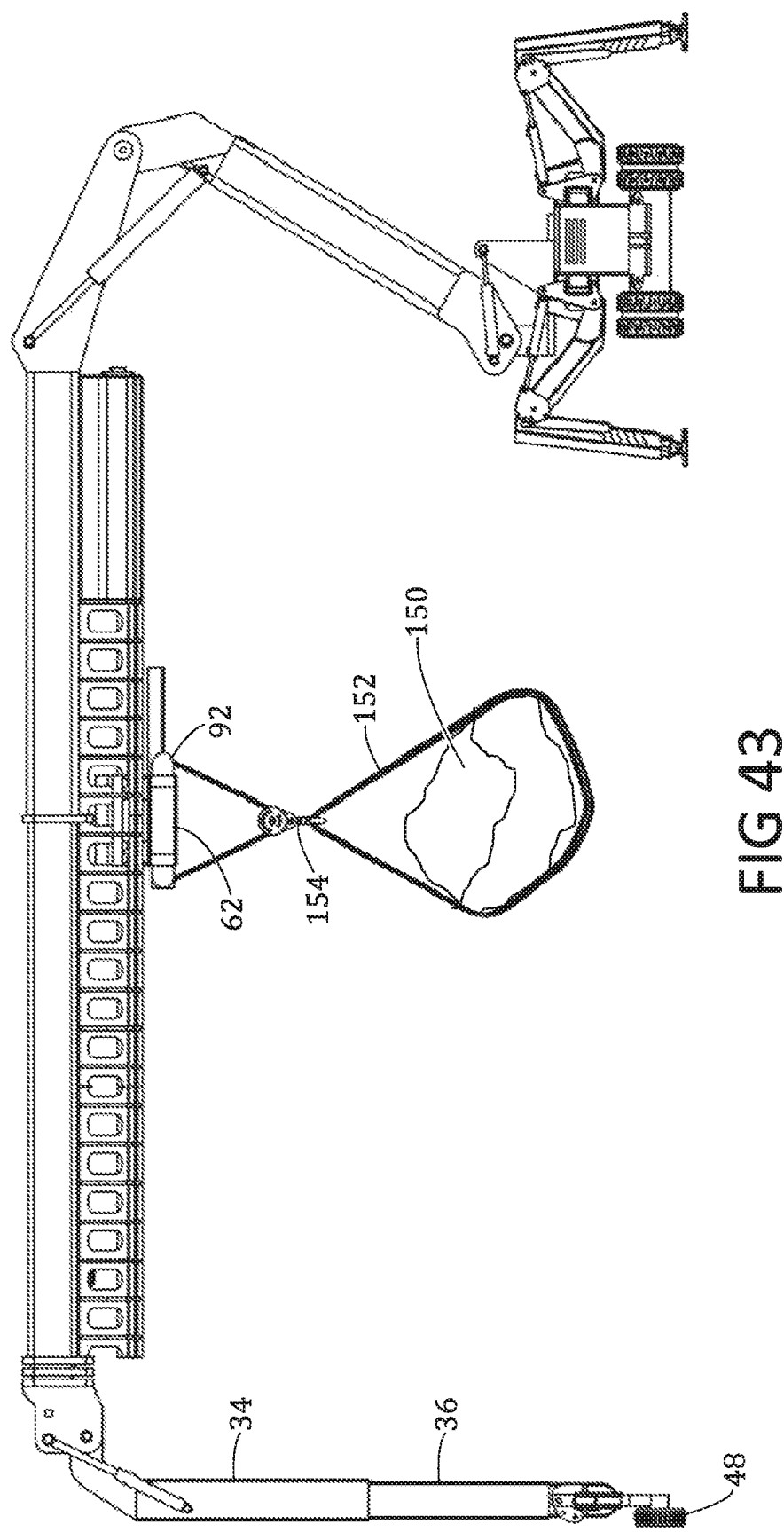
FIG. 43 is a schematic side view of the apparatus of FIG. 1 illustrating how the gantry boom can lift heavy objects such as a large boulder.

FIG. 32 is a perspective view of the device 10 in its current preferred embodiment folded up and un-extended. The compact design can maneuver easily through narrow pathways, has a smaller footprint, and is less intrusive to the environment which is a beneficial advantage over current dozers and excavators which are known to affect the environment due to the space needed to maneuver as well as move dirt around. FIG. 33 shows how the device can be transported on a flatbed trailer 188. FIGS. 34, 35, and 36 shows different orthographic views of the device in the folded up and un-extended configuration. FIGS. 37, 38, and 39 show the folded and un-extended configuration with the extended trolley arm and robotic arm attached. FIG. 43 shows how the gantry as well as the hoist attachment 92, pulley block 154 on the extended trolley 62, and cables 152 can lift large objects such as a boulder 150. A gantry structure can lift many times the weight that a similar size boom lift, crane, or excavator arm is capable of lifting. This is because the gantry has two legs to distribute the weight versus the boom lift, crane and excavator arms which can only be supported by the main base and outriggers.

Figure 44:
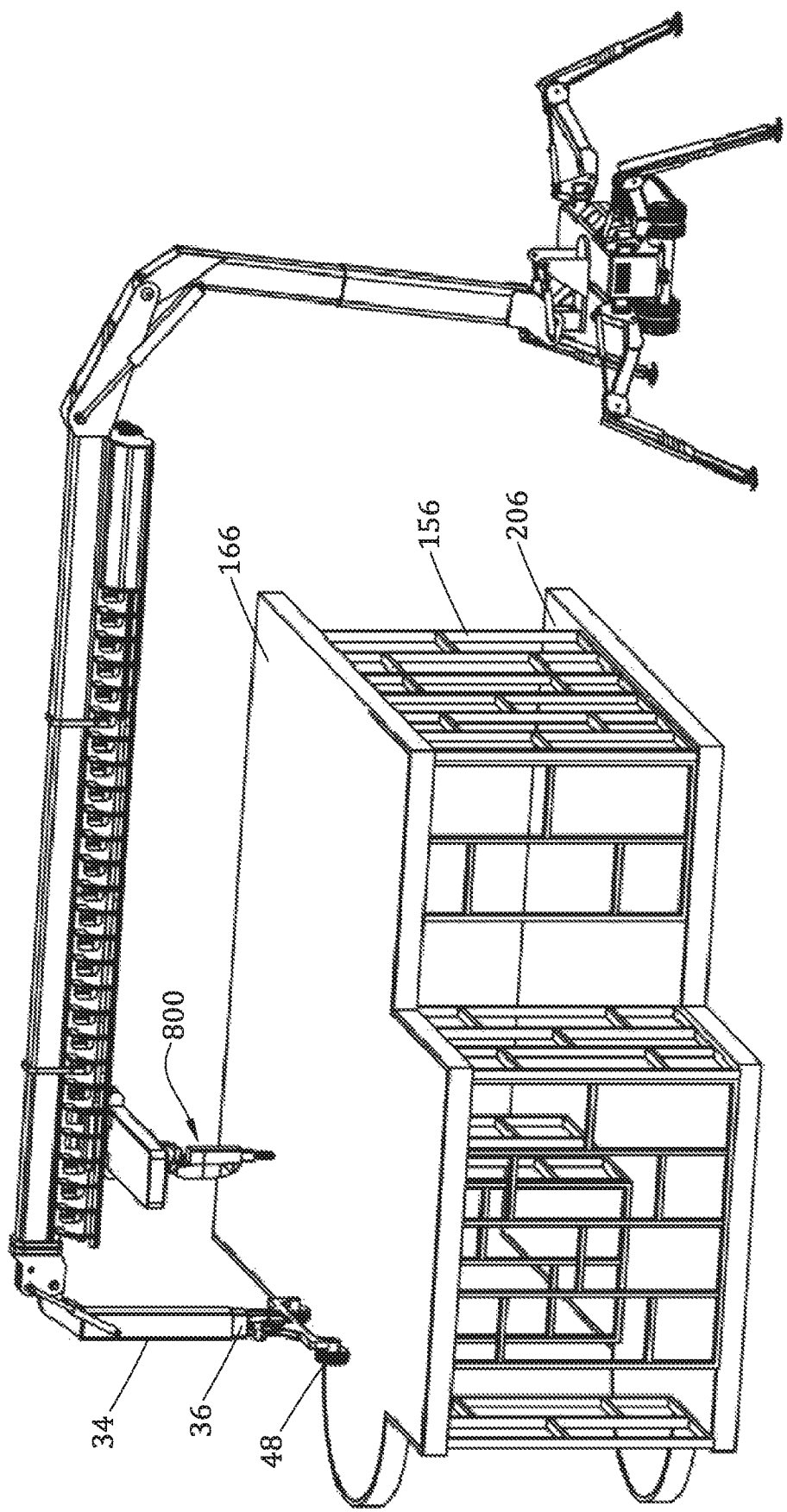
FIG. 44 is a schematic perspective view of the apparatus in FIG. 1 illustrating another configuration of the beams and support legs to raise the height of the Gantry to an upper level.

FIG. 44 shows how the support jib boom leg 34 can be supported on a different level than the main chassis 40. In this particular illustration, the wheels 48 on the support jib boom leg 34 are supported by the second level of a building 166. This allows the mechanical robotic arm 800 to perform its functions on a higher level.

FIG. 45 illustrates how the device can be configured to automatically dig and remove dirt via the hydraulic robotic arm 810 and the excavation bucket 96 moving dirt to the moveable angled conveyor belt 158 which will then move the dirt along the siderail trough 160 and the bridge conveyor belt 52 and into the lower conveyor belt 224 which will deliver the dirt to a dirt pile, rock crusher equipment, or into a dump truck for removal.

FIG. 46 shows how the moveable angled conveyor belt 158 can be moved out of the way of the excavation bucket 96 through a conveyor belt support arm 168 along the Y axis of the extended trolley 62.

Figure 48:
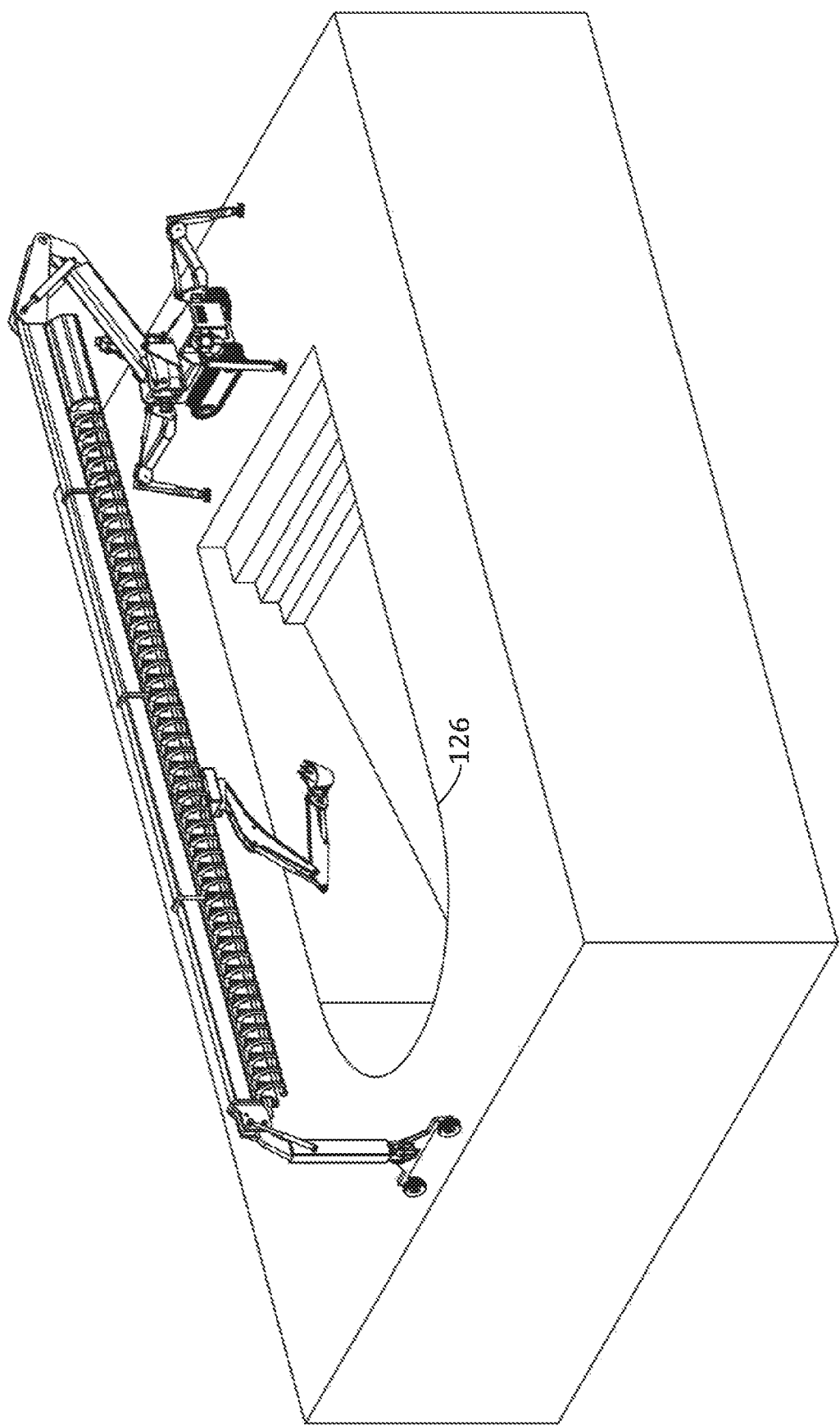
FIG. 48 is a schematic perspective view of the apparatus in FIG. 1 illustrating the apparatus in use excavating a pool.

FIG. 47 shows digging capabilities of the robotic arm 170 and how the device can be used to excavate, contour large areas and landscaping, grade roadway slopes, create terraces, as well as create retaining walls. The device can grade a path for itself to move along 172. Land contouring can be so exact as to be utilized to create golf courses and sport courts. Other applications could include excavating outdoor spaces for lounges, fire and barbecue pits, outdoor kitchens, patios, and underground shelters. The device can clear land and create fire prevention areas. The device can also be used for canal and levee Maintenance FIG. 48 shows how the device can excavate a pool 126. The device can also help move material into the pool such as rebar, support blocks, wire mesh, tiles, and piping for the site workers to have easy access to. The robotic arms can automatically spray shotcrete, plaster, sealer, or other material into the excavated hole to create the pool, pond, retaining wall, basement, or tunnel wall. The device can also spray concrete onto a hill such as to reinforce a hill. The device can utilize a special implement at the end of the robotic arm to apply detail tile work to the pool.

FIG. 49 shows how more than one trolley can operate on the track at the same time. In this drawing, the mechanical robotic arm 800 attached to the extended trolley 62 can pick and place bricks 174 at the same time as the hydraulic robotic arm 810 with the excavation bucket 96 attached to a simplified trolley 100 can excavate.

Figure 60:
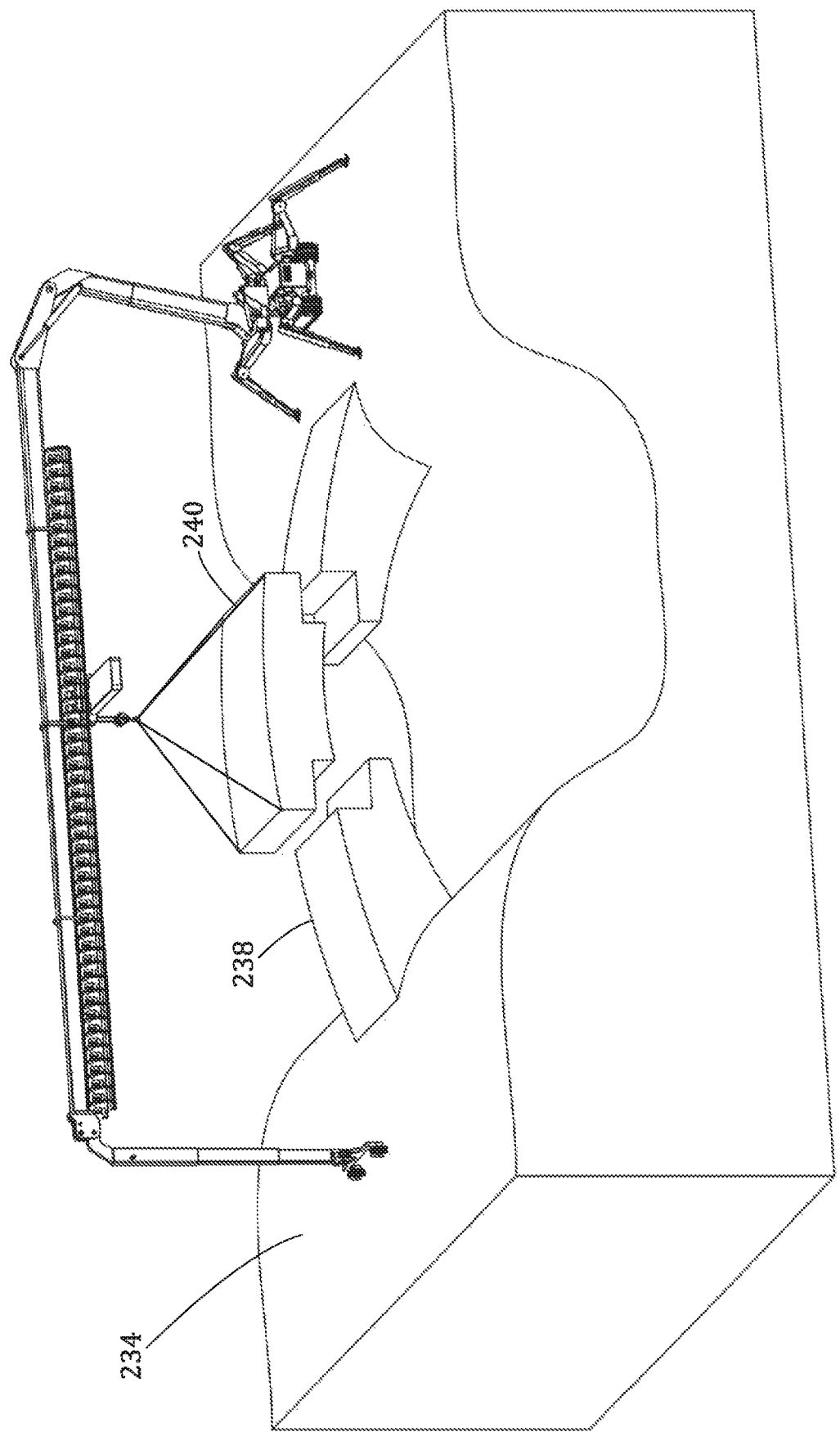
FIG. 60 is a schematic perspective view of the apparatus in FIG. 1 demonstrating the capabilities in building bridges.

FIGS. 55, 56, 57, 58, and 59 show different configurations of the device dredging, excavating a sea wall foundation 194, and building a sea wall 186. The use of a floating platform 184 on the water 192 as well as stabilizing poles 190 can allow the device to sit on or extend to a floating platform which will allow for a greater reach of the dredging equipment and the ability to build the sea wall at varying distances. The gantry may be supported by the support leg in FIG. 56 which extends under the water to the floor. A special perforated plate, wheel, or footer could be attached to the bottom of the support beam for better stability and to not sink into the floor. Because of the extended arm of the extended trolley 62, the device can run parallel to the edge of the water and build a sea wall all along the gantry without the device having to move as shown in FIG. 58. FIG. 59 shows how a mid-support cantilever leg 250 can be moved within the bridge arm to create a cantilever configuration which can extend out over the water. The support leg will allow the boom arm more stability when in use. The support leg in this preferred embodiment is connected to a trolley and supported by metal supports 232. The supports can be configured for different angles of the support leg. The robotic or hydraulic arms of the device can clear debris from the water with a bucket attachment or other attachments such grass forks or log grapples. The device can also dredge underwater and create water channels as well as clean waste pits and settling ponds. The device can utilize more than one floating raft to dredge in the middle of a river, channel, lake or open water or be supported by a larger barge. The device can be used to build bridges across river banks 234 and create structural columns for bridges FIG. 60. The device can lift into place heavy prefab elements 240 onto anchor supports 238. An alternative to building a bridge is to utilize the bridge arm of the device as a portable bridge. The device can reach over the water or obstacle with its extended beams and support leg and have planking attached to the accessory arms 64 which could be walked or driven over.

FIGS. 61 and 62 illustrates how the robotic arm and an attached spray marking nozzle with a paint storage tank 146 or a spray painting nozzle without a paint storage tank 272 can spray mark 138 a floorplan and utility layouts onto the ground, baseboard 206, walls, or concrete slab 260. The spray markings will guide the site workers where to place frames as well locate electrical outlets, lighting, plumbing layouts, doors, bathrooms, kitchen islands, cabinets, counters, appliances, prefab material locations, HVAC, excavation areas, septic lines, irrigation, pool layouts, landscaping, decking, tiles, walls, or anything else that can be marked or pointed out by the automated robotic arm with the spray nozzle attached. This will reduce the time it takes to map out a floorplan or where piping needs to go, and, also reduces timing for construction workers for installation. Batter boards are not required to square the building or mark the foundation. Also, precision and accuracy of the computer assisted spray printing nozzle will improve the quality of the build and reduce errors by site workers.

Figure 63:
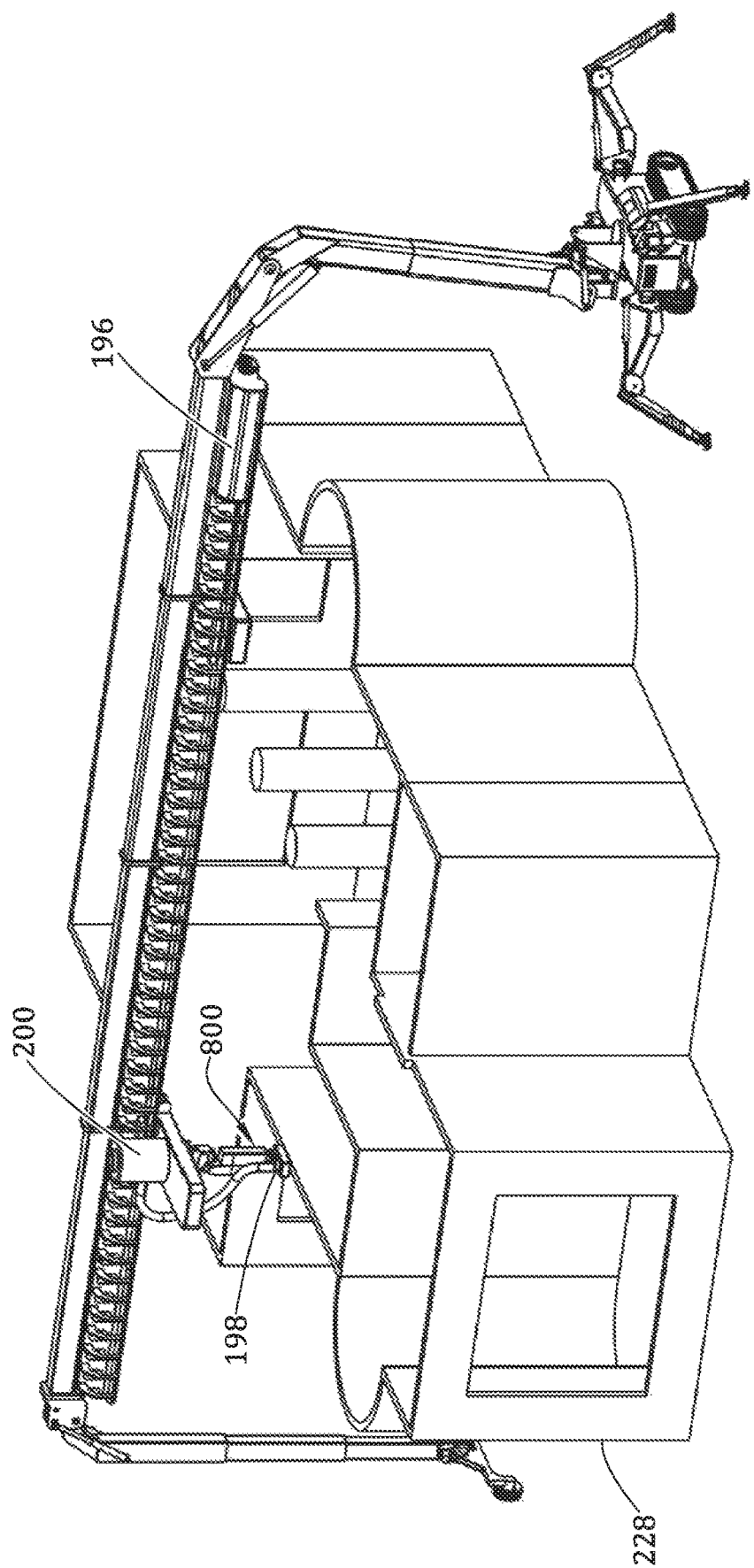
FIG. 63 is a schematic perspective view of the apparatus in FIG. 1 illustrating the apparatus using an additive fabrication nozzle to construct walls with additive material supplied by the onboard material mixer/screw drive.
Figure 64:
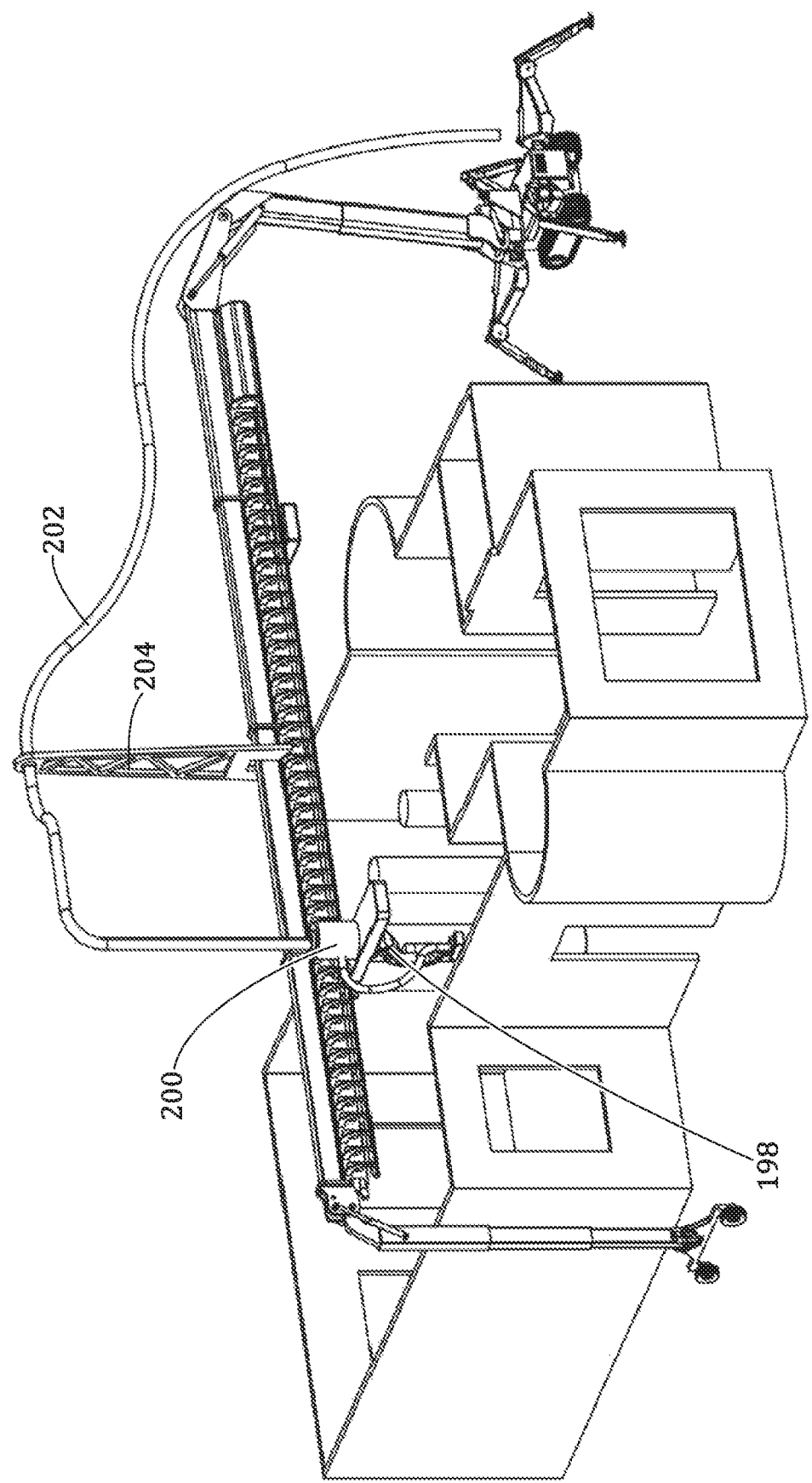
FIG. 64 is a schematic perspective view of the apparatus in FIG. 1 illustrating the apparatus using an additive fabrication nozzle to construct walls with additive material supplied by an external source.

FIGS. 63 and 64 illustrate how the device can be used for additive fabrication processes. In these drawings the gantry is a linear X,Y,Z computer controlled gantry on which an extended trolley 62 and a mechanical robotic arm 800 with an attachment additive fabrication nozzle 198 can extrude material to build walls 228 and other structural or decorative elements. A screw-drive and mixing module 196 on the gantry bridge can mix and push out additive material along the bridge and out to the application upper arm 256 and through the application nozzle arm 254 and the controlled additive nozzle 90. Concrete, aggregate, or other additive material can also be pumped up a tube 202 from a cement truck or mixer and over a tubing support beam 204 down to a screw-drive and mixing module on the Trolley 200 which will push out the correct amount of material through the controlled additive fabrication nozzle 198. Additive Fabrication can be used to build concrete borders (to act as a frames or batter board for cement to be poured into), edging for landscape, sidewalk, street, driveway, pool, and patio, build walls and columns, lay down mortar, caulking, or adhesive material (for tiles, boards, rockwork, framing, and roof panels), spray on shotcrete, stucco, or other types on structural type material, as well as spray on other types of materials such as sealers and water proofing, paint, fiberglass, insulation, foam, pest control, and plaster. Metals and Alloys can be extruded through a special additive nozzle and special mixer/screw drive. Adobe and Dirt can also be formed by the device for landscaping or special architectural details. Foam can be extruded for insulating walls and ceiling panels. Additive fabrication will allow architects and engineers to develop more efficient, unique, and cost effective buildings because the shapes and forms do not have to follow traditional building material and technology. The nozzle can make curved shapes, domes, arches, and unique window treatments as well as help engineers create solutions that may make buildings more efficient such as insert molding windows and doorways. The use of prefabrication material along with additive fabrication will make building custom homes less expensive and faster to produce. The additive nozzle can also make jigs for assembly procedures as well as fabricate custom components to be assembled during construction such as special arch bricks, columns, facades, decorative wall panels, or fireplace mantles.

FIG. 65 shows how the gantry can assist site workers in placing frames 156, dry wall, appliances, prefab material, cabinetry, or heavy objects onto baseboards 206 through the use of the hoist attachment 92 on the extended trolley 62.

Figure 66:
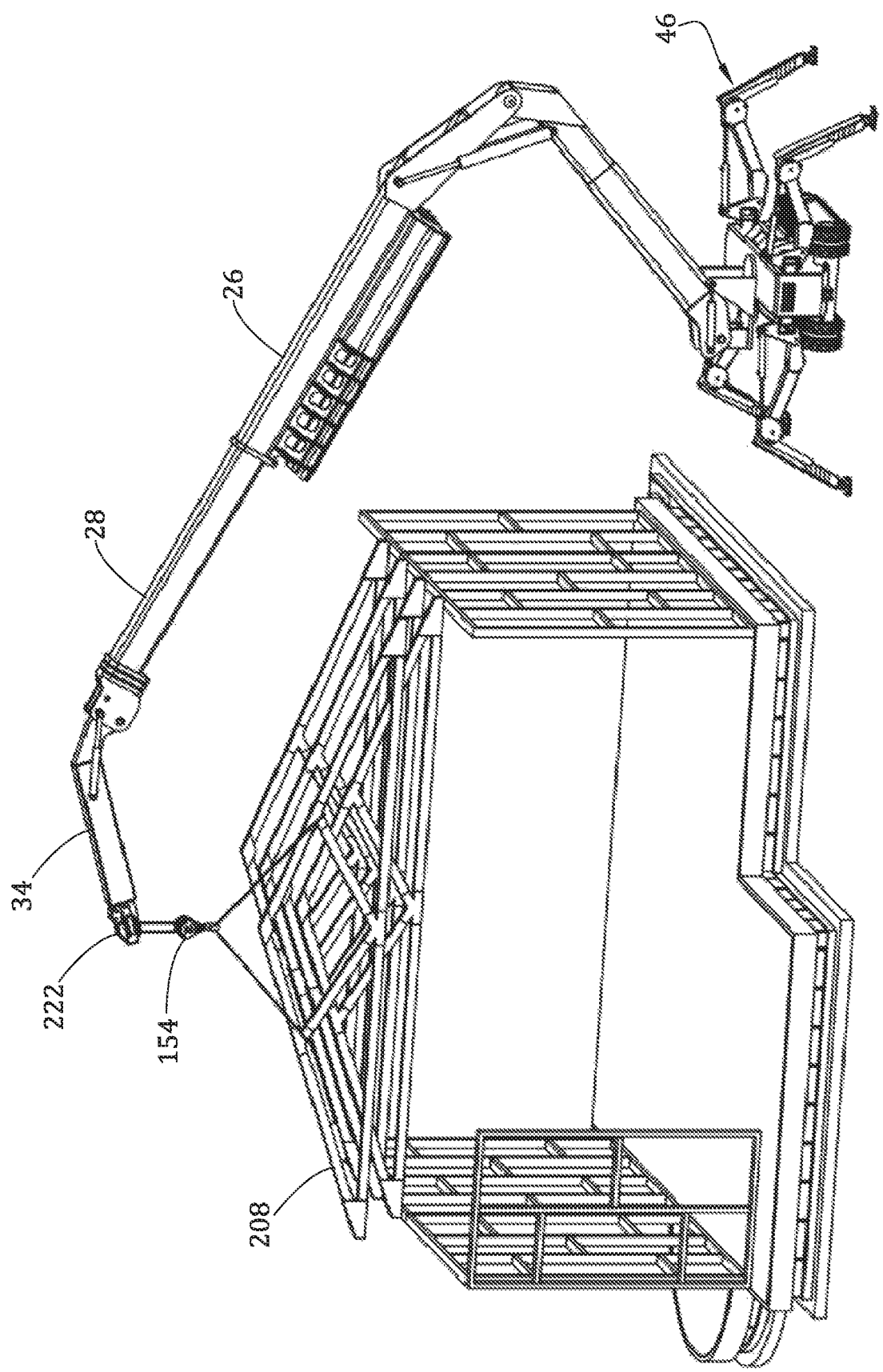
FIG. 66 is a schematic perspective view of the apparatus in FIG. 1 illustrating the apparatus lifting a roof frame into place.
Figure 67:
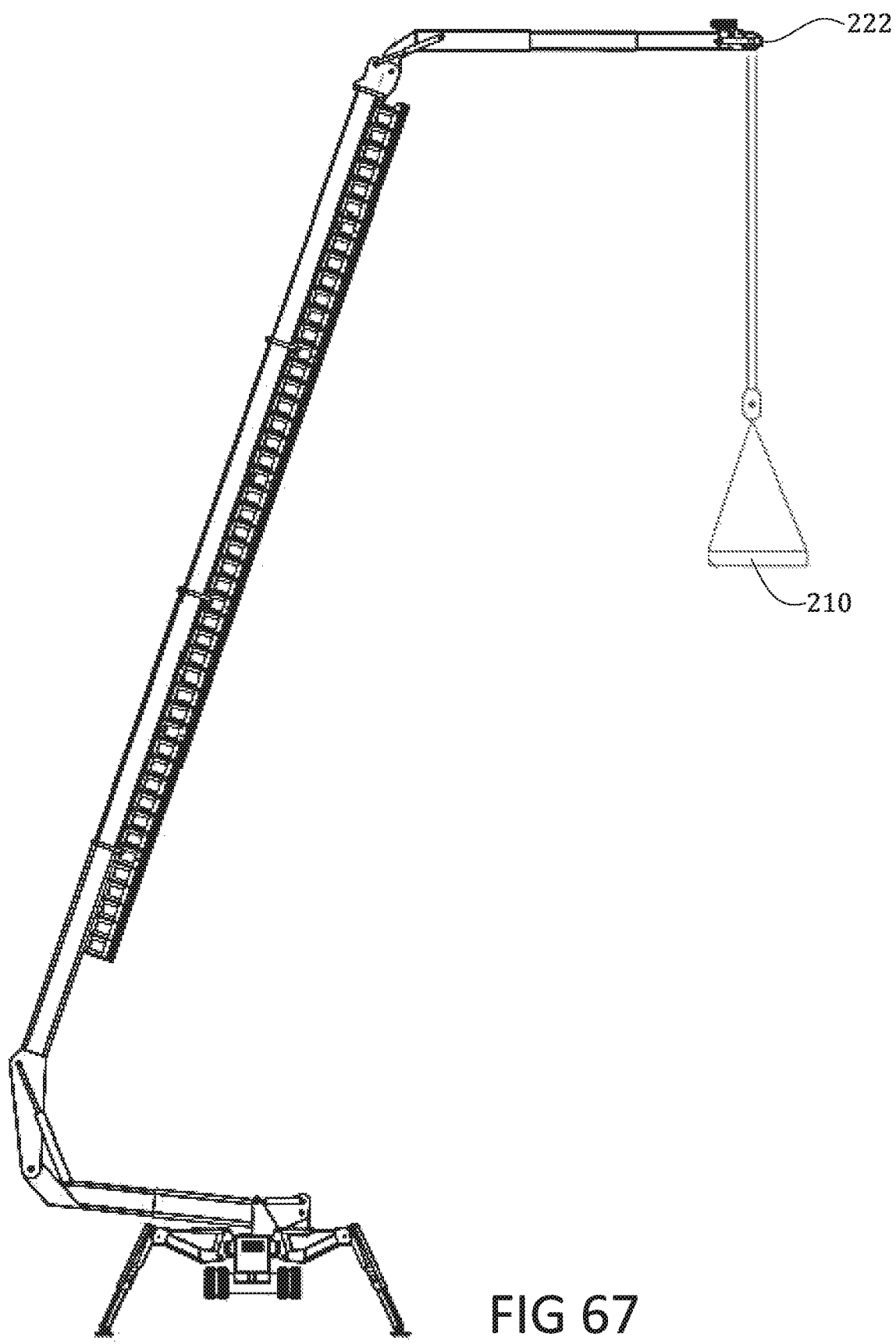
FIG. 67 is a schematic side view of the apparatus of FIG. 1 illustrating how the apparatus can be configured and utilized as a lift or crane.

FIGS. 66 and 67 show how the device can be utilized as a traditional boom lift to lift roof frames 208 in place or lift a pallet 210 to higher levels. At the end of the support jib boom leg 34 is a hoist wheel 222 (FIGS. 24 and 66) which cables and blocks can be attached. The outrigger legs 46 can be extended and rotated to make the biggest base for the lift. Other attachments such as a fork can be or added to the end of the boom.

Figure 69:
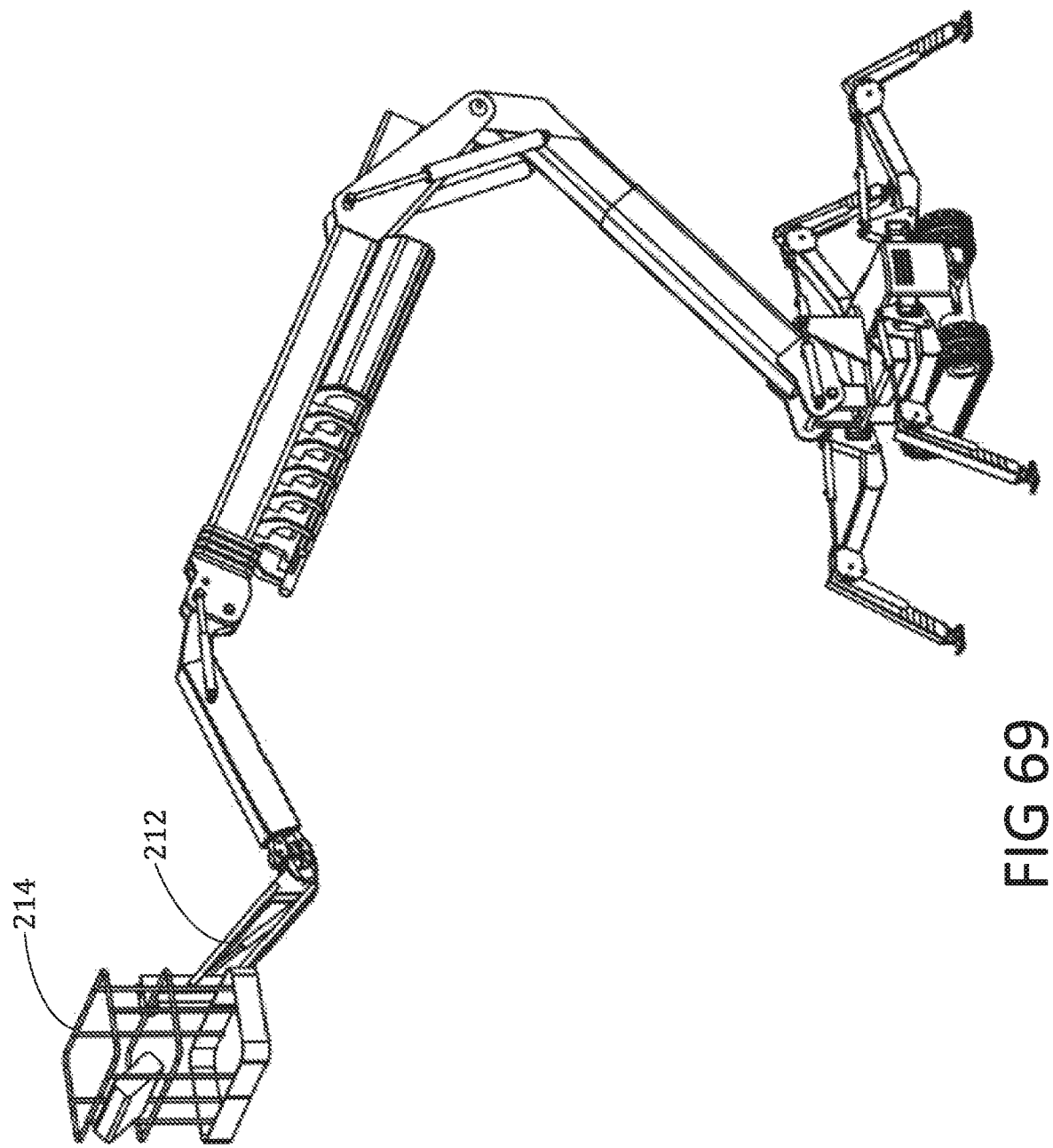
FIG. 69 is a schematic perspective view of the apparatus in FIG. 1 illustrating the Cherry Picker attachment.

FIG. 68 shows another method to deliver material to a higher level either by the forklift attachment 110 or by a pallet 210 that can be attached to the hoist 92 on the trolley. The bridge conveyor belt 52 can also move material such as bricks 174 up an inclined path to the next level. FIG. 69 illustrates the cherry picker attachment 212 and personnel bucket 214. The bucket can be controlled by the user panel on the bucket. The bucket can also be configured to be next to the robotic arm where a worker such as a mason can be assisted by a robotic arm in the installation of bricks or tiles. The robot arm can delivery to the mason a brick with mortar already applied to the brick. Thus, the device does not need to be run by a pre-programmed fabrication plan and can be controlled directly by a worker on site. This hybrid-style of construction mixes robotics with manual operations.

Figure 70:
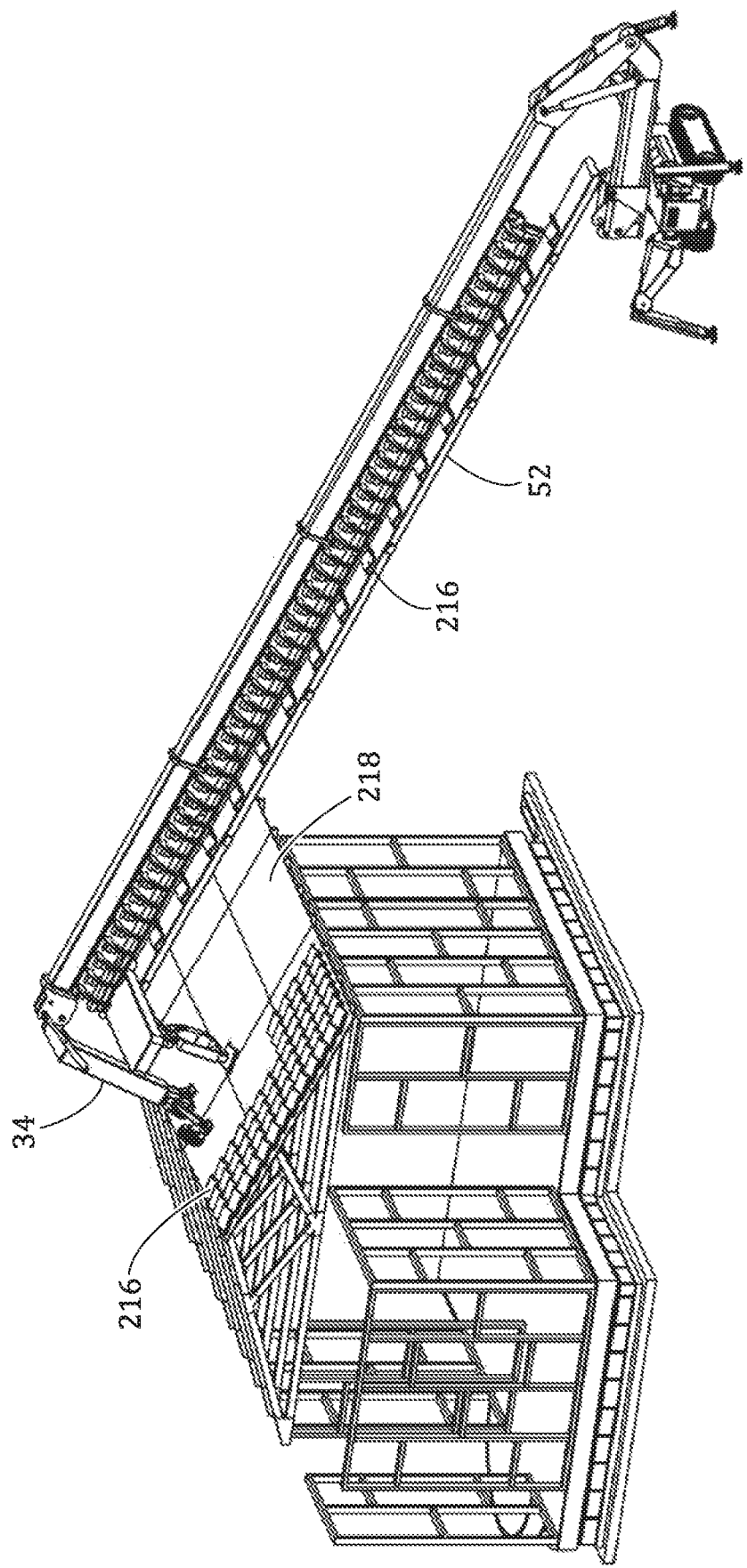
FIG. 70 is a schematic perspective view of the apparatus in FIG. 1 illustrating the apparatus picking and placing tiles on a roof.

FIG. 70 illustrates how the device can be utilized to pick and place roof tiles or solar tiles/panels 216 onto the roof 218 automatically. The tiles can be delivered to the robotic arm via the conveyor belt. The support jib boom leg 34 can be supported by the roof if needed. FIG. 71 illustrates how the device can deliver heavy objects such as lumber 248, rebar, tiles, bricks, drywall, mortar and other supplies up to a site location via one or more forklifts attachments 110 on the trolleys. FIG. 72 illustrates how the device can deliver work stations 258 to the site to assist site workers. Miter saws, table saws (both vertical and horizontal), working tables, along with tools, electrical and water outlets, compressed air tubes, and supplies can be delivered directly to locations when needed.

Figure 73:
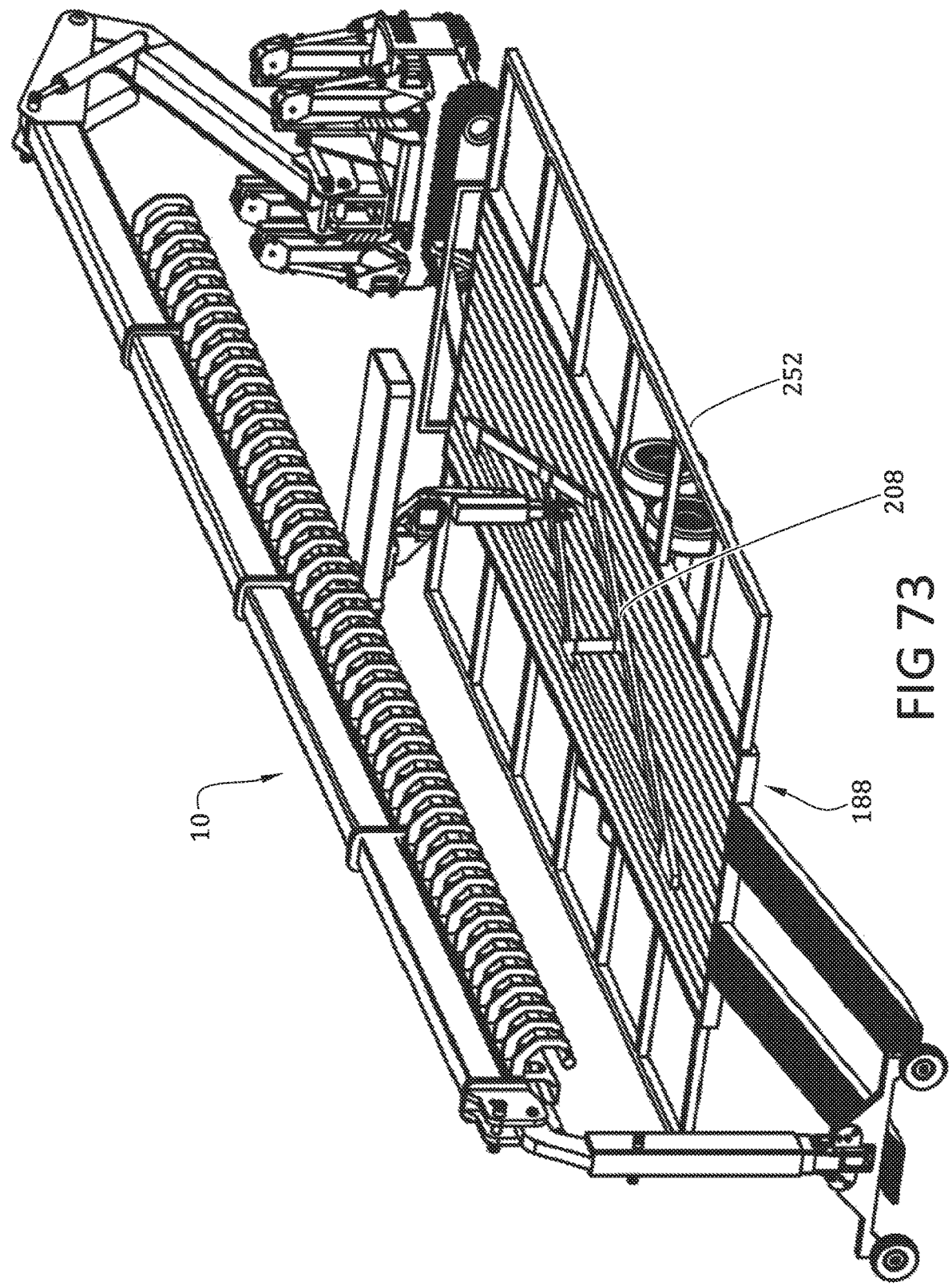
FIG. 73 is a schematic perspective view of the apparatus in FIG. 1 illustrating the apparatus being used to build frames on the top surface of a trailer.

FIG. 73 shows the device 10 being utilized to build a roof frame 208 on a trailer bed 188 at the worksite. Frames, wall panels, and other parts used for construction can be assembled at the site in a similar manner as how prefab frames and parts can be assembled at a factory or warehouse. This will reduce the shipping costs of large bulky prefab frames being sent to a site. Lumber and parts can be assembled quickly at the site on demand Jigs and templates can be quickly marked or placed onto the flatbed to assist workers in assembling boards. The robotic arm can cut wood, panels, dry walls, holes in boards and walls, window treatment, tiles, rock, counter tops, and bricks automatically and precisely to fit which reduces construction time and increases quality. The device is basically a large format CNC machine capable of milling, laser cutting, drilling, and sawing. The trailer can also be turned into a portable CNC device with a knuckle boom attached to the trailer that trolley track frame and rails 60 can be attached to along with the linear mechanical robotic arm 800 on an extended trolley 62 which will also operate off of the same software as the main chassis 40. The trailer can expand outwards with pull out rails 252 for larger frames.

Figure 74:
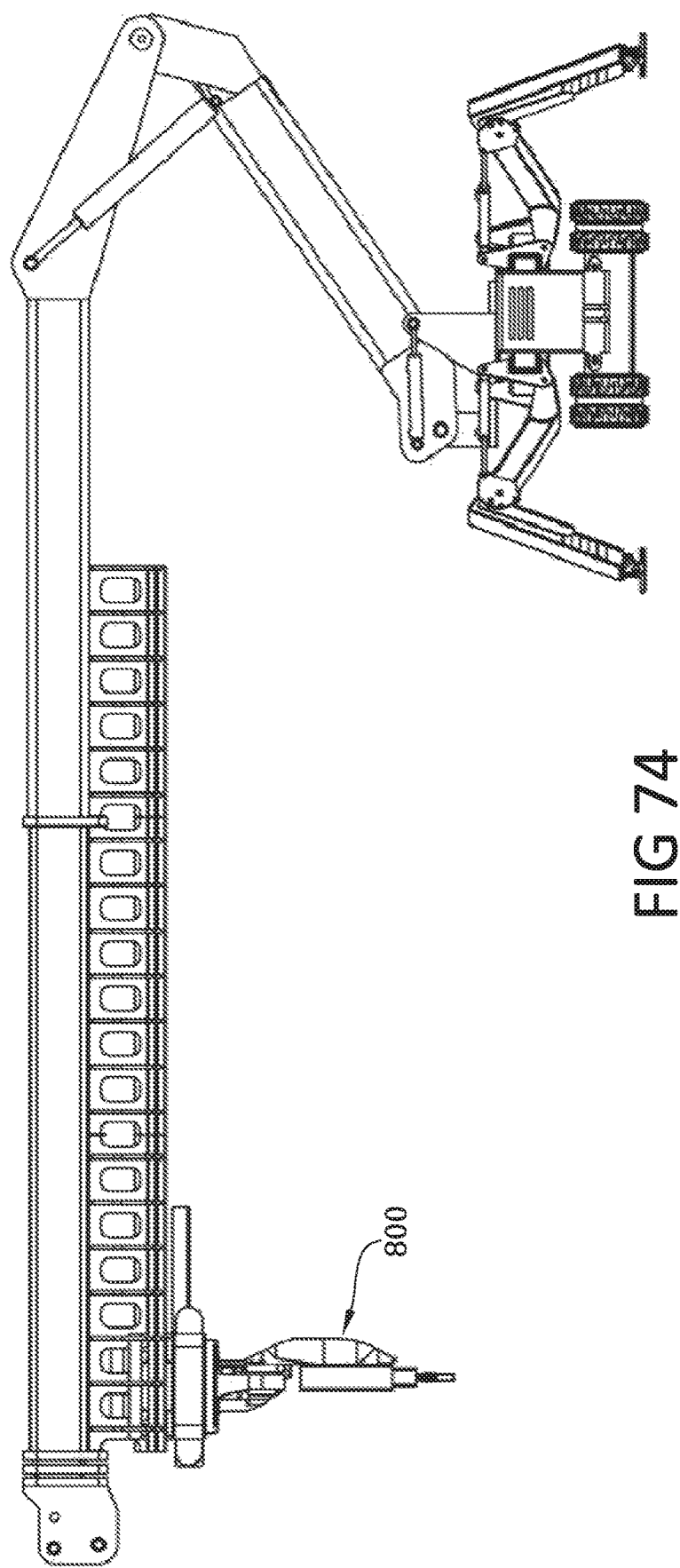
FIG. 74 is a schematic side view of the apparatus in FIG. 1 illustrating how the apparatus can be configured without the support beam.

FIG. 74 illustrates how the mechanical robotic arm 800 can be added to the boom arm without the support jib boom leg. This option may be desirable for smaller areas with lightweight assembly or to oversee lighter computer assisted procedures. FIGS. 75 and 76 is an alternative gantry design 900 that has a fixed bridge that a linear robotic system can move along. These figures also illustrate an alternative trolley and track system 266 as well as alternative wheels 268 and alternative outriggers 270.

Figure 77:
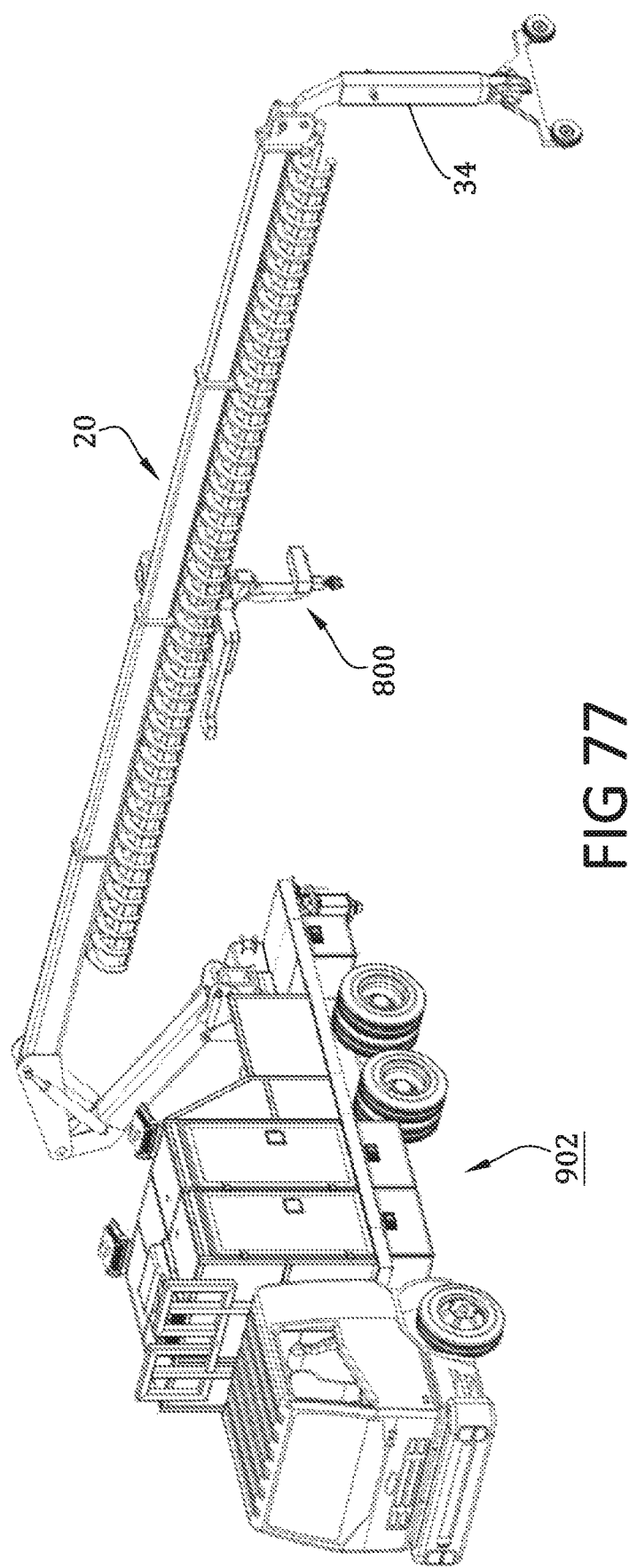

FIG. 77 is an alternative embodiment of the device 902 that combines a vehicle or truck with a bridge of the gantry 20, mechanical robotic arm 800, support jib boom leg 34, and implements. The entire device can be driven to a site without the use of a trailer. This could be a solution for quick deployment of the gantry for emergency situations. In this drawing, the gantry is extended and rotated to be perpendicular to the truck.

Figure 78:
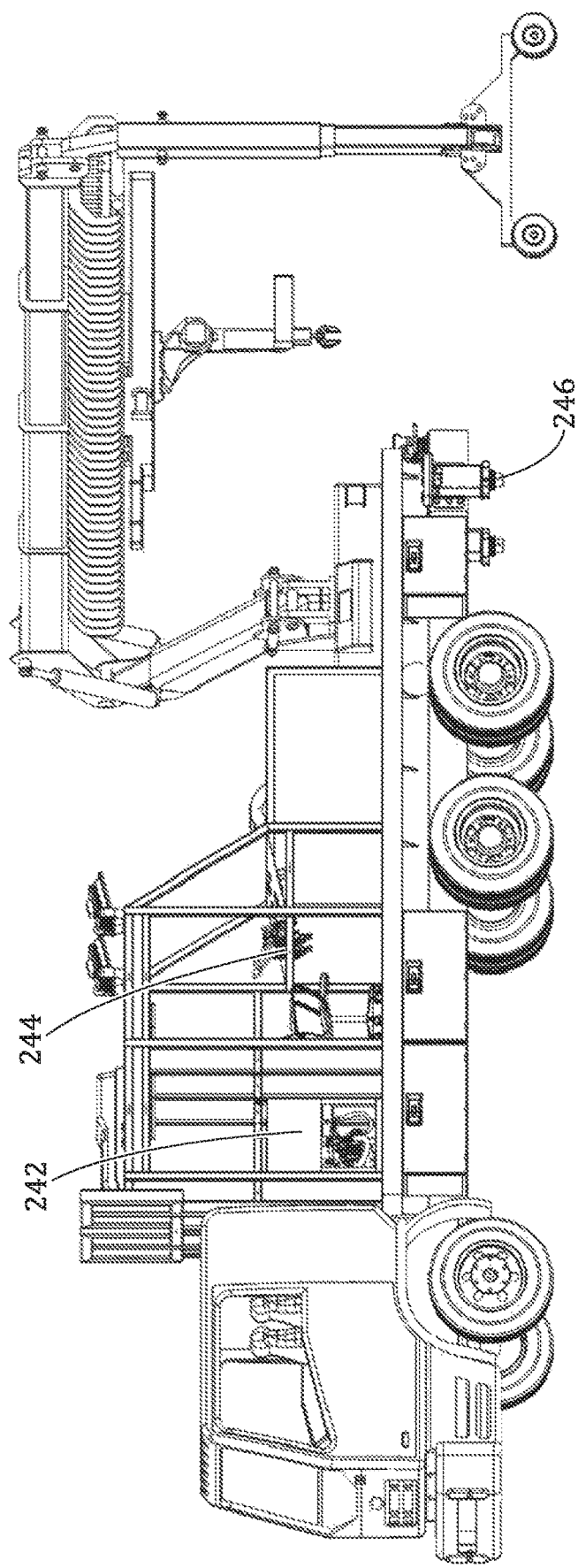
Figure 79:
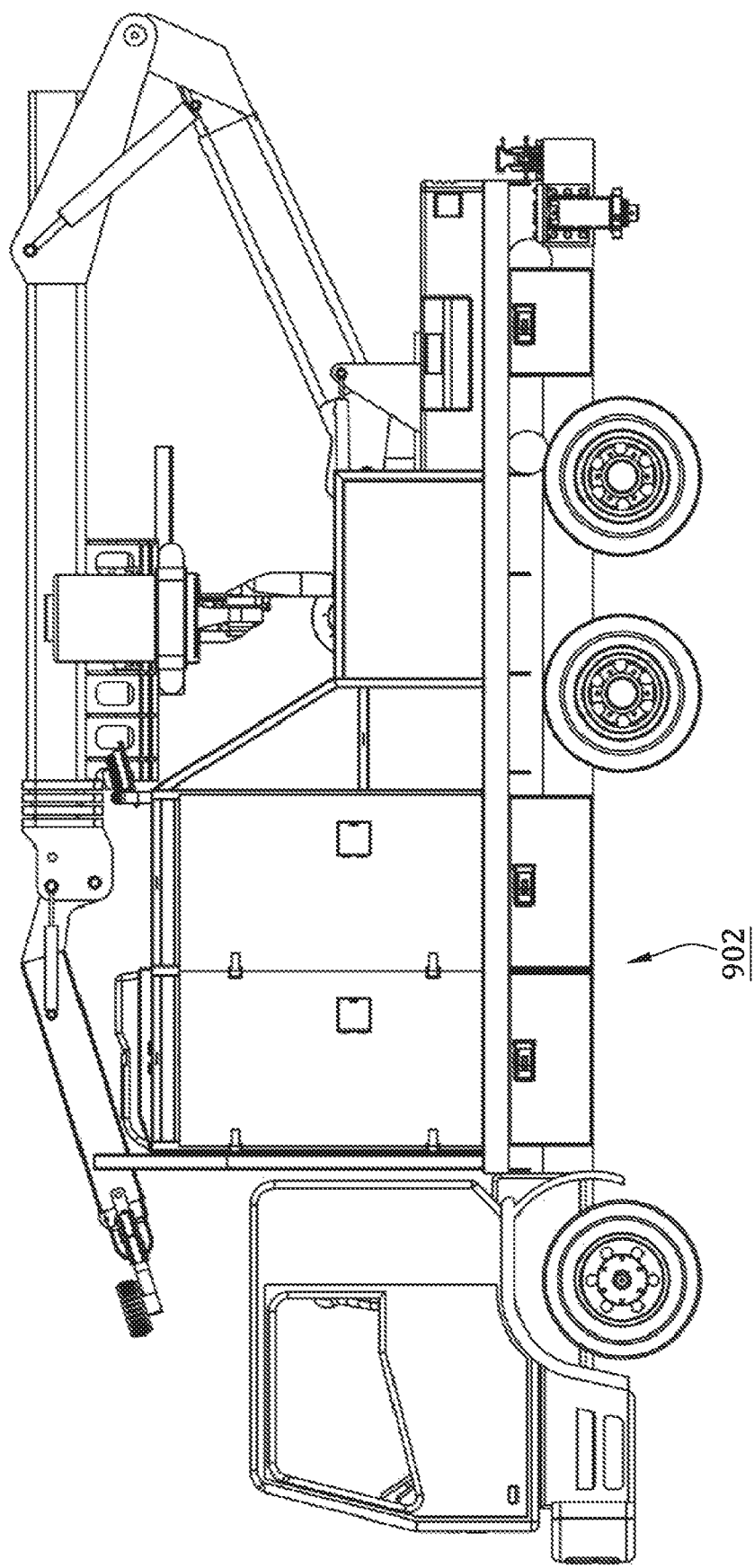
FIG. 79 is a schematic front view of another alternative embodiment of the invention.

FIG. 78 shows how the alternative embodiment of the device can have an equipment and compressor room 242, control room 244, and outrigger jack support legs 246. FIG. 79 shows a side view of the alternative embodiment of the device showing how compact the device is with the gantry folded back on itself and the bridge and booms un-extended.

Another alternative embodiments include: a converted excavator with a support leg that can support a robotic track system; a converted motor grader which could handle even heavier robotic arms and carry out more specific tasks; a smaller chassis to which a robotic arm can attach to oversee construction in interior or smaller indoor areas; lighter colored tracks could be utilized to reduce markings on floors during delivery or use of the device; a seat for the operator or technician.

Detailed embodiments of the present invention are disclosed; however, it is to be understood that the disclosed embodiments are merely exemplary of the invention, which can be embodied in various forms. Specific structural and functional details disclosed are not to be interpreted as limiting, but merely as a basis for the claims and as a representative basis for teaching one skilled in the art to variously employ the present invention in virtually any appropriately detailed structure. All publications, patents, and patent applications mentioned in the application or any Information Disclosure Statement are incorporated by reference to the same extent as if each reference was specifically and individually indicated to be incorporated by reference.

I claim:

1. A movable gantry robotic apparatus comprising:
   a chassis platform with a propulsion system, a power supply and a computing system controller;
   an expandable and rotating turret system arises from the chassis platform to support a gantry bridge;
      the turret system comprises a lower turret boom riser, a turret and an adjustable boom;
      the turret system is able to rotate 360 degrees and move upwards and downwards;
   the gantry bridge having a first extendable gantry support leg and a second extendable gantry support leg;
      the extendable gantry support legs are connected to microcontrollers and the computing system controller;
   the gantry bridge having a bridge conveyor belt system, which has a plurality of conveyor accessory arms, which run along the gantry bridge;
   the gantry bridge having a trolley system;
      the trolley system comprising at least one track frame and at least one trolley track rail and at least one trolley;
   the gantry bridge having at least one gantry accessory arm;
   multiple sensors, which are connected to the computing system controller;
      whereby the bridge conveyor belt system allows for moving a first item or tool along the gantry bridge; the trolley system allows for moving a second item or tool along the gantry bridge; and the at least one gantry accessory arm allows for moving a third item or tool and while the computing system controller and multiple sensors maintain that the gantry bridge is parallel to the ground by directing the microcontrollers to adjust said extendable gantry support legs.

2. The movable gantry robotic apparatus of claim 1, wherein the multiple sensors and the computing system controller determine weight load on the trolley and the gantry bridge and send instructions for adjustments to the gantry bridge to distribute weight load between the extendable gantry support legs.

3. The movable gantry robotic apparatus of claim 1, wherein the chassis platform has wheels, tracks or outrigger legs; the gantry bridge has multiple bridge portions and is expandable and collapsible; and the at least one gantry accessory arm can hold a tool, a gripper attachment, construction materials or supplies, a tank or a concrete mixers; said at least one gantry accessory arm is motorized.

4. The movable gantry robotic apparatus of claim 1, wherein the trolley has a trolley accessory arm, which can hold a tool, a gripper attachment, construction materials or supplies, a tank or a concrete mixers; said trolley accessory arm is motorized.

5. The movable gantry robotic apparatus of claim 1, wherein the first extendable gantry support leg further comprises a rotating wheel attachment connector; the rotating wheel attachment connector can attach a wheel, a foot plate, a outrigger boom, a clamp or a suction cup.

6. The movable gantry robotic apparatus of claim 1, wherein the computing system controller has wireless or satellite communications and is connected to at least one GPS sensor or at least one camera.

7. The movable gantry robotic apparatus of claim 1, wherein the gantry bridge employs a linear X, Y and Z computer controlled gantry with an extended gantry trolley and at least one robotic arm attachment.

8. The movable gantry robotic apparatus of claim 1, wherein the extendable gantry support legs are connected to hydraulic pistons and risers to help adjust elevation and angle of the gantry bridge; and the adjustable boom comprises a boom microprocessor and a boom sensor.

9. A movable gantry robotic apparatus comprising:
   a chassis platform with a propulsion system, a power supply and a computing system controller;
   an expandable and rotating turret system arises from the chassis platform to support a gantry bridge;
      the turret system comprises a rotatable turret and an adjustable boom;

the turret system is able to rotate 360 degrees and move upwards and downwards;

the gantry bridge having a first extendable gantry support leg and a second extendable gantry support leg;

the extendable gantry support legs are connected to microcontrollers and the computing system controller;

the gantry bridge having a trolley system;

the trolley system comprising at least one track frame and at least one trolley track rail and at least one trolley;

the gantry bridge having at least one gantry accessory arm;

multiple sensors, which are connected to the computing system controller;

whereby the trolley system allows for moving a first item or tool along the gantry bridge; and the at least one gantry accessory arm allows for moving a second item or tool and while the computing system controller and multiple sensors maintain that the gantry bridge is parallel to the ground by directing the microcontrollers to adjust said extendable gantry support legs.

10. The movable gantry robotic apparatus of claim 9, wherein the gantry bridge has a bridge conveyor belt system with a plurality of conveyor accessory arms, which run along the gantry bridge, whereby the bridge conveyor belt system allows for moving a third item or tool along the gantry bridge.

11. The movable gantry robotic apparatus of claim 9, wherein the chassis platform uses a floating platform and stabilizing poles.

12. The movable gantry robotic apparatus of claim 9, wherein the multiple sensors and the computing system controller determine weight load on the trolley and the gantry bridge and send instructions for adjustments to the gantry bridge to distribute weight load between the extendable gantry support legs.

13. The movable gantry robotic apparatus of claim 9, wherein the chassis platform has wheels, tracks or outrigger legs; the gantry bridge has multiple bridge portions and is expandable and collapsible; and the at least one gantry accessory arm can hold a tool, a gripper attachment, construction materials or supplies, a tank or a concrete mixers; and said at least one gantry accessory arm is motorized.

14. The movable gantry robotic apparatus of claim 9, wherein the trolley has a trolley accessory arm, which can hold a tool, a gripper attachment, construction materials or supplies, a tank or a concrete mixers; and said trolley accessory arm is motorized.

15. The movable gantry robotic apparatus of claim 9, wherein the first extendable gantry support leg further comprises a rotating wheel attachment connector; the rotating wheel attachment connector can attach a wheel, a foot plate, a outrigger boom, a clamp or a suction cup.

16. The movable gantry robotic apparatus of claim 9, wherein the computing system controller has wireless or satellite communications and is connected to at least one GPS sensor or at least one camera.

17. The movable gantry robotic apparatus of claim 9, wherein the gantry bridge employs a linear X, Y and Z computer controlled gantry with an extended gantry trolley and at least one robotic arm attachment.

18. The movable gantry robotic apparatus of claim 9, wherein the extendable gantry support legs are connected to hydraulic pistons and risers to help adjust elevation and angle of the gantry bridge; and the adjustable boom comprises a boom microprocessor and a boom sensor.

* * * * *